(12) United States Patent
Kobayashi

(10) Patent No.: US 10,574,852 B2
(45) Date of Patent: Feb. 25, 2020

(54) IMAGING OPTICAL MECHANISM, READING MODULE, AND IMAGE READING APPARATUS

(71) Applicant: SEIKO EPSON CORPORATION, Tokyo (JP)

(72) Inventor: Hidekazu Kobayashi, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/244,391

(22) Filed: Jan. 10, 2019

(65) Prior Publication Data

US 2019/0222711 A1    Jul. 18, 2019

(30) Foreign Application Priority Data

Jan. 12, 2018  (JP) ................................ 2018-003805
Jun. 6, 2018   (JP) ................................ 2018-109026

(51) Int. Cl.
*H04N 1/10*     (2006.01)
*G02B 5/10*     (2006.01)
*H04N 1/00*     (2006.01)

(52) U.S. Cl.
CPC ............ *H04N 1/1052* (2013.01); *G02B 5/10* (2013.01); *H04N 1/0066* (2013.01); *H04N 1/00588* (2013.01)

(58) Field of Classification Search
CPC ............ G02B 17/0663; G02B 17/0694; G02B 17/0848; G02B 17/086; G02B 17/0896; G02B 15/00; G02B 3/06; H04N 5/2251; H04N 5/2253; H04N 5/2254; H04N 1/00806; H04N 1/02815; H04N 1/0283; H04N 1/02835; H04N 1/1056; H04N 1/107; G06K 7/10722
USPC ....... 359/631, 729, 365, 366, 629, 676, 678, 359/422, 431, 432, 433, 627, 630, 634, 359/636, 683, 727, 728, 731, 738, 861
See application file for complete search history.

(56) References Cited

U.S. PATENT DOCUMENTS 5,677,791  A  * 10/1997  Yoshibe ............. G02B 27/0018
                                                    359/554
2002/0140854 A1* 10/2002  Lan ........................ G06T 3/403
                                                    348/448

(Continued)

FOREIGN PATENT DOCUMENTS

JP      2002-169092 A   6/2002
JP      2006-062227 A   3/2006

*Primary Examiner* — Negussie Worku
(74) *Attorney, Agent, or Firm* — Workman Nydegger

(57) ABSTRACT

An imaging optical mechanism includes a first concave mirror and a second concave mirror at a position shifted from the first concave mirror in a sub-scanning direction. A plurality of aperture members in which slits are formed is disposed between the first concave mirror and the second concave mirror. The first concave mirror reflects light incident from an original document so as not to be imaged at a position between the first concave mirror and the second concave mirror in the sub-scanning direction, and reflects light incident from the original document so as to be imaged at the position between the first concave mirror and the second concave mirror in a main scanning direction. The second concave mirror reflects light which is reflected by the first concave mirror and incident thereto, so as to be imaged at a position of a sensor.

21 Claims, 19 Drawing Sheets

(56) References Cited

U.S. PATENT DOCUMENTS

| | | | | |
|---|---|---|---|---|
| 2003/0189618 | A1* | 10/2003 | Gudaitis | B41J 2/17509 |
| | | | | 347/43 |
| 2005/0270502 | A1* | 12/2005 | Iinuma | H04N 9/317 |
| | | | | 353/101 |
| 2007/0291355 | A1* | 12/2007 | Tanijiri | G02B 27/0172 |
| | | | | 359/467 |
| 2008/0094616 | A1* | 4/2008 | Tanaka | G01N 21/8803 |
| | | | | 356/237.2 |
| 2010/0171955 | A1* | 7/2010 | Suga | G01B 11/026 |
| | | | | 356/364 |
| 2011/0096171 | A1* | 4/2011 | Kimura | G02B 7/34 |
| | | | | 348/187 |
| 2013/0155723 | A1* | 6/2013 | Coleman | G02B 6/0018 |
| | | | | 362/621 |
| 2014/0334776 | A1* | 11/2014 | Kato | G02B 6/2937 |
| | | | | 385/27 |
| 2017/0052379 | A1* | 2/2017 | Yang | G02B 5/3083 |
| 2018/0070813 | A1* | 3/2018 | Arieli | G02B 3/08 |
| 2018/0113311 | A1* | 4/2018 | Klug | H04N 13/128 |
| 2019/0130147 | A1* | 5/2019 | Ikeda | G06K 7/10722 |
| 2019/0166278 | A1* | 5/2019 | Hiyama | H04N 1/00806 |
| 2019/0183333 | A1* | 6/2019 | Arieli | G01J 3/0248 |

* cited by examiner

IMAGING OPTICAL MECHANISM, READING MODULE, AND IMAGE READING APPARATUS

CROSS REFERENCES TO RELATED APPLICATIONS

The entire disclosure of Japanese Patent Application Nos. 2018-003805, filed Jan. 12, 2018 and 2018-109026, filed Jun. 6, 2018 are expressly incorporated by reference herein.

BACKGROUND

1. Technical Field

The present disclosure relates to an imaging optical mechanism which is mounted in an optical module which moves relative to a reading target or an imaging object and images the reading target at the imaging object by causing light reflected by the reading target or light emitted from a light source to be incident to the imaging object, a reading module, and an image reading apparatus.

2. Related Art

In the related art, a scanner device including a carriage having a reading module that moves relative to an original document as a reading target and reads the original document is known as an example of an image reading apparatus. The scanner device is configured as an independent device or as a part of a multifunction device. The reading module includes a light source such as a linear light source, that irradiates an original document on a glass plate with light from below a document stand, an imaging optical mechanism that condenses light which has been reflected by the original document and then incident thereto, and a light receiving sensor (an example of an imaging object) on which an image of light emitted from the imaging optical mechanism is formed. A mechanism using a lens array as a component for a condensing function is known as the imaging optical mechanism. The configuration using the lens array has a problem of aberration occurring by refraction of light and has a tendency of the manufacturing cost increasing.

For example, JP-A-2006-62227 discloses an optical printer including a writing module that writes an image on a rotating photosensitive drum by performing imaging on the photosensitive drum as an imaging object with light of a light source image. The writing module includes plural sets of concave mirrors and an imaging optical mechanism that reflects the incident light by a plurality of concave mirrors so as to condense the light. The imaging optical mechanism is disposed in a state where a first concave mirror and a second concave mirror have been inclined while reflection surfaces thereof face each other. Imaging of an intermediate image of a light source image at an imaging position by the first concave mirror is performed at a predetermined position by the second concave mirror. The imaging optical mechanism is configured in a manner that plural sets of reflection elements (one set of reflection elements includes the first concave mirror and the second concave mirror) are arranged. The adjacent reflection elements are separated from a light blocking member having a thin plate shape. The light blocking member prevents an occurrence of a situation in which reflected light from any one set of reflection elements is incident to the adjacent reflection elements as stray light.

In the imaging optical mechanism disclosed in JP-A-2006-62227, effects of blocking stray light from the adjacent reflection element by providing the light blocking member, improving contrast of an image to be formed, and increasing a resolution of an image to be written on the imaging object are obtained. In a case where the imaging optical mechanism disclosed in JP-A-2006-62227 is applied to a reading module of an image reading apparatus, effects of blocking stray light from the adjacent reflection element by providing the light blocking member, improving contrast of an image formed on the light receiving sensor as an imaging object, and increasing a reading resolution of the sensor are obtained.

However, in an image reading apparatus requiring a higher reading resolution or an apparatus such as an optical printer, which requires a higher writing resolution, the contrast of an image of light to be formed on the imaging object is insufficient. As a result, the sufficient resolution is not obtained. It is necessary that an arrangement pitch of the reflection element is reduced by increasing the required resolution. However, providing the light blocking member at a very small pitch may have a difficulty in manufacturing.

SUMMARY

An advantage of some aspects of the disclosure is to provide an imaging optical mechanism, a reading module, and an image reading apparatus in which an image of light can be formed on an imaging object at high contrast and a high resolution can be obtained.

Hereinafter, means of the disclosure and operation effects thereof will be described.

According to an aspect of the disclosure, an imaging optical mechanism is mounted in an optical module that moves relative to a reading target or an imaging object and images, on the imaging object, light incident by reflecting or transmitting light from a light source by or through the reading target or light incident from the light source. The imaging optical mechanism includes a first specular surface that reflects the light incident from the reading target, a second specular surface that is disposed at a position shifted from the first specular surface in a relative movement direction of the optical module and reflects and emits light reflected by the first specular surface, and a plurality of aperture members in which slits are formed along a path in which the light incident from the reading target travels toward the first specular surface, a path in which the light reflected by the first specular surface travels toward the second specular surface, and a path in which the light reflected by the second specular surface travels toward the imaging object. The first specular surface has a first curvature at which the light which is widely incident from the reading target in the movement direction is reflected so as not to be imaged at a position between the first specular surface and the second specular surface, and a second curvature at which the light which is widely incident from the reading target in an intersection direction intersecting the movement direction is reflected so as to be imaged at a position between the first specular surface and the second specular surface. The second specular surface has a third curvature at which the light incident from the first specular surface in the movement direction is reflected so as to be imaged at a position of the imaging object, and a fourth curvature at which the light incident from the first specular surface in the intersection direction is reflected so as to be imaged at the position of the imaging object.

According to the configuration, light incident from the light source or light incident by reflecting the light from the light source by the reading target is imaged in the imaging object through a path in which light travels toward the first specular surface, a path in which the light reflected by the first specular surface travels toward the second specular surface, and a path in which the light reflected by the second specular surface travels toward the imaging object. At this time, only light passing through the slit of the aperture member in each of the paths of the light is imaged in the imaging object. Thus, stray light is blocked by the plurality of aperture members, and an occurrence of a situation in which the stray light reaches the imaging object is suppressed. As a result, contrast of an image formed in the imaging object is improved, and a high resolution can be obtained. Regarding light which is widely incident from the reading target, light incident to portions other than the first specular surface is blocked by the first light blocking member and is reflected by the first specular surface in the movement direction so as not to be imaged at a position between the first specular surface and the second specular surface, and is reflected by the first specular surface in the intersection direction so as to be imaged at the position between the first specular surface and the second specular surface. The light which has been reflected by the first specular surface and then incident in the movement direction is reflected by the second specular surface so as to be imaged at the position of the imaging object. The light which has been reflected by the first specular surface and then incident in the intersection direction intersecting the movement direction is reflected by the second specular surface so as to be imaged at the position of the imaging object. Thus, light from the reading target is imaged as an inverted image, in the imaging object in the movement direction and is imaged as an erected image, in the imaging object in the intersection direction. In the movement direction, considering an overlap of an image is not required because the adjacent concave mirror is not provided. Therefore, imaging may occur slightly, and thus it is possible to secure lengths of the first specular surface and the second specular surface in the movement direction to be relatively long. Therefore, it is possible to secure the large quantity of light imaged in the imaging object, and thus to secure brightness of an image. As a result, it is possible to form an image having high contrast in the imaging object and to obtain high resolution. Since light is reflected by the first specular surface and the second specular surface, an optical path length from the reading target to the imaging object increases, and thus it is possible to increase a focal distance. Therefore, it is possible to increase a focal depth. Accordingly, it is possible to form an image of light in the imaging object at high contrast and to obtain a high resolution.

In the imaging optical mechanism, preferably, lengths of the first specular surface and the second specular surface in the movement direction are longer than lengths of the first specular surface and the second specular surface in the intersection direction.

According to this configuration, the large quantity of light can be incident and reflected to and by the first specular surface and the second specular surface. Thus, it is possible to secure brightness of an image formed in the imaging object. If the lengths of the first specular surface and the second specular surface are too long, the focal depth in the movement direction is shallow. Thus, the lengths thereof are preferably set to be long in a range causing the focal depth not to be shallow.

Preferably, the imaging optical mechanism further includes a first light blocking member which is disposed on a path and has a slit at a position facing the first specular surface, the path in which the incident light travels toward a first aperture member disposed on a most incident side of the light among the plurality of aperture members, and a second light blocking member which is disposed on a path and has a slit at a position facing the second specular surface, the path in which the light reflected by the second specular surface is transmitted through a second aperture member disposed on a closest side to the imaging object among the plurality of aperture members and travels toward the imaging object.

According to the configuration, light incident by passing through the slit of the first light blocking member among rays of light which is incident and spreads is reflected by the first specular surface through the slits of the plurality of aperture members. Since incident light is restricted at the slit in the movement direction by the first light blocking member, it is possible to secure the large quantity of light reflected by the first specular surface in the movement direction and to reduce stray light traveling toward portions other than the first specular surface, in particular, stray light which is directly incident to an imaging surface from the reading target such as an original document. The light reflected by the second specular surface passes through the slits of the plurality of aperture members, further passing through the slit of the second light blocking member, and then is imaged in the imaging object. Since the light reflected by the second specular surface is restricted by the slit of the second light blocking member in the movement direction, it is possible to reduce stray light in the movement direction in cooperation with the first light blocking member. Thus, brightness of an image formed in the imaging object is secured, high contrast can be obtained, and thus a high resolution can be obtained.

In the imaging optical mechanism, preferably, an end portion of an inside of at least one slit in the movement direction among slits formed in each of the first light blocking member and the second light blocking member is disposed at a position at which the light traveling toward portions other than the specular surfaces disposed to face each other is blocked.

According to the configuration, it is possible to suppress blurring of an image formed in the sensor and to secure brightness of the image by reducing stray light. Thus, it is possible to obtain imaging at high contrast.

In the imaging optical mechanism, preferably, a side surface of at least one slit, which is provided in the movement direction among the slits formed in each of the first light blocking member and the second light blocking member has an inclined shape widened toward an opposite side of the specular surfaces disposed to face each other.

According to the configuration, it is possible to block stray light incident from the slit of the first light blocking member without blocking reading light from an original document by the side surface disposed in the movement direction. Thus, it is possible to obtain imaging at high contrast.

In the imaging optical mechanism, preferably, a first light blocking portion is provided at a position of blocking light which is transmitted through the slit of the first light blocking member and travels toward the slit of the second light blocking member, in at least one of the first light blocking member and the second light blocking member.

According to the configuration, it is possible to reduce direct stray light in a manner that the first light blocking portion blocks the direct stray light which directly travels through the slit of the second light blocking member from the slit of the first light blocking member without passing through a path in which the light is reflected by the concave mirror. Thus, it is possible to obtain imaging at high contrast.

In the imaging optical mechanism, preferably, a second light blocking portion is provided at a position of blocking light which is transmitted through the slit of the first light blocking member and travels toward the slit of the second light blocking member, in at least one of the first aperture member and the second aperture member.

According to the configuration, it is possible to reduce direct stray light which directly travels through the slit of the second light blocking member from the slit of the first light blocking member without passing through a path in which the light is reflected by the concave mirror, by the second light blocking portion. Thus, it is possible to obtain imaging at high contrast.

In the imaging optical mechanism, preferably, in a case where the second light blocking portion is provided in the first aperture member, the second light blocking portion is provided at a position between a path of light restricted by the slit of the first light blocking member and a path of light to be incident to the second specular surface and light reflected by the second specular surface, in the slit formed in the first aperture member. In addition, preferably, in a case where the second light blocking portion is provided in the second aperture member, the second light blocking portion is provided at a position between a path of light to be incident to the first specular surface and light reflected by the first specular surface and a path of light reflected by the second specular surface, in the slit formed in the second aperture member.

According to the configuration, it is possible to effectively reduce direct stray light by the second light blocking portion without totally blocking light passing through a path in which the light is reflected by the first concave mirror and the second concave mirror.

In the imaging optical mechanism, preferably, a side surface of the second light blocking portion in the movement direction has a shape along an inner end portion of the path of the light restricted by the slit of the first light blocking member and the paths of the light to be incident to the second specular surface and light reflected by the second specular surface.

According to the configuration, it is possible to block direct stray light by the second light blocking portion.

In the imaging optical mechanism, preferably, an inclined surface inclined toward an opposite side of the second specular surface from the movement direction is provided in a region adjacent to a region of the slit, to which the light is incident, on a surface of at least the first aperture member of the first aperture member and the second aperture member, on the reading target side.

According to the configuration, it is possible to reduce stray light occurring by reflecting light incident to a region adjacent to the slit of the first aperture member, from the slit of the first light blocking member.

In the imaging optical mechanism, preferably, a width of the slit of the first light blocking member in the movement direction corresponds to a length as long as light incident from the reading target can be restricted to an irradiation area of the first specular surface in a length range in the movement direction.

According to the configuration, the light incident from the reading target is restricted by the slit of the first light blocking member in the movement direction, and thus it is possible to block light out of the length range of the first specular surface in the movement direction. Accordingly, high contrast can be obtained by brightening an image of light formed in the imaging object. As a result, a high resolution can be obtained.

In the imaging optical mechanism, preferably, a width of the slit of the second light blocking member in the movement direction corresponds to a length as long as light reflected by the second specular surface can be transmitted.

According to the configuration, all or most of rays of light other than the light reflected by the second specular surface are blocked by the second light blocking member. Accordingly, it is possible to secure brightness and high contrast of an image of light formed in the imaging object, and to obtain a high resolution.

In the imaging optical mechanism, preferably, the first specular surface and the second specular surface are disposed at positions which do not overlap each other in the movement direction and positions overlapping each other in the intersection direction.

According to the configuration, all or most of rays of light reflected by the first specular surface can be incident to the second specular surface, and it is possible to suppress an occurrence of a situation in which light other than the light reflected by the first specular surface is incident to the second specular surface. It is possible to block stray light which is directly incident to the imaging surface from a region out of a reading range of the reading target such as an original document, by the first light blocking member and the second light blocking member cooperating with each other. Accordingly, it is possible to secure brightness and high contrast of an image formed in the imaging object, and to obtain a high resolution.

In the imaging optical mechanism, preferably, an image of the reading target in the movement direction is formed to be an inverted image, and an image of the reading target in the intersection direction is formed to be an erected image, at the position of the imaging object.

According to the configuration, in a case where plural sets of first specular surfaces, second specular surfaces, and imaging objects are arranged in the intersection direction, an erected image is formed in the imaging object in the intersection direction. Thus, images can be joined between the imaging objects. Since an inverted image is formed in the movement direction, it is possible to reduce the curvatures of the first specular surface and the second specular surface in the movement direction and to reduce aberration. If small aberration is allowed in the movement direction so as to obtain aberration balance between the movement direction and the intersection direction, it is possible to increase a dimension of the concave mirror in the movement direction and to secure brightness as much as the aberration is allowed.

In the imaging optical mechanism, preferably, the first light blocking member is integrally formed with the second specular surface in a state of being adjacent to the second specular surface in a first direction in the movement direction, and the second light blocking member is integrally formed with the first specular surface in a state of being adjacent to the first specular surface in a second direction in the movement direction.

According to the configuration, it is possible to manufacture the imaging optical mechanism with a relatively small number of components including a component obtained by integrally forming the first light blocking member and the second specular surface with each other and a component obtained by integrally forming the second light blocking member and the first specular surface with each other.

In the imaging optical mechanism, preferably, the second specular surface causes the reflected light to be imaged at an optical distance equal to an optical distance between the reading target and the first specular surface.

According to the configuration, the component obtained by integrally forming the first light blocking member and the second specular surface with each other and the component obtained by integrally forming the second light blocking member and the first specular surface with each other can be commonly used, and thus it is possible to further reduce the number of components constituting the imaging optical mechanism.

In the imaging optical mechanism, preferably, the first specular surface and the second specular surface have a common shape.

According to the configuration, the component obtained by integrally forming the first light blocking member and the second specular surface with each other and the component obtained by integrally forming the second light blocking member and the first specular surface with each other can be used as common components, and thus it is possible to further reduce the number of components thereof.

In the imaging optical mechanism, preferably, the first light blocking member and the second light blocking member are integrally formed with the aperture member.

According to the configuration, it is possible to furthermore reduce the number of components constituting the imaging optical mechanism. In addition, arrangement position accuracy of the plurality of aperture members is improved, and the plurality of aperture members is easily arranged at positions as in an assumed design. Thus, it is possible to further reduce stray light. As a result, it is possible to form an image having high contrast in the imaging object.

According to another aspect of the disclosure, a reading module includes the imaging optical mechanism, a linear light source as the light source that irradiates the reading target with light in the intersection direction, and a sensor array in which a plurality of sensors as the imaging object is arranged. The reading module is provided as an example of the optical module. The imaging optical mechanism includes a first specular surface array in which a plurality of first specular surfaces is arranged in the intersection direction, a second specular surface array in which a plurality of second specular surfaces is arranged in the intersection direction, the first light blocking member which has the slit opening to allow light to be incident to the first specular surface array, and the second light blocking member which has the slit opening to allow light reflected by the second specular surface array to be imaged in the sensor array.

According to the configuration, it is possible to form a bright image of the reading target in the sensor array at high contrast by the reading module moving relative to the reading target. Accordingly, it is possible to read the reading target at a high resolution by the reading module.

In the reading module, preferably, the slit of the first light blocking member opens in a length range allowing light to be incident to the first specular surface array, in the intersection direction, and the slit of the second light blocking member opens in a length range allowing the light reflected by the second specular surface array in the intersection direction to be imaged in the sensor array.

According to the configuration, the slits of the first light blocking member and the second light blocking member open in the length range of the specular surface array in the intersection direction. Thus, it is possible to secure a large quantity of light incident to the imaging optical mechanism and a large quantity of light emitted from the imaging optical mechanism, and to secure brightness of an image formed in the sensor, for example, in comparison to a configuration in which a plurality of slits which opens to respectively correspond to specular surfaces is formed.

According to still another aspect of the disclosure, an image reading apparatus includes the reading module, a transparent member that defines a position of an original document as a reading target, and a transporting unit that relatively moves the original document and the optical module. The reading module reads the original document at a position on an opposite side of the original document with the transparent member interposed between the reading module and the original document, by causing reflected light of light with which the original document has been irradiated to be incident to the reading module. According to the configuration, the image reading apparatus can cause the reading module to read an original document as the reading target at a high resolution.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, embodiments obtained by embodying an image reading apparatus will be described with reference to the drawings. An image reading apparatus in a first embodiment is a multifunction device including a scanner device, for example.

Figure 1:
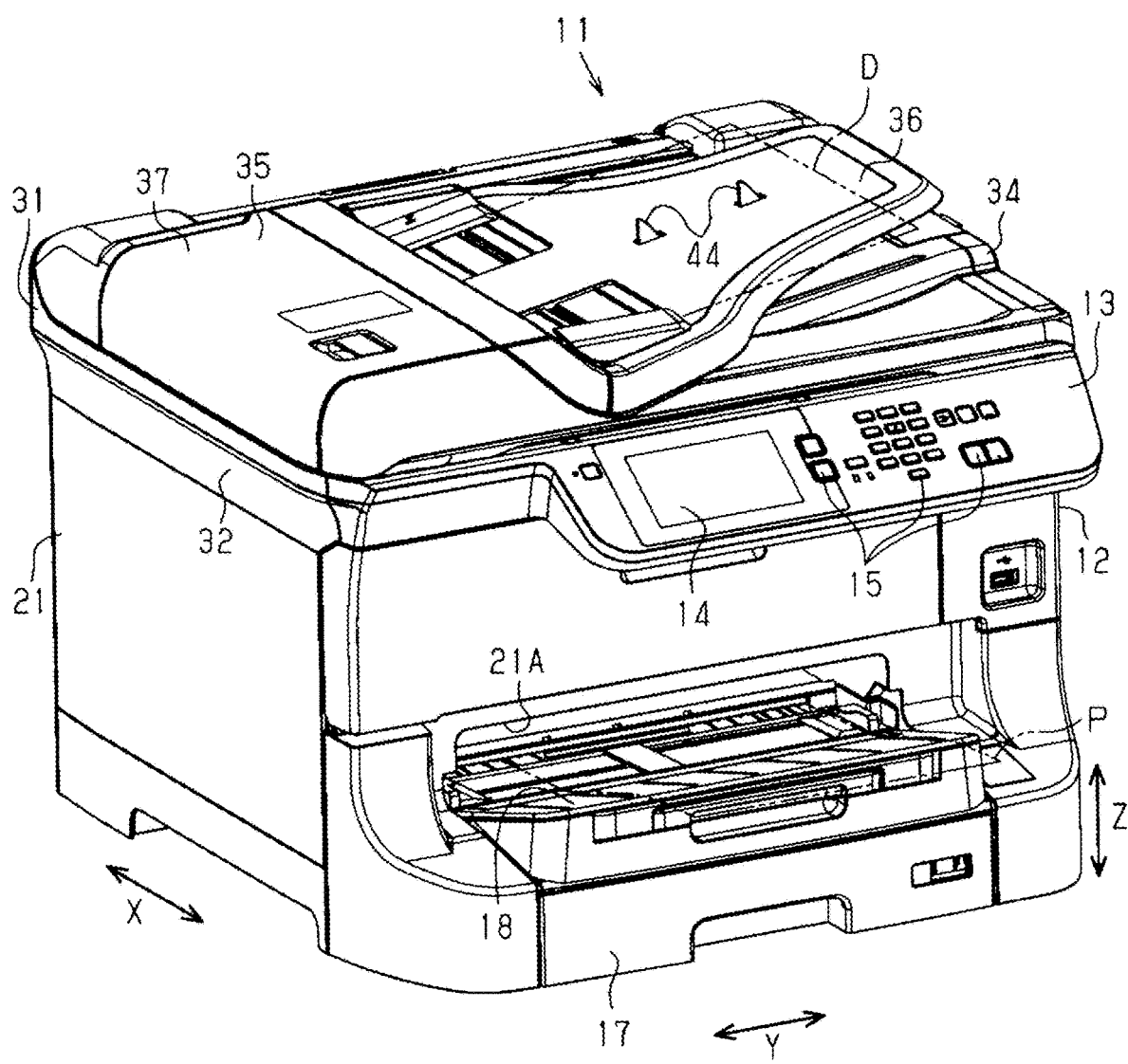
FIG. 1 is a perspective view illustrating a multifunction device according to an embodiment.

As illustrated in FIG. 1, a multifunction device 11 includes a printing device 21 and a scanner device 31. The printing device 21 performs printing on a medium P such as paper. The scanner device 31 is disposed on an upper side of the printing device 21 in a vertical direction Z and is capable of reading an original document D. The multifunction device 11 has functions of scanning, copying, and printing.

An operation panel 13 provided in a device body 12 of the multifunction device 11 includes a display unit 14 for displaying a menu screen and the like and an operation unit 15 configured with an operation switch and the like. For example, a request of scanning, copying, or printing is applied to the multifunction device 11 by operating the operation unit 15. The request of printing is also applied to the multifunction device 11 from a host device which is connected to the multifunction device 11 through a communication cable and is configured with a personal computer (PC) or the like. The multifunction device 11 receives, for example, a scanning job at time of request of scanning or copying.

The printing device 21 performs printing on a medium P supplied (fed) from a cassette 17 inserted at the bottom of the device body 12. The medium P after printing is discharged onto a stacker 18 from a discharge port 21A of the device body 12. The scanner device 31 reads an original document D and transfers image data obtained by the reading to the host device, for example. Copying is performed in a manner that the printing device 21 prints an image based on image data obtained by the scanner device 31 reading an original document D, on a medium P. Therefore, when scanning or copying is performed, an original document D is read by the scanner device 31.

As illustrated in FIG. 1, the scanner device 31 includes a main body 32 and a document stand cover 34. The main body 32 includes a flat-bed type document stand 33 (see FIG. 2) on which an original document can be placed. The document stand cover 34 is capable of opening and closing the document stand 33. In the example, a document transporting unit 35 is provided at a rear portion of the document stand cover 34, which illustrated as an upper side in FIG. 1. The document transporting unit automatically transports a plurality of set original documents one by one. The document transporting unit 35 includes a set tray 36 and a transport mechanism unit 37. A plurality of original documents D can be set on the set tray 36. The transport mechanism unit 37 transports the original document D on the set tray 36 one by one. The transport mechanism unit 37 performs transporting which includes feeding of feeding an original document on the set tray 36 to a reading position and discharging of discharging an original document D after an image has been read. The original document D after image reading is discharged to, for example, a discharge region between the set tray 36 and the document stand cover 34.

Figure 2:
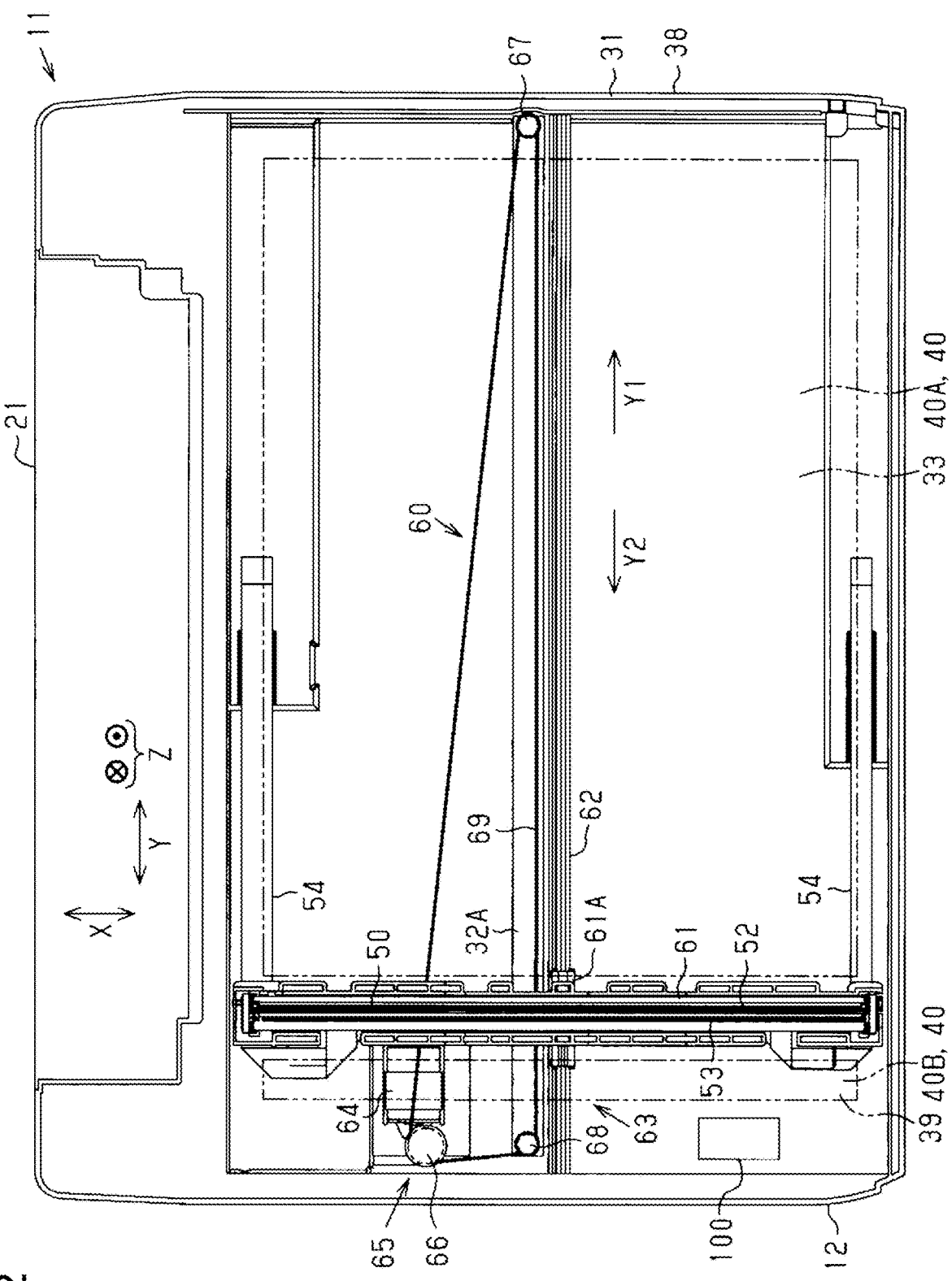
FIG. 2 is a schematic plan view illustrating a scanner device in a state where a document stand cover is opened.
Figure 3:
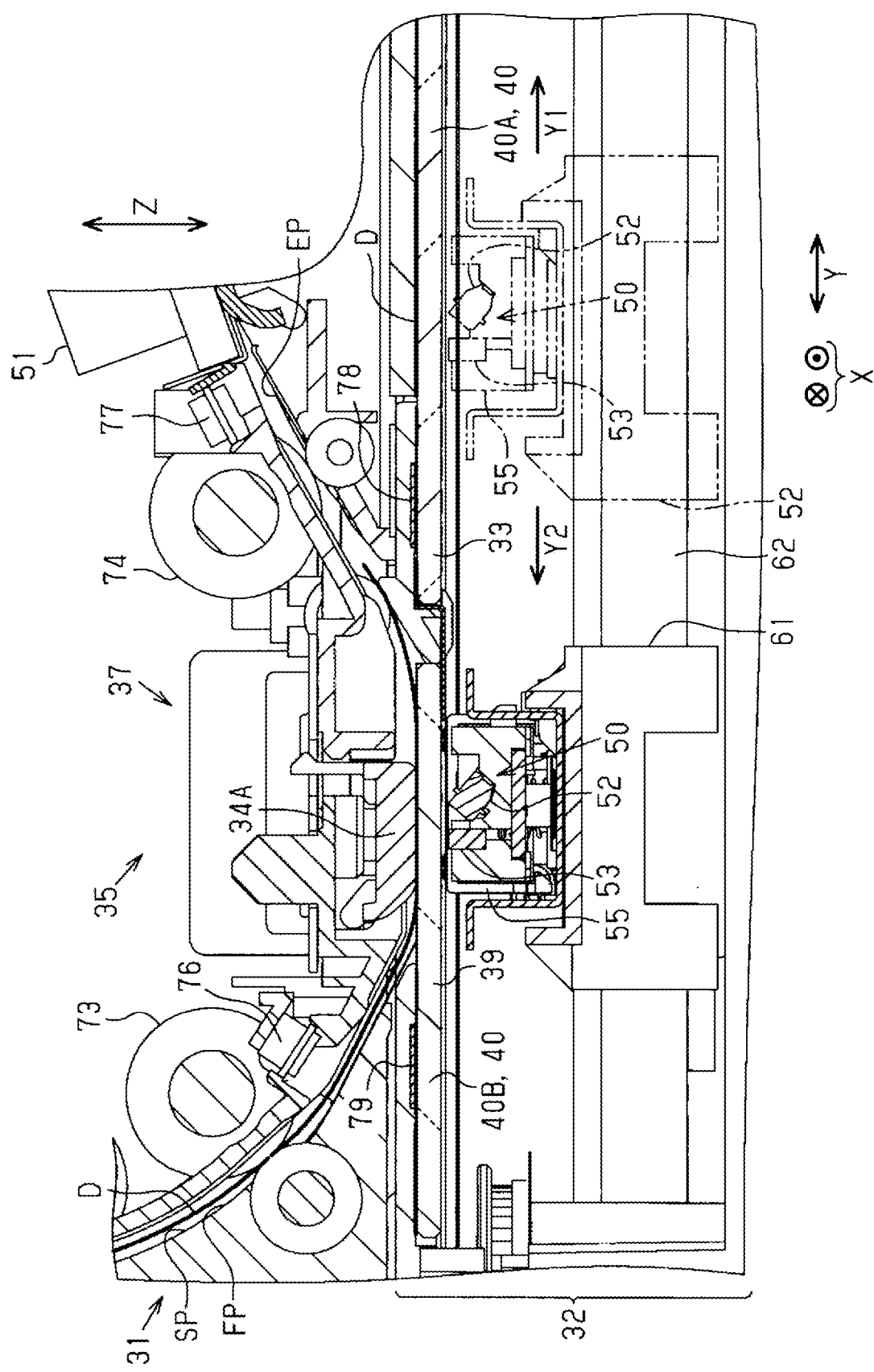
FIG. 3 is a partial side sectional view schematically illustrating a configuration of a scanner device.

As illustrated in FIGS. 2 and 3, the main body 32 of the scanner device 31 includes a box-like case 38 having an opening portion at a portion facing the document stand cover 34 illustrated in FIG. 1. The document stand 33 is formed in a manner that a large glass plate 40A having a quadrangle plate shape is fit into a large opening portion of the case 38. A reading window 39 is formed in a manner that a small glass plate 40B having a long quadrangle plate shape is fit into a small opening portion of the case 38. The glass plate 40A of the document stand 33 corresponding to a region on which an original document D to be read in a flat-bed manner is placed. The glass plate 40A has a size which is slightly wider than the maximum document size allowed to be read by the scanner device 31. The glass plate 40B of the reading window 39 is provided at a reading position at which an image of an original document D transported from the document transporting unit 35 is read. In the embodiment, in a case where the glass plates 40A and 40B for defining the position of an original document D are not particularly distinguished from each other, the glass plates 40A and 40B are referred to as "a glass plate 40". The glass plate 40 is an example of a transparent member that defines the position of an original document D.

The document stand cover 34 illustrated in FIG. 1 is pivotable between a closed state of pressing an original document D placed on the document stand 33 and an opened state when the original document D is set on the document stand 33 or the original document D after reading is removed, as illustrated in FIGS. 2 and 3. The scanner device 31 reads an original document D placed on the flat-bed type document stand 33. An original document D fed into the transport mechanism unit 37 by the document transporting unit 35 illustrated in FIG. 1 is sent out to a position which substantially faces the reading window 39 (see FIG. 3) on the back surface of the document stand cover 34 in the closed state. An image is read on the reading window 39, and then the original document D is discharged to the discharge region.

As described above, the scanner device 31 in the embodiment operates in two modes, that is, a flatbed (FB) mode of reading an original document D placed on the flat-bed type document stand 33 and an auto document feeder (ADF) of reading an original document D transported from the set tray 36 by the document transporting unit 35, at the reading position corresponding to the reading window 39 in the middle of being transported.

As illustrated in FIG. 2, a reading module 50 as an optical module and a transporting unit 60 are provided in the case 38. The optical module extends long in a main scanning direction X. The transporting unit 60 relatively moves the original document D (see FIG. 3) and the reading module 50 in a sub-scanning direction Y. The transporting unit 60 includes a carriage 61 and a driving mechanism 63. The carriage 61 has the reading module 50 mounted therein and is used for sensing. The driving mechanism 63 applies power for transporting (conveying) the carriage 61 along a guide rail 62 in the sub-scanning direction Y, to the carriage 61.

As illustrated in FIG. 2, the reading module 50 includes a linear light source 52 and a reading element 53. The linear light source 52 irradiates an original document D (see FIG. 3) with light through glass plates 40A and 40B. The reading element 53 is disposed in the main scanning direction X which is a direction of the linear light source 52 extending and reads an original document D by causing light from the original document D to be incident thereto. The reading module 50 moves along with the carriage 61 in the sub-scanning direction Y and then reads an original document D. The reading module 50 has a length which is equal to or more than the maximum assumed width of an original document D in a longitudinal direction (main scanning direction X). As an example, the length of the reading module 50 is set to have a value which is slightly larger than, for example, the A3 size (width of 320 mm) or the A4 size (width of 210 mm) as the maximum assumed width of an original document D.

As illustrated in FIG. 2, the driving mechanism 63 includes an electric motor 64 as a power source of the carriage 61 and a power transmission mechanism 65 that transmits power of the electric motor 64 to the carriage 61. The power transmission mechanism 65 includes an endless belt 69 which is wound around a driving pulley 66 and two driven pulleys 67 and 68 and pulls the carriage 61. The driving pulley 66 rotates by the power of the electric motor 64. The driven pulleys 67 and 68 are disposed at both end portions of a sheet metal member 32A extending along the guide rail 62. The carriage 61 is joined to a portion of a portion of the belt 69, which has been stretched parallel to the guide rail 62, with a joint 61A. If the electric motor 64 drives to rotate forward, the carriage 61 moves (forward) in a forward direction Y1. If the electric motor 64 drives to rotate backward, the carriage 61 moves (backward) in a backward direction Y2. The reading module 50 reads an original document D placed on the document stand 33 in the middle of the carriage 61 moving along the guide rail 62 in the sub-scanning direction Y. The reading module 50 on the carriage 61 is electrically connected to a control unit 100 accommodated in the device body 12, through a flexible cable 54. The reading module 50 performs a reading operation in accordance with a command signal from the control unit 100 and outputs a reading signal obtained by reading an image of an original document D to the control unit 100. The control unit 100 transfers reading data based on the reading signal to the host device (not illustrated).

In the document transporting unit 35 illustrated in FIG. 3, an original document is fed along a feeding path SP by a feeding roller (not illustrated) and plural pairs of feeding rollers 73 which constitute a portion of a feeding mechanism. The original document is pressed to the reading window 39 side, at the reading position in the middle of being transported, by the guide portion 34A. The original document is read by the reading module 50 on the carriage 61 through the glass plate 40B of the reading window 39. The original document which has been read is discharged to the outside of the device from the transport mechanism unit 37 along a discharge path EP by plural pairs of discharge rollers 74. As described above, in the ADF mode, a plurality of original documents D set in the set tray 36 (see FIG. 1) is fed into the transport mechanism unit 37 one by one, and is read at the reading position in the middle of a transport path FP by the reading module 50 on the carriage 61.

As illustrated in FIG. 3, a reading unit 51 is disposed in the transport mechanism unit 37. The reading unit 51 is capable of causing a reading module 50 to read a surface (back surface) of an original document, which is on an opposite side of a reading surface (front surface) of the original document, in the middle of the discharge path EP. Therefore, the scanner device 31 is capable of reading both surfaces of an original document in the ADF mode. A reading timing of an original document at the reading position by the reading module 50 is determined based on a detection signal of a first detection unit 76 capable of detecting the original document in the middle of being fed. A reading timing of the original document by the reading unit 51 is determined based on a detection signal of a second detection unit 77 capable of detecting the original document in the middle of being discharged. The reading module 50 similar to the reading module 50 on the carriage 61 is mounted in the reading unit 51.

As illustrated in FIG. 3, the reading module 50 mounted in the carriage 61 is disposed on an opposite side of a placing surface of an original document D in the glass plates 40A and 40B, and is positioned to face the back surfaces of the glass plates 40A and 40B. The reading module 50 includes the linear light source 52, the reading element 53, and a housing 55. The housing 55 accommodates the linear light source 52 and the reading element 53 in a state where light transmission and light receiving are possible. Two white reference plates 78 and 79 are disposed at the upper surface portion of the main body 32 (also see FIG. 1) of the scanner device 31. The white reference plates 78 and 79 are used as a reading target when white reference data for shading correction is obtained and have uniform reflection surfaces with high reflectance.

When a reading operation is performed in the FB mode, the carriage 61 indicated by a two-dot chain line in FIG. 3 moves in the forward direction Y1, and thereby an original document D on the glass plate 40A is read by the reading module 50. The carriage 61 after the original document D has been read moves from the position at which the reading has ended, in the backward direction Y2 and comes back to a standby position.

As described above, in the multifunction device 11, an original document D moves to the reading module 50 in the sub-scanning direction Y in the ADF mode, and the reading module 50 moves to the original document D on the glass plate 40A in the sub-scanning direction Y in the FB mode. Even in any mode of the ADF mode and the FB mode, the reading module 50 relatively moves to the original document D in the sub-scanning direction Y and reads an image of the original document D with a sensor 573 illustrated in FIG. 5. In the embodiment, the sub-scanning direction Y corresponds to a movement direction in which the reading module 50 relatively moves to the original document D as an example of a reading target. The main scanning direction X corresponds to an intersection direction intersecting the movement direction.

Figure 4:
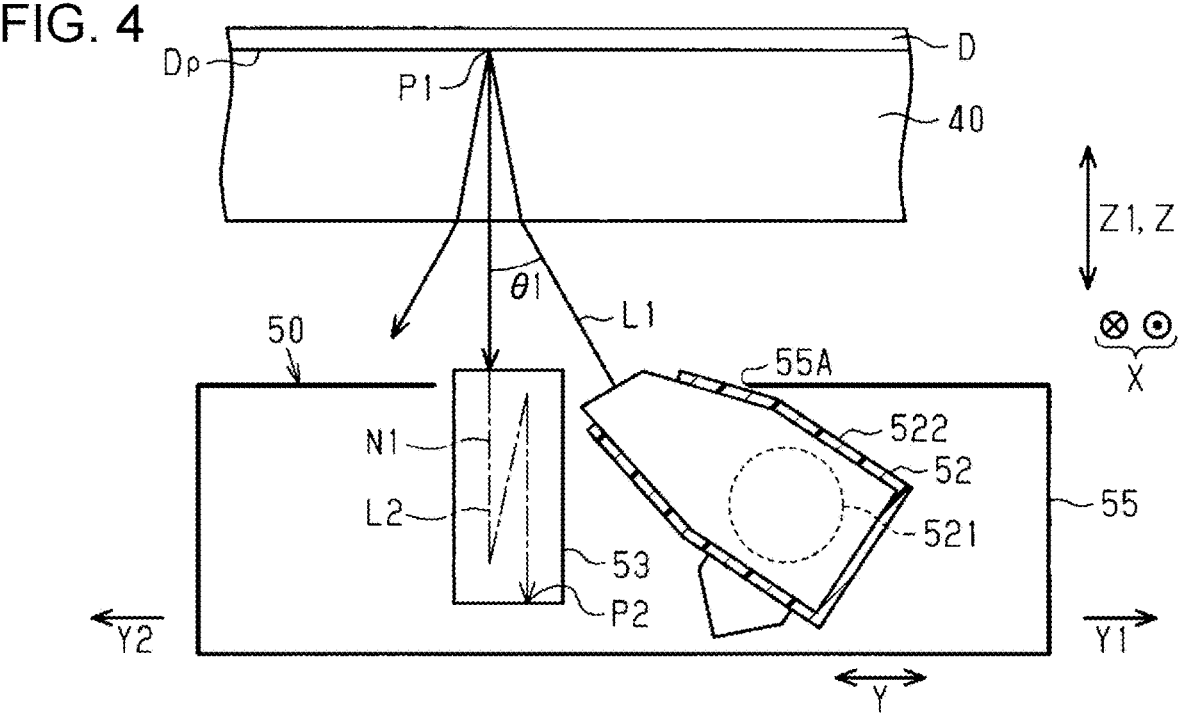
FIG. 4 is a schematic side view illustrating a configuration of a reading module.

Next, a detailed configuration of the reading module 50 will be described with reference to FIG. 4. As illustrated in FIG. 4, the reading module 50 that relatively moves to an original document D on the glass plate 40 includes the linear light source 52 and the reading element 53. The linear light source 52 irradiates the original document D with light through the glass plate 40. The reading element 53 condenses and receives light reflected from a reading surface Dp of the original document D. Light transmission of the linear light source 52 to the reading surface Dp and light receiving of reflected light from the reading surface Dp by the reading element 53 are possible through an opening 55A at a portion facing the glass plate 40.

The linear light source 52 illustrated in FIG. 4 is disposed at a posture in which a principal axis L1 of light in the linear light source 52 is inclined from a direction of a normal line N1 of the glass plate 40 or the reading surface Dp at an angle θ1. The linear light source 52 includes a luminous body 521 such as an LED and a light guide 522, for example, as a light guiding member that guides light emitted from the luminous body 521, in the main scanning direction X and guides the light in a direction of forming an angle θ1. The light guide 522 has a rod shape formed with transparent resin such as acrylic resin. The light guide 522 guides light from the luminous body 521 so as to illuminate a band-like area of the reading target at uniform brightness. As illustrated in FIG. 4, the principal axis L1 of light output from the light guide 522 forms a predetermined angle with the glass plate 40. Therefore, regular reflected light of an original document D is not incident to the reading element 53, and scattered reflected light from the original document D is incident to the reading element 53. A direction of a principal axis of light L2 which is reflected by the original document D and then incident to the reading element 53 is referred to as an optical axis direction Z1 of the reading element 53. In the example, the optical axis direction Z1 of the reading element 53 is identical to the vertical direction Z which is a direction perpendicular to the glass plate 40.

Figure 5:
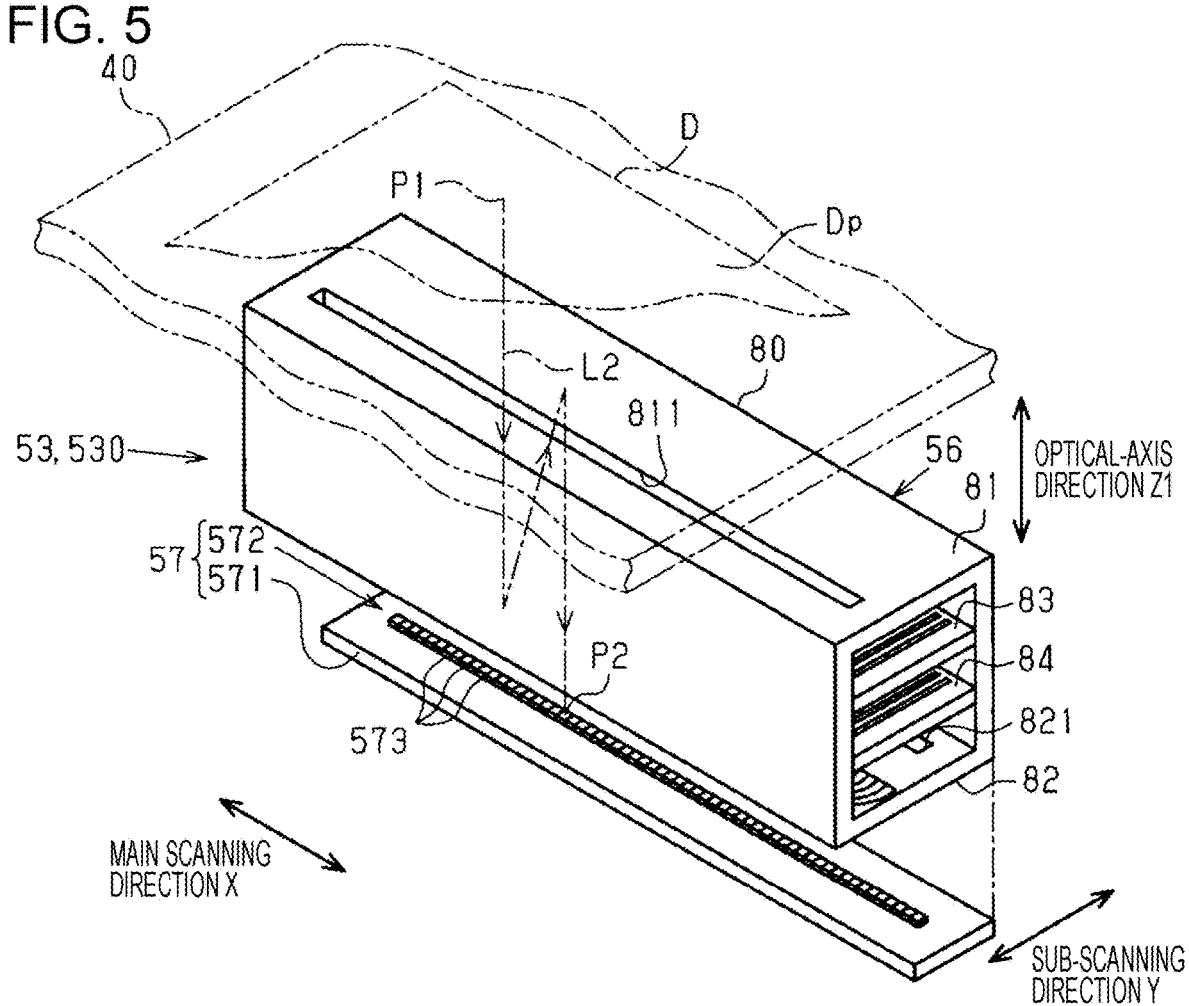
FIG. 5 is a perspective view schematically illustrating a configuration of a reading element.

FIG. 5 illustrates the reading element 53 in an example in which a contact image sensor module (also referred to as "a CISM" below) 530 is used as the reading module 50. The CISM 530 is a linear image sensor. As illustrated in FIG. 5, the reading element 53 constituting the CISM 530 is disposed in the main scanning direction X which is a direction of the linear light source 52 (see FIG. 4) extending. The reading element 53 includes an imaging optical mechanism 56 and a light receiving element 57. The imaging optical mechanism 56 causes scattered light which has been reflected from an original document D to be incident thereto and condenses the scattered light. The light receiving element 57 receives an image of light condensed by the imaging optical mechanism 56. The imaging optical mechanism 56 and the light receiving element 57 are mounted in the reading module 50 (CISM 530), in a state of extending in the main scanning direction X. The imaging optical mechanism 56 and the light receiving element 57 are disposed in an order from the component close to the glass plate 40. The imaging optical mechanism 56 faces the glass plate 40 at a relatively close position. The imaging optical mechanism 56 has a function of imaging scattered reflected light which has been incident from the reading surface Dp of an original document D, on a light receiving surface of the light receiving element 57. The imaging optical mechanism 56 is provided for imaging light incident to a slit 811, in the light receiving element 57.

The imaging optical mechanism 56 illustrated in FIG. 5 includes a casing 80 having a slit 811 which extends in the main scanning direction X. Constituent components of an imaging optical system are accommodated in the casing 80. Scattered light which has been reflected by an original document D is incident from the slit 811. Light L2 incident from the slit 811 is reflected twice on an optical path indicated by an arrow of a one-dot chain line in FIG. 5, in the imaging optical system in the casing 80. Then, the light L2 is emitted from a second slit 821 illustrated in FIG. 7, and then is imaged in the light receiving element 57. That is, an optical path length from an original document D to the light receiving element 57 is set to a focal distance, and an image of the reading surface Dp is formed in the light receiving element 57. In the CISM 530, incident light is reflected twice in the casing 80, and thereby a long optical path length is secured. Thus, the focal depth becomes deep.

The light receiving element 57 illustrated in FIG. 5 includes a substrate 571 and a sensor array 572 in which a plurality of sensors 573 is mounted on the substrate 571 to be arranged in line. The sensor array 572 includes a plurality (for example, 15500 pieces in a case of the A3 size (length of 310 mm)) of sensors 573 arranged in line in the main scanning direction X. With the sensor array 572, an image of "one line" in the main scanning direction X can be captured. In the embodiment, the sensor 573 configures an example of an imaging object.

Figure 6:
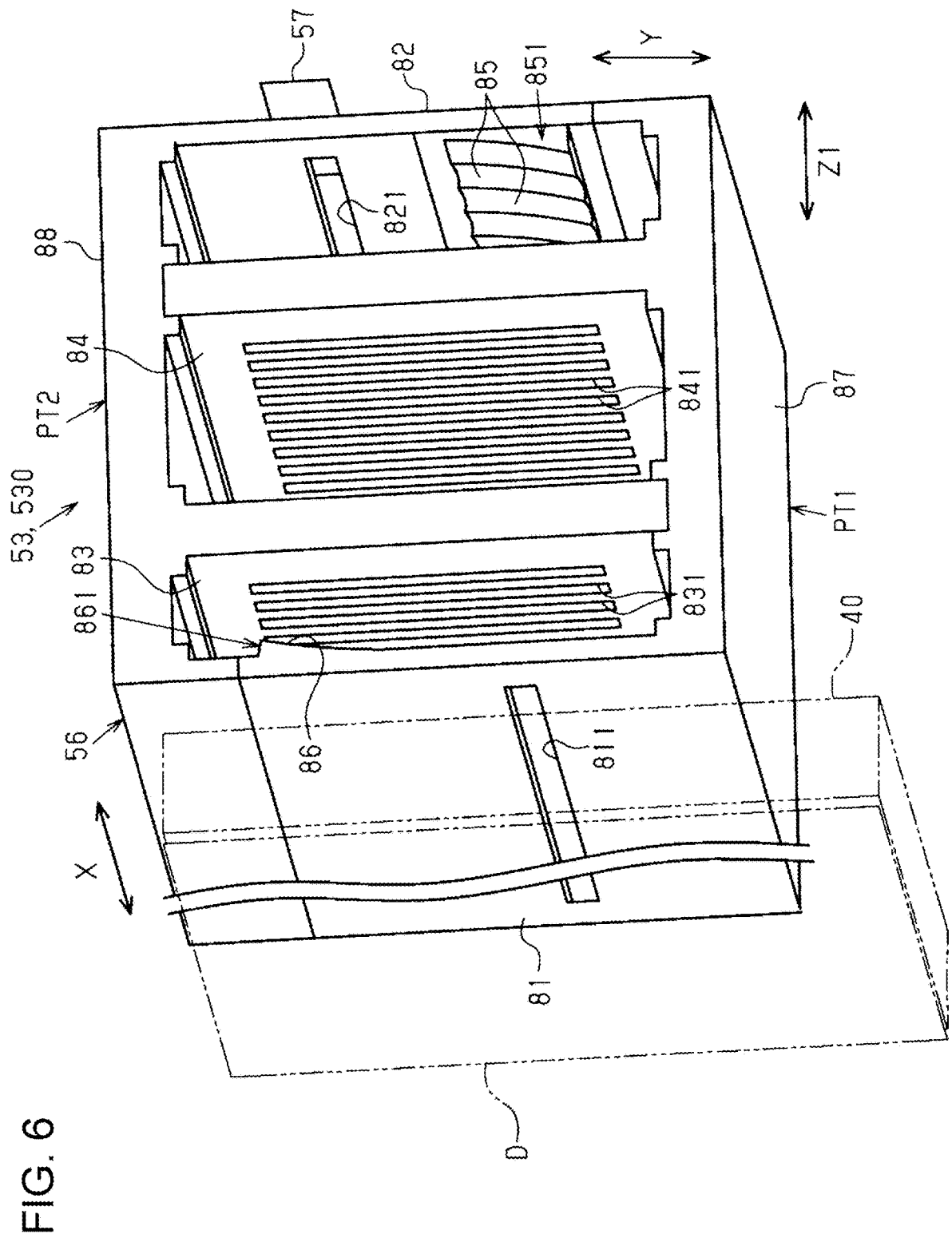
FIG. 6 is a perspective view schematically illustrating a configuration of an imaging optical mechanism.

The imaging optical mechanism 56 illustrated in FIG. 6 includes a first light blocking member 81, a second light blocking member 82, and a plurality of aperture members 83 and 84. The first light blocking member 81 has a plate shape and includes a first slit 811 for causing light to be incident thereto. The second light blocking member 82 has a plate shape and includes a second slit 821 for causing light to be emitted. The plurality of aperture members 83 and 84 is disposed to be spaced from each other between the first light blocking member 81 and the second light blocking member 82 in the optical axis direction Z1. In the example, the two aperture members 83 and 84 are provided. The two aperture members 83 and 84 are set as a first aperture member 83 and a second aperture member 84 in an order from an upstream side in a light incident direction. The first aperture member 83 includes a plurality of slits 831 opening at a predetermined pitch in the main scanning direction X. The second aperture member 84 also includes a plurality of slits 841 opening at a predetermined pitch in the main scanning direction X. The imaging optical mechanism 56 includes a first concave mirror array 851 and a second concave mirror array 861. The first concave mirror array 851 is an example of a first specular surface array in which first concave mirrors 85 as an example of first specular surfaces are arranged at a predetermined pitch in line in the main scanning direction X. The second concave mirror array 861 is an example of a second specular surface array in which second concave mirrors 86 as an example of second specular surfaces are arranged at a predetermined pitch in line in the main scanning direction X.

As illustrated in FIG. 6, the first light blocking member 81 and the second light blocking member 82 face each other in the vertical direction Z which is perpendicular to the reading surface Dp of an original document D. Two outer wall members 87 and 88 face each other in the sub-scanning direction Y. The members 81, 82, 87, and 88 constitute a quadrangle tubular casing which extends long in the main scanning direction X.

Figure 7:
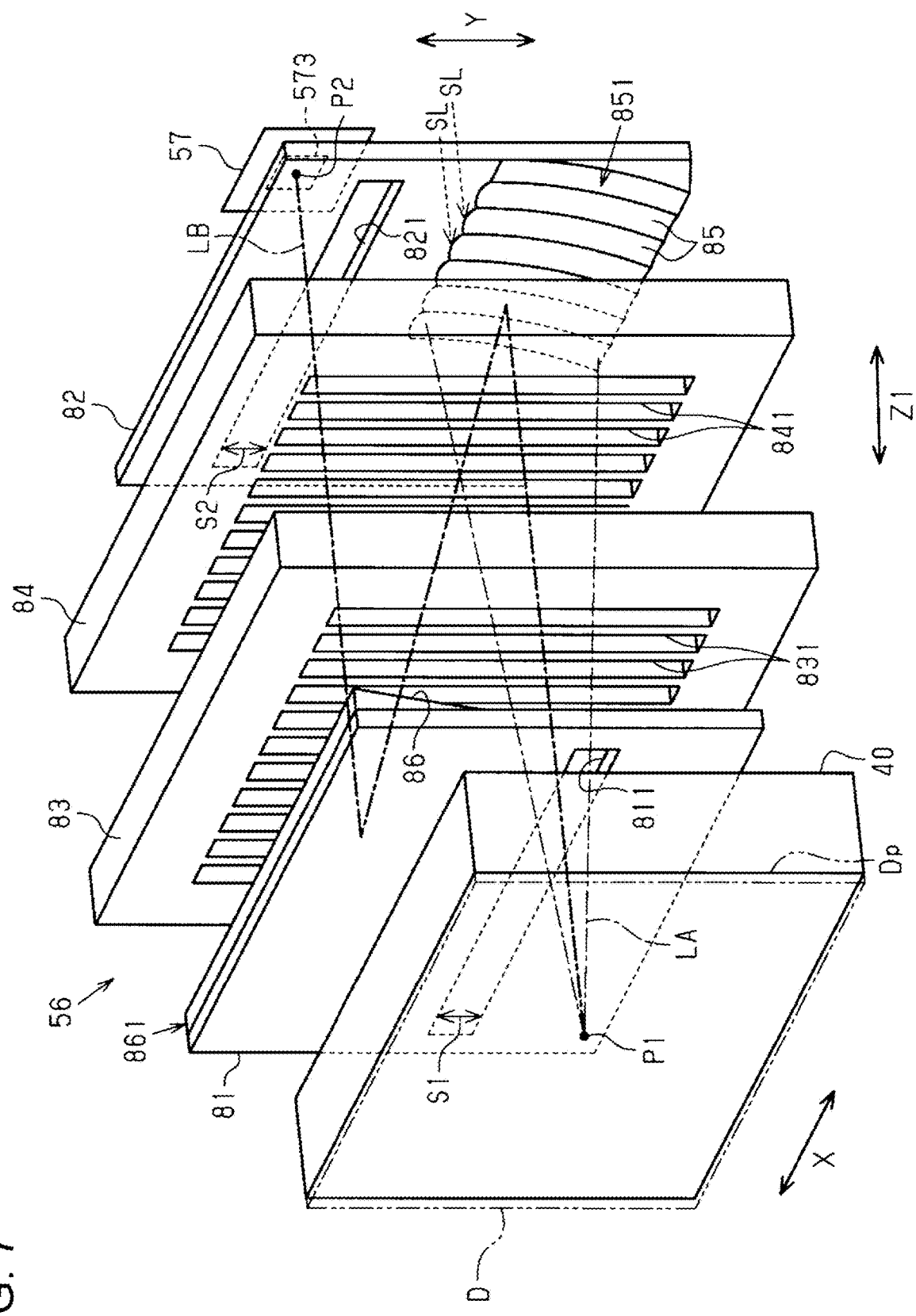
FIG. 7 is a perspective view illustrating a configuration of the imaging optical mechanism.
Figure 9:
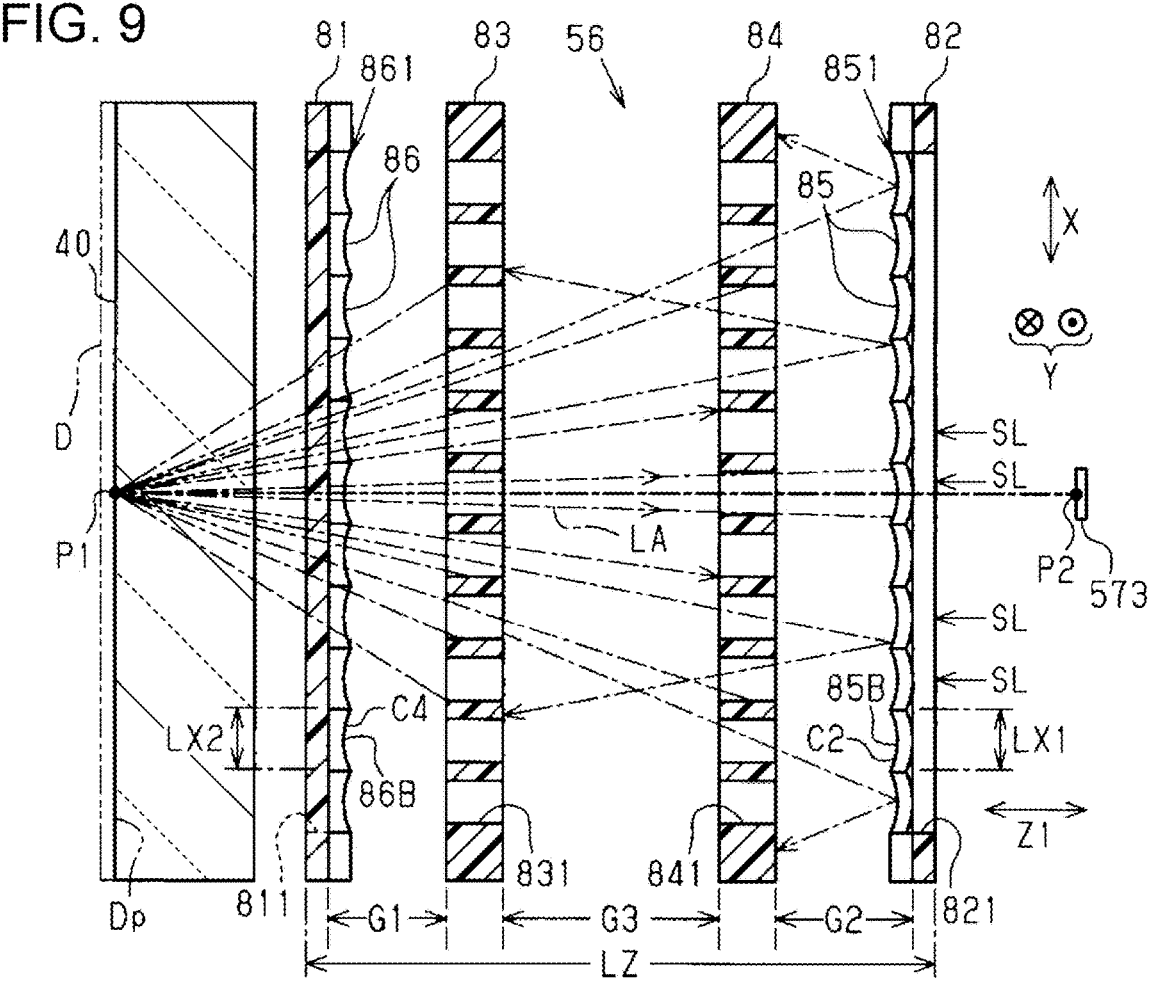
FIG. 9 is a side sectional view illustrating the configuration of the imaging optical mechanism.

FIG. 7 illustrates the main configuration for an imaging function in the imaging optical mechanism 56 with omitting illustrations of the outer wall members 87 and 88 in the casing 80. FIGS. 7, 9, and the like illustrate a configuration in which the overall length of the imaging optical mechanism 56 in the main scanning direction X is schematically shorter than the practical length thereof. As illustrated in FIGS. 6 and 7, the first light blocking member 81 facing the glass plate 40 on which an original document D is placed has a quadrangular plate shape. In the first light blocking member 81, the first slit 811 which extends in the main scanning direction X, is penetrated in the optical axis direction Z1, and is used for causing light to be incident thereto opens. In the configuration in the example, the first slit 811 has a length corresponding to the width of an original document D as the reading target in the main scanning direction X, and has a width having a predetermined value in a range of, for example, 0.5 mm to 1 mm in the sub-scanning direction Y. The second light blocking member 82 has a quadrangular plate shape similar to the first light blocking member 81 and is disposed at a position which faces the first light blocking member 81 to be spaced at a predetermined distance from the glass plate 40. In the second light blocking member 82, the second slit 821 extending in the main scanning direction X opens at a position shifted from the first slit 811 in the sub-scanning direction Y. The second slit 821 has an opening shape and an opening size which are similar to those of the first slit 811. That is, the second slit 821 has a length corresponding to the width of an original document D as the reading target in the main scanning direction X, and has a width having a predetermined value in a range of, for example, 0.5 mm to 1 mm in the sub-scanning direction Y.

Figure 8:
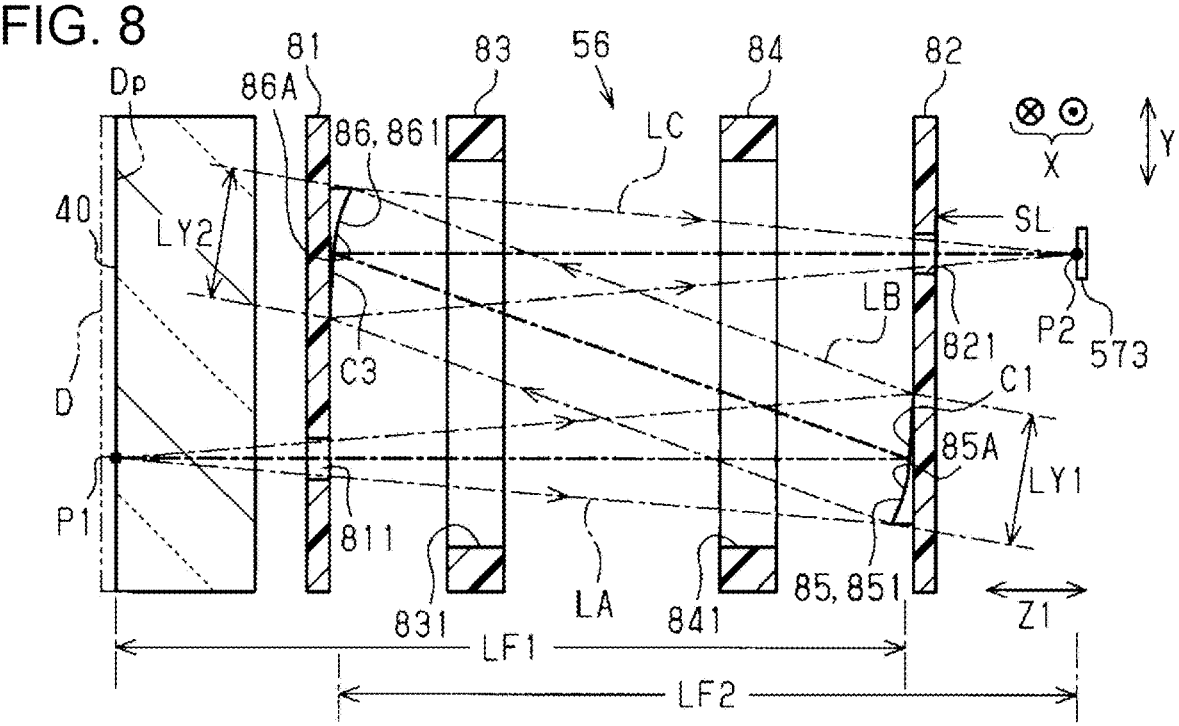
FIG. 8 is a front sectional view illustrating the configuration of the imaging optical mechanism.

As illustrated in FIGS. 7 to 9, the second light blocking member 82 includes the first concave mirror array 851 at a position facing the first slit 811 of the first light blocking member 81. In the first concave mirror array 851, the plurality of first concave mirrors 85 is arranged at a predetermined pitch in a line in the main scanning direction X. The first concave mirror 85 reflects light incident from an original document D.

As illustrated in FIGS. 7 to 9, the first light blocking member 81 includes the second concave mirror array 861 at a position facing the second slit 821 of the second light blocking member 82. In the second concave mirror array 861, the plurality of second concave mirrors 86 is arranged at a predetermined pitch in a line in the main scanning direction X. The second concave mirror 86 is disposed at a position shifted from the first concave mirror 85 in the sub-scanning direction Y which is a relative movement direction of the reading module 50. The second concave mirror 86 reflects and emits light reflected by the first concave mirror 85.

As illustrated in FIGS. 7 to 9, the first aperture member 83 and the second aperture member 84 having a lattice shape are disposed between the first light blocking member 81 and the second light blocking member 82, so as to be parallel to each other in a state of being spaced at a predetermined gap. A gap G1 (FIG. 9) between the first light blocking member 81 and the first aperture member 83, a gap G2 (FIG. 9) between the second aperture member 84 and the second light blocking member 82, and a gap G3 (FIG. 9) between the first aperture member 83 and the second aperture member 84 are set to a distance as long as stray light is suppressed. The stray light in incident light disturbs forming of an image at a reading target position P1 in the sensor 573. That is, the relative positions of the plurality of aperture members 83 and 84 in the optical axis direction Z1 are set to be positions allowing the stray light to be effectively suppressed, between the first light blocking member 81 and the second light blocking member 82. The first light blocking member 81, the first aperture member 83, the second aperture member 84, and the second light blocking member 82 are disposed to be parallel to each other at the gaps G1 to G3 in the optical axis direction Z1.

The first aperture member 83 includes the plurality of slits 831 which has a predetermined width, is disposed at a predetermined pitch in the main scanning direction X, and is long holes extending with a predetermined length in the sub-scanning direction Y. The second aperture member 84 has the same shape and the same size as those of the first aperture member 83. The second aperture member 84 includes the plurality of slits 841 which has a predetermined width, is disposed at a predetermined pitch in the main scanning direction X, and is long holes extending with a predetermined length in the sub-scanning direction Y. The slits 831 and 841 are positioned to correspond to the concave mirrors 85 and 86 in the optical axis direction Z1, respectively.

As illustrated in FIGS. 7 and 8, the first light blocking member 81 has a slit 811 at a position facing the first concave mirror 85. The slit 811 is disposed on a path in which light incident from the reading target position P1 travels toward the first aperture member 83 which is disposed on an incident side (original document D side) of light among the plurality of aperture members 83 and 84. The second light blocking member 82 has a slit 821 at a position facing the second concave mirror 86. The slit 821 is disposed on a path in which light reflected by the second concave mirror 86 passes through the second aperture member 84 disposed on a side close to the sensor 573 among the plurality of aperture members 83 and 84 and travels toward the sensor 573.

Widths S1 and S2 of the slits 811 and 821 of the first light blocking member 81 and the second light blocking member 82 in the sub-scanning direction Y are set to values in a range of 0.5 mm to 1.0 mm as an example. The widths are 0.7 mm, for example. If the widths S1 and S2 of the slits 811 and 821 in the sub-scanning direction Y are large, stray light does not abut on the first concave mirror 85, and but passes through the slit 821, and then is incident to the sensor 573. Alternatively, light reflected by an inner wall surface of the second light blocking member 82 other than the first concave mirror 85 is incident to the second concave mirror 86, and acts as the cause of stray light. If the width S1 of the slit 811 is too small, the quantity of light incident to the first concave mirror 85 becomes small, and an image of light formed in the sensor 573 becomes dark. Therefore, the width S1 of the slit 811 is set to have a value allowing the entirety of the region of the first concave mirror 85 in the sub-scanning direction Y to be irradiated with light from the slit 811. The slit 811 of the first light blocking member 81 opens in a length range allowing light to be incident to the first concave mirror array 851 in the main scanning direction X. The stray light is not a problem if the sensor 573 does not receive the stray light.

As illustrated in FIG. 8, in the plurality of aperture members 83 and 84, the slits 831 and 841 open in a range covering a path in which light LA incident from an original document D in the sub-scanning direction Y travels toward the first concave mirror 85, a path in which light LB reflected by the first concave mirror 85 travels toward the second concave mirror 86, and a path in which light LC reflected by the second concave mirror 86 travels toward the sensor 573.

The slits 831 and 841 of the two aperture members 83 and 84 are positioned to face the first concave mirror 85 and the second concave mirror 86 in the optical axis direction Z1. Therefore, the width center of each of the slits 831 and 841 in the main scanning direction X coincides with the width center of each of the first concave mirror 85 and the second concave mirror 86. The slits 831 and 841 are arranged at a pitch which is equal to the pitch of the first concave mirror 85 and the second concave mirror 86. The widths of the slits 831 and 841 in the main scanning direction X are set to be dimensions causing light which passes through the slit 831 among rays of scattered light incident from the slit 811 and further passes through the slit 841 at the same position in the main scanning direction X to be applied to the range of the first concave mirror 85 in the main scanning direction X and not to be applied to portions other than the above range.

Here, if the widths of the slits 831 and 841 in the main scanning direction X are too wide, an effect of suppressing stray light is deteriorated. If the widths of the slits 831 and 841 in the main scanning direction X are too narrow, the stray light can be suppressed, but an image formed in the sensor 573 becomes dark. The relative positions and gaps of the two aperture members 83 and 84 to the first light blocking member 81 and the second light blocking member 82 in the optical axis direction Z1 are set such that light can be blocked at portions of the aperture members 83 and 84 other than the slits 831 and 841 and stray light reaching the sensor 573 can be effectively suppressed.

For example, if one aperture member is provided, it is necessary that the aperture member becomes thicker in the optical axis direction Z1 in order to suppress stray light. In this case, the width of the slit becomes 1 mm and the thickness thereof becomes about 10 mm. Thus, manufacturing in injection molding has a difficulty, and the quantity of stray light increases by reflection from a wall surface of the slit. Therefore, in the embodiment, the plurality of aperture members 83 and 84 are disposed between the two light blocking members 81 and 82, at a gap in the optical axis direction Z1. Thus, the total thickness of the aperture members 83 and 84 in the optical axis direction Z1 is relatively reduced, and stray light which has passed through the one aperture member is blocked more on the front surface of the one aperture member. One aperture member may be provided so long as stray light is suppressed so as to form an image having required contrast and to obtain a required resolution. A plurality of aperture members means that a plurality of aperture portions being plate-like portions which have a slit in which the width in the sub-scanning direction Y is wider than the width in the main scanning direction X is disposed at a position between the first concave mirror 85 and the second concave mirror 86 in the optical axis direction Z1, at a gap. For example, in the specification, even though the aperture member is configured with one component obtained by integrally forming two aperture members 83 and 84, if two aperture portions are disposed at a gap in the optical axis direction Z1, the number of the plurality of aperture members 83 and 84 is considered as being two.

An anti-reflection treatment for suppressing regular reflected light by scattering light reflected by the surfaces is performed on inner wall surfaces of the first light blocking member 81 and the second light blocking member 82 and wall surfaces of the aperture members 83 and 84. The anti-reflection treatment is a black matting treatment or a sand blasting treatment. For example, the light blocking members 81 and 82 and the aperture members 83 and 84 are formed with black synthetic resin or are obtained by performing a sand blasting treatment or black matting coating on surfaces of the members 81 to 84 after molding. In a case where the sand blasting treatment is performed, synthetic resin used for molding may have any color, but a color having low brightness is preferable. After molding with black synthetic resin has been performed, it is preferable that the sand blasting treatment be performed on the surface.

As illustrated in FIG. 8, the first concave mirror 85 and the second concave mirror 86 are disposed at positions shifted in the sub-scanning direction Y so as not to overlap each other. As illustrated in FIG. 9, the first concave mirror 85 and the second concave mirror 86 are disposed at positions overlapping each other in the main scanning direction X. As illustrated in FIG. 8, the first light blocking member 81 is integrally formed with the second concave mirror 86 in a state of being adjacent to the second concave mirror 86 in a first direction of the second concave mirror 86 in the sub-scanning direction Y. The second light blocking member 82 is integrally formed with the first concave mirror 85 in a state of being adjacent to the first concave mirror 85 in a second direction of the first concave mirror 85 in the sub-scanning direction Y. Here, the first direction and the second direction are directions which are opposite to each other in the sub-scanning direction Y. In the example illustrated in FIGS. 2 and 4, the first direction is set as a backward direction Y2, and the second direction is set as a forward direction Y1. Therefore, a position relationship in which the first concave mirror 85 faces the slit 811 of the first light blocking member 81 in the optical axis direction Z1, and the second concave mirror 86 faces the slit 821 of the second light blocking member 82 in the optical axis direction Z1 is made.

The first concave mirror 85 and the second concave mirror 86 are provided at a pitch equal to a pitch of the sensor 573 in the main scanning direction X such that the number of concave mirrors 85 and 86 is equal to the number of sensors 573. That is, the positions of the concave mirrors 85 and 86 constituting the concave mirror arrays 851 and 861 illustrated in FIGS. 7 and 9 and the pitch between the concave mirrors 85 and 86, in the main scanning direction X, are set to match with positions of the sensors 573 constituting the sensor array 572 illustrated in FIG. 5 and the pitch between the sensors 573, in the main scanning direction X. 15500 sensors 573 are disposed if the A3 size (length of 310 mm) at a width of 20 μm per one pixel is provided. An image formed in the adjacent concave mirror in the main scanning direction X overlaps a portion of an image formed in the adjacent concave mirror, and thus imaging is performed on the overall width of an original document without breaks. For example, if an image is read with RGB colors, three sensor arrays 572 are disposed independently for RGB. As illustrated in FIG. 8, both the concave mirrors 85 and 86 are inclined, at a predetermined inclination angle, so as to cause both the concave surfaces to face each other with respect to a virtual surface orthogonal to the optical axis direction Z1 such that reflected light obtained by reflecting incident light by the first concave mirror 85 travels toward the second concave mirror 86, and reflected light obtained by further reflecting the reflected light by the second concave mirror 86 travels toward the sensor 573. The positions of the slits 831 and 841 and the pitch between the slits 831 and 841 in the main scanning direction X are identical to positions of the concave mirrors 85 and 86 and the pitch between the concave mirrors 85 and 86 in the main scanning direction X.

As illustrated in FIG. 9, in the imaging optical mechanism 56 in the embodiment, a unit imaging element SL is configured by a portion which constitutes one set of concave mirrors 85 and 86 (having the same position in the main scanning direction X) and one set of slits 831 and 841 (having the same position in the main scanning direction X) and corresponds to one width of an array pitch in the main scanning direction X. The imaging optical mechanism 56 is configured in a manner that a plurality of unit imaging elements SL is arranged in a line in the main scanning direction X. The first concave mirrors 85 and the second concave mirrors 86 are set to have a pitch dimension of a value, for example, in a range of 1.0 mm to 3.0 mm, in the main scanning direction X. As an example, the concave mirrors 85 and 86 are arranged at a pitch of 1.6 mm. The pitch of the slits 831 and 841 in the main scanning direction X is equal to the pitch of the concave mirrors 85 and 86, that is, 1.6 mm.

As illustrated in FIG. 8, the width S1 (see FIG. 7) of the first slit 811 in the sub-scanning direction Y and the length LY1 of the first concave mirror 85 in the sub-scanning direction Y are set such that light LA which has passed through the first slit 811 from the reading target position P1 of an original document and has spread is applied to a range of the first concave mirror 85 in the sub-scanning direction Y. That is, light incident from an original document D is restricted in the sub-scanning direction Y, and thereby the width S1 of the slit 811 in the first light blocking member 81 in the sub-scanning direction Y is set to correspond to a length which permits passing of light applied to the range of the first concave mirror 85 in the sub-scanning direction Y and restricts passing of light applied to portions other than the range of the first concave mirror 85. That is, as illustrated in FIG. 8, an inner end portion of the slit 811 formed in the first light blocking member 81, in the sub-scanning direction Y, is disposed at a position of blocking light which travels toward portions other than the first concave mirror 85 disposed to face the slit 811. As illustrated in FIGS. 7 and 9, the slit 811 of the first light blocking member 81 opens in a length range allowing light to be incident to the first concave mirror array 851 in the main scanning direction X.

Figure 11:
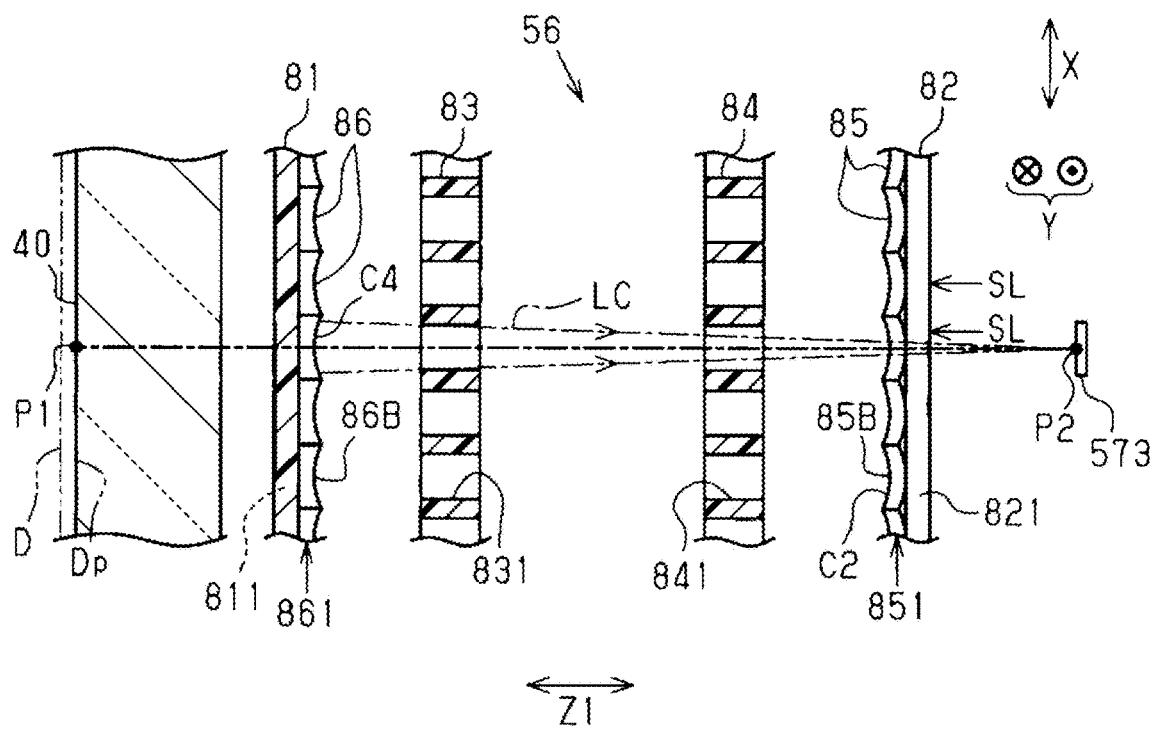
FIG. 11 is a side sectional view illustrating light reflected by a second concave mirror in the main scanning direction.

As illustrated in FIG. 8, the length LY2 of the second concave mirror 86 in the sub-scanning direction Y is set such that parallel light LB reflected by the first concave mirror 85 is applied to the range of the second concave mirror 86 in the sub-scanning direction Y. The width S2 (illustrated in FIG. 7) of the slit 821 of the second light blocking member 82 in the sub-scanning direction Y is set to correspond to the length allowing light LC reflected by the second concave mirror 86 to pass through the slit. That is, the inner end portion of the slit 821 formed in the second light blocking member 82, in the sub-scanning direction Y, is disposed at a position of blocking light from portions other than the second concave mirror 86 disposed to face the slit 821. As illustrated in FIGS. 7, 9, and 11, the slit 821 of the second light blocking member 82 opens in a length range allowing light reflected by the second concave mirror array 861 in the main scanning direction X to be imaged in the sensor array 572.

As illustrated in FIG. 9, the length LX1 of the first concave mirror 85 in the main scanning direction X is substantially equal to the length of the pitch of the sensor 573 in the main scanning direction X. The length LX2 of the second concave mirror 86 in the main scanning direction X is substantially equal to the length of the pitch of the sensor 573 in the main scanning direction X. As illustrated in FIGS. 8 and 9, the first concave mirror 85 and the second concave mirror 86 are formed to cause the lengths LY1 and LY2 of the first concave mirror 85 and the second concave mirror 86 in the sub-scanning direction Y to be longer than the lengths LX1 and LX2 thereof in the main scanning direction X.

At the position of the sensor 573, an image of an original document D in the sub-scanning direction Y is formed to be an inverted image, and an image of an original document D in the main scanning direction X is formed to be an erected image. In the light receiving element 57 constituting a line sensor, images on the adjacent sensors 573 are required to be joined to each other in the main scanning direction X which is a line direction of the sensor array 572. Thus, an equal-magnification erected image is formed. On the contrary, the type regarding the sub-scanning direction Y (movement direction) is not limited, and thus an equal-magnification inverted image is formed. The imaging optical mechanism 56 is not an axisymmetric optical system but a Z-type optical system in the sub-scanning direction Y. Thus, generally, an optical design thereof is difficult. On the contrary, in the embodiment, an inverted image is formed in the sub-scanning direction Y, and curvatures of the concave mirrors 85 and 86 in the sub-scanning direction Y are set to be small. Therefore, it is possible to reduce aberration and it is easy to design the imaging optical mechanism 56.

As illustrated in FIG. 9, the width of the slits 831 and 841 in the plurality of aperture members 83 and 84 in the main scanning direction X is set such that light LA incident to the optical axis direction Z1 from the reading target position P1 of an original document D passes through the one corresponding set of plurality of slits 831 and 841 and is applied in a range of the width of the first concave mirror 85 in the main scanning direction X, and stray light out of the range of the width is blocked. As illustrated in FIG. 9, for example, light which has passed through the slit 811 of the first light blocking member 81 and has been incident among rays of scattered light from the reading target position P1 and is indicated by a one-dot chain line in FIG. 9 is blocked by portions of the plurality of aperture members 83 and 84 other than the slits 831 and 841. Even if the light passes through the slits 831 and 841 and then is reflected by the first concave mirror 85, the reflected stray light is blocked by portions of the aperture members 83 and 84 other than the slits 831 and 841. Therefore, finally, stray light which passes through the slit 821 of the second light blocking member 82 and then reaches the sensor 573 corresponding to another unit imaging element SL is hardly provided.

Figure 10:
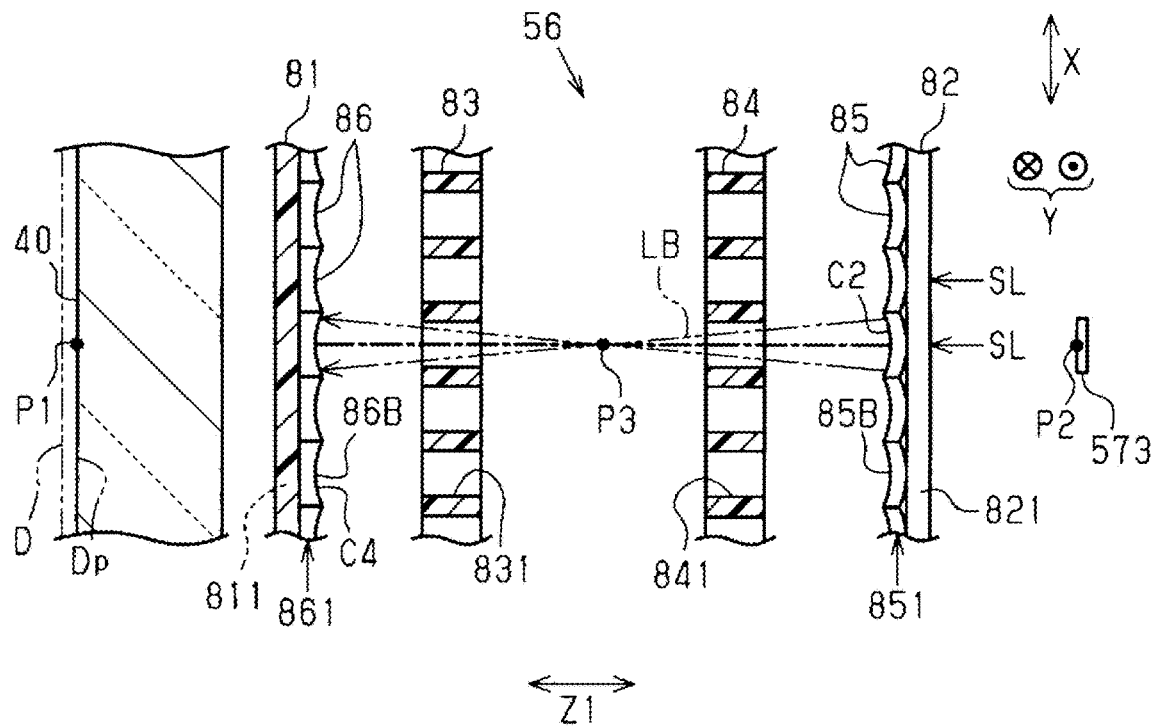
FIG. 10 is a side sectional view illustrating light reflected by a first concave mirror in a main scanning direction.

As illustrated in FIG. 8, the first concave mirror 85 has a first concave surface 85A formed by a concave surface having a first curvature C1 allowing light which has been widely incident from an original document D to be reflected as parallel light LB in the sub-scanning direction Y. As illustrated in FIG. 9, the first concave mirror 85 has a second concave surface 85B formed by a concave surface having a second curvature C2 allowing light LA which has been widely incident from an original document D to be reflected by the first concave mirror 85 and allowing the reflected light LB to be reflected in the main scanning direction X such that the light LB is imaged at a condensing position P3 positioned in the middle between the first concave mirror 85 and the second concave mirror 86, as illustrated in FIG. 10. Here, the first concave surface 85A illustrated in FIG. 8 indicates a concave surface shape of a section obtained by taking the first concave mirror 85 along a virtual surface orthogonal to the main scanning direction X. The second concave surface 85B illustrated in FIGS. 9 and 10 indicates a concave surface shape of a section obtained by taking the first concave mirror 85 along a virtual surface orthogonal to the sub-scanning direction Y.

As illustrated in FIG. 8, the second concave mirror 86 has a third concave surface 86A formed by a concave surface having a third curvature C3. The third curvature C3 allows parallel light LB which has been reflected by the first concave mirror 85 and then incident thereto in the sub-scanning direction Y to be reflected such that the light LB is imaged at a position P2 of the sensor 573. As illustrated in FIG. 11, the second concave mirror 86 has a fourth concave surface 86B formed by a concave surface having a fourth curvature C4. The fourth curvature C4 allows light LB which has been imaged at the condensing position P3 between the second concave mirror 86 and the first concave mirror 85 and then incident thereto in the main scanning direction X (intersection direction) to be reflected such that the light LB is imaged at the imaging position P2 of the sensor 573. Here, the third concave surface 86A indicates a concave surface shape of a section obtained by taking the second concave mirror 86 along a virtual surface orthogonal to the main scanning direction X. The fourth concave surface 86B indicates a concave surface shape of a section obtained by taking the second concave mirror 86 along a virtual surface orthogonal to the sub-scanning direction Y.

The smallest thickness of a partition wall portion corresponding to a portion of the adjacent gap between the slits 831 (the slits 841) in the aperture members 83 and 84, in the main scanning direction X, is determined to have a predetermined value so as to secure a limit on molding and required strength. If the pitches of the slits 831 and 841 are large, the opening width in the main scanning direction X can be widened, and thus a bright image is obtained. However, a field depth and a focal depth become shallow, and unevenness in the quantity of light occurs largely, and thus stray light is generated. Therefore, if the pitch is reduced as small as possible, that is, set to have a value, for example, in a range of 1.0 mm to 2.6 mm, the field depth and the focal depth become deep, and a high resolution is obtained. Therefore, even though, for example, the reading surface Dp is slightly shifted in the optical axis direction Z1 by an original document D slightly floating from the glass plate 40, it is possible to reduce blurring of an image small, and to secure the required high resolution.

If the thickness of the partition wall portions of the aperture members 83 and 84 in the main scanning direction X is subtracted from the dimension of the pitch, the resultant corresponds to a dimension of an opening of the slits 831 and 841 in the main scanning direction X. The thickness of the partition wall portion in the main scanning direction X is about 0.4 mm in minimum from limits on molding and has a value in a range of 0.4 mm to 0.6 mm as an example. The width of the partition wall portion may be 0.2 mm or 0.3 mm so long as such a partition wall portion can be manufactured, and the required strength is obtained. However, stray light is generated, and ghost occurs in an image. As described above, the opening width of the slits 831 and 841 in the main scanning direction X is equal to or smaller than the pitch width by reason of limits on the minimum thickness of the partition wall portion, the required field depth and focal depth, and suppression of stray light. As an example, the opening width thereof has a value in a range of 0.4 mm to 2.0 mm. The thickness of the aperture members 83 and 84 in the optical axis direction Z1 has a value, for example, in a range of 1.0 mm to 2.0 mm, and may be 1.5 mm as an example. If the aperture members are thick, a large quantity of stray light is generated by reflection on the inner walls of the aperture members 83 and 84. If the aperture members are thin, it is not possible to block stray light only by the front and rear aperture members 83 and 84.

If the pitches of the slits 831 and 841 are reduced, the total number of the slits increases. However, since it is necessary that the minimum thickness of the partition wall portions of the aperture members 83 and 84 is secured, the proportion of the partition wall portion in the main scanning direction X increases. As a result, the proportion of the slits 831 or 841 decreases. This causes an image formed in the sensor 573 to become dark. In addition, since the total area of the inner walls of the aperture members 83 and 84 increases, the quantity of stray light also increases.

Therefore, the brightness of an image is supplemented by widening the opening width of the slits 831 and 841 in the sub-scanning direction Y and lengthening the lengths LY1 and LY2 of the first concave mirror 85 and the second concave mirror 86 in the sub-scanning direction Y The lengths LY1 and LY2 of the first concave mirror 85 and the second concave mirror 86 in the sub-scanning direction Y are set to be values in a range of 2.5 mm to 4.5 mm as an example. In the embodiment, the lengths LY1 and LY2 are 3.6 mm as an example.

The lengths LY1 and LY2 of the concave mirrors 85 and 86 in the sub-scanning direction Y are long. Thus, in order to secure the field depth and the focal depth having a required depth, it is not possible to largely increase the curvatures C1 and C3 of the concave surfaces 85A and 86A of the concave mirrors 85 and 86 in the sub-scanning direction Y That is, if the curvatures C1 and C3 of the concave surfaces 85A and 86A of the concave mirrors 85 and 86 in the sub-scanning direction Y are set to be large, an image is blurred in the sub-scanning direction Y. Thus, the curvatures C1 and C3 are required to be small.

Therefore, imaging in the sub-scanning direction Y is performed to form an inverted image because the curvatures C1 and C3 of the concave surfaces 85A and 86A of the concave mirrors 85 and 86 in the sub-scanning direction Y can be reduced. For example, if an erected image is also formed in the sub-scanning direction Y similarly to the main scanning direction X, it is necessary that the curvatures C1 and C3 of the concave surfaces 85A and 86A of the concave mirrors 85 and 86 in the sub-scanning direction Y increase and imaging is performed in a manner that rays of light cross each other at an intermediate position between the concave mirrors 85 and 86. In this, aberration increases, and the focal depth becomes shallow. Thus, in the embodiment, since an inverted image is formed in the sub-scanning direction Y, the field depth and the focal depth having a required depth in the sub-scanning direction Y are secured, and the aberration is suppressed small.

If, for example, a lens type such as an SLA is used, light is refracted and then condensed. Thus, chromatic aberration occurs. If the chromatic aberration occurs, a focal position varies depending on RGB rays of light, and thus it is necessary that the focal distance corresponding to the greatest common divisor in the RGB rays of light is set. Therefore, the focal depth becomes shallow in full color. On the contrary, the imaging optical mechanism 56 in the embodiment uses the light condensing phenomenon occurring by reflection of the concave mirrors 85 and 86, regardless of the refractive index of a substance. Thus, the chromatic aberration does not occur. Therefore, it is possible to reduce an occurrence of the chromatic aberration in principle, in comparison to the lens type.

If the relative positions of the members 81 to 84 of the imaging optical mechanism 56 in the optical axis direction Z1 are shifted from design positions, stray light to be incident from a unit imaging element SL is easily generated in another unit imaging element SL. Therefore, if two components PT1 and PT2 which have been integrally formed are assembled, it is possible to suppress an occurrence of position shift of the relative positions of the members 81 to 84 in the optical axis direction Z1 and to suppress generation of stray light. Since configuring with the two components PT1 and PT2 which have been integrally formed is performed, various dimensions are set.

As illustrated in FIG. 8, the imaging optical mechanism 56 is an equal-magnification optical system. Thus, the imaging optical mechanism can be set to be axisymmetric with respect to an axis passing through an intermediate point of the center ray among rays LB of light, in the main scanning direction X (direction perpendicular to a paper surface). Therefore, the gap G1 between the first light blocking member 81 and the first aperture member 83 can be equal to the gap G2 between the second light blocking member 82 and the second aperture member 84 (G1=G2). The thicknesses of the plurality of aperture members 83 and 84 can also be equal to each other. The second concave mirror 86 causes the reflected light to be imaged at an optical distance LF2 which is equal to an optical distance LF1 between an original document D and the first concave mirror 85. As illustrated in FIGS. 8 and 9, the first concave mirror 85 and the second concave mirror 86 can be set to have a common shape. That is, the lengths LY1 and LY2 in the sub-scanning direction Y are equal to each other (LY1=LY2), and the lengths LX1 and LX2 in the main scanning direction X are equal to each other (LX1=LX2). The first curvature C1 is equal to the third curvature C3, and the second curvature C2 is equal to the fourth curvature C4. As illustrated in FIG. 6, the first light blocking member 81 and the first aperture member 83 are integrally formed, and the second light blocking member 82 and the second aperture member 84 are integrally formed.

In the example illustrated in FIG. 6, the imaging optical mechanism 56 is configured with a first component PT1 and a second component PT2. The first component PT1 is configured by integrally forming the first light blocking member 81, the second aperture member 84, and the plate-like outer wall member 87. The second component PT2 is configured by integrally forming the second light blocking member 82, the first aperture member 83, and the plate-like outer wall member 88. The first component PT1 and the second component PT2 are the same components having the same shape and the same size. That is, the imaging optical mechanism 56 is manufactured by assembling the two same components PT1 and PT2. For example, the two components PT1 and PT2 are manufactured in a manner that metal is evaporated on a surface of a portion for forming a concave mirror so as to form the first concave mirror array 851 and the second concave mirror array 861, in a resin-molded component obtained by injection molding with synthetic resin. Since the imaging optical mechanism 56 is configured by assembling the two components PT1 and PT2, dimension accuracy of the gap between the first light blocking member 81 and the second aperture member 84 in the optical axis direction Z1 and the gap between the second light blocking member 82 and the first aperture member 83 in the optical axis direction Z1 is secured. Therefore, it is possible to perform positioning of the relative positions of the four members 81 to 84 arranged in the optical axis direction Z1, in the optical axis direction Z1 with high accuracy. FIG. 6 illustrates an example of manufacturing the imaging optical mechanism 56. The members 81 to 84 and the outer wall members 87 and 88 may be separate components. The first light blocking member 81 and the outer wall member 87 may be integrally formed, the second light blocking member 82 and the outer wall member 88 may be integrally formed, and each of the aperture members 83 and 84 may be an individual component.

Then, a reading resolution of the reading module 50 including the imaging optical mechanism 56 in the embodiment is evaluated. An array pitch which is the pitches of the slits 831 and 841 and the concave mirrors 85 and 86 in the main scanning direction X in the imaging optical mechanism 56 is 1.6 mm. The widths S1 and S2 of the slits 811 and 821 in the main scanning direction X are 0.7 mm. The lengths LX1 and LX2 of the concave mirrors 85 and 86 in the main scanning direction X are 1.6 mm. The lengths LY1 and LY2 thereof in the sub-scanning direction Y is 3.6 mm. For an evaluation simulation, the product name "Code V" manufactured by Synopsis Inc. is used as lens design software.

Figure 12:
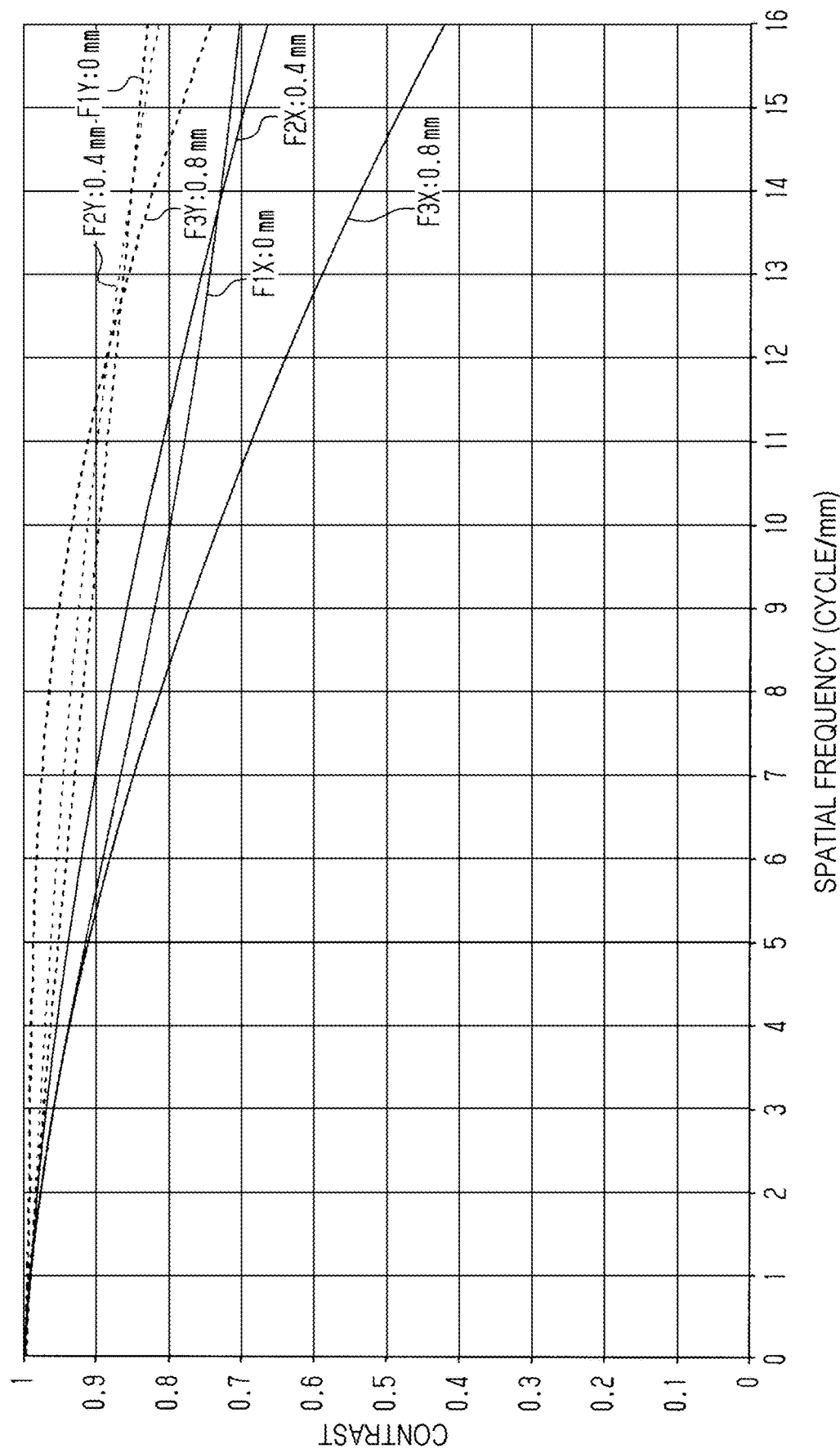
FIG. 12 is a graph illustrating a relationship between a spatial frequency and contrast.

FIG. 12 illustrates a modulated transfer function curve (MTF curve) for evaluating resolution characteristics of the imaging optical mechanism 56. The MTF curve is used for evaluating whether an image on an image-capturing surface of the sensor 573 reliably reproduces the reading target, with frequency characteristics. In the graph in FIG. 12, a horizontal axis indicates a spatial frequency (cycle/mm), and a vertical axis indicates contrast (Modulation). The spatial frequency is indicated by the number of black and white patterns per 1 mm on the image-capturing surface. The contrast is indicated by Modulation=(Lmax−Lmin)/(Lmax+Lmin) using the maximum luminance Lmax and the minimum luminance Lmin. The MTF curve is an index indicating the resolution.

The imaging optical mechanism 56 is configured in a manner that the plurality of unit imaging elements SL is arranged in the main scanning direction X. The unit imaging elements SL are arranged at an array pitch of 1.6 mm, and form an image of a real field of a 1.6 mm square at the reading target position P1 of an original document D, on the image-capturing surface of the sensor 573 at the equal magnification. Therefore, the real field is in a range of 1.6 mm in the main scanning direction X. FIG. 12 illustrates the contrast with respect to the spatial frequency, at positions spaced from the center of the real field at a distance of 0 mm, 0.4 mm, and 0.8 mm in the main scanning direction X. In the graph in FIG. 12, curves F1X and F1Y indicate MTF curves at the position spaced from the center of the real field at a distance of 0 mm. Curves F2X and F2Y indicate MTF curves at the position spaced from the center of the real field at a distance of 0.4 mm. Curves F3X and F3Y indicate MTF curves at the position spaced from the center of the real field at a distance of 0.8 mm. The curves F1X, F2X, and F3X indicate MTF curves in the main scanning direction X. The curves F1Y, F2Y, and F3Y indicate MTF curves in the sub-scanning direction Y. It is understood that, as the curvature becomes smaller, the resolution (curve indicated by a broken line) in the sub-scanning direction Y increases.

In the graph in FIG. 12, the minimum contrast performance of permittable image quality is obtained when the contrast is about 0.2. If the contrast more than 0.3 is obtained, the required resolution is obtained. In the scanner device 31 in the multifunction device 11 in the embodiment, the reading resolution of 6 cycles/mm is required. As understood from the graph in FIG. 12, in a spatial frequency of 6 cycles/mm, the high contrast which is equal to or more than 0.87 is obtained at all positions in a range of 0 mm to 0.8 mm in the main scanning direction X and the sub-scanning direction Y in the real field. In the spatial frequency of 12 cycles/mm, the contrast more than 0.63 is obtained in the main scanning direction X and the sub-scanning direction Y. In the spatial frequency of 16 cycles/mm, the relatively high contrast which is equal to or more than 0.42 is obtained in the main scanning direction X and the sub-scanning direction Y. As a result, the resolution of 6 to 12 cycles/mm as the spatial frequency is obtained by the reading module 50 including the imaging optical mechanism 56. Thus, the resolution required for the scanner device 31 is sufficiently obtained.

Figure 13:
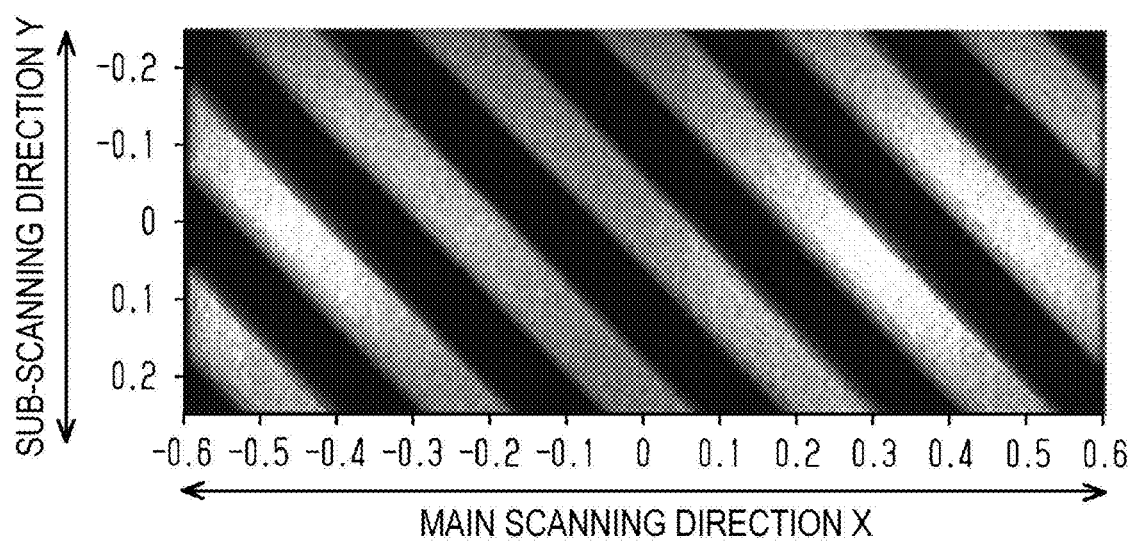
FIG. 13 is a view illustrating a reading image.

Then, with the reading module 50 in the embodiment, an image formed on the image-capturing surface of the sensor 573 when an original document D has been read is recognized. FIG. 13 illustrates an image formed on the image-capturing surface of the sensor 573 by the reading module 50, when stripes of 6 cycles/mm, which has been inclined at 45 degrees as an image of an original document D has been read. The array pitch of the imaging optical mechanism 56 is 0.8 mm. FIG. 13 illustrates an image of a range of a distance of ±0.6 mm from the center in the main scanning direction X and a range of a distance of ±0.2 mm from the center in the sub-scanning direction Y. Joint with the adjacent unit imaging element SL is shown at the position of ±0.4 mm in the main scanning direction X. As illustrated in FIG. 13, it is possible to recognize that an original document D is also read at a required resolution in the joint of the unit imaging element SL.

Regarding the reading module 50 including the imaging optical mechanism 56 in the example, the brightness and the focal depth of an image formed in the sensor 573 are evaluated. In the imaging optical mechanism 56 in the example, six types in total are provided, that is, the lengths LY1 and LY2 of the concave mirrors 85 and 86 in the sub-scanning direction Y are set to be two types of 3.6 mm and 4.8 mm, and array pitches of 1.4 mm, 1.6 mm, and 1.8 mm are set. As a lens array type imaging optical system, a SELFOC (registered trademark) lens array (SLA) for a copying machine is used as a comparative example. As the SLA in the comparative example, "SLA-12E" (product name) manufactured by Nippon Sheet Glass Co., Ltd. is used.

Figure 14:
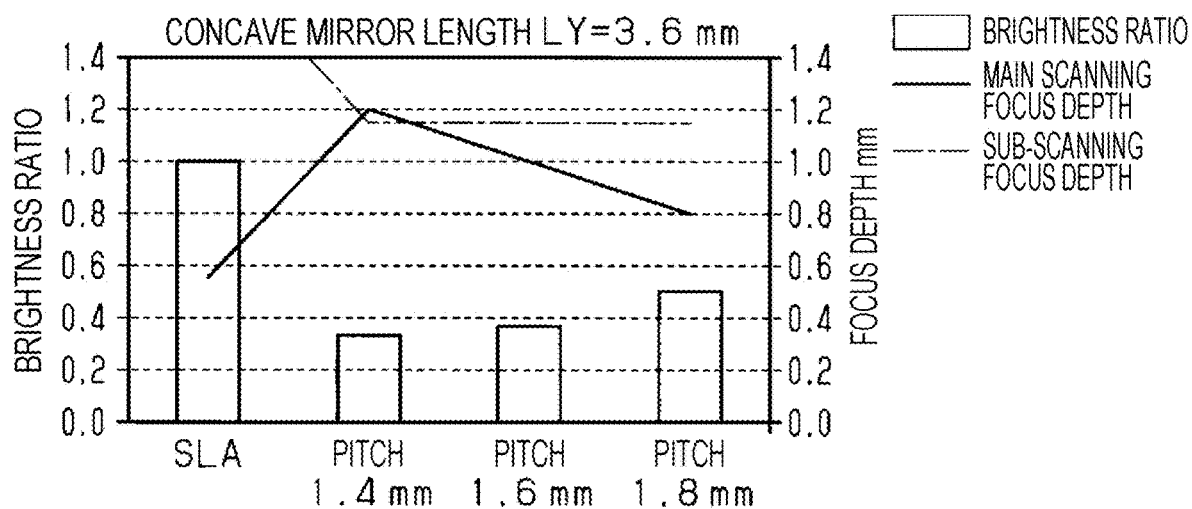
FIG. 14 is a graph illustrating a brightness ratio and a focal depth when a concave mirror length is 3.6 mm.
Figure 15:
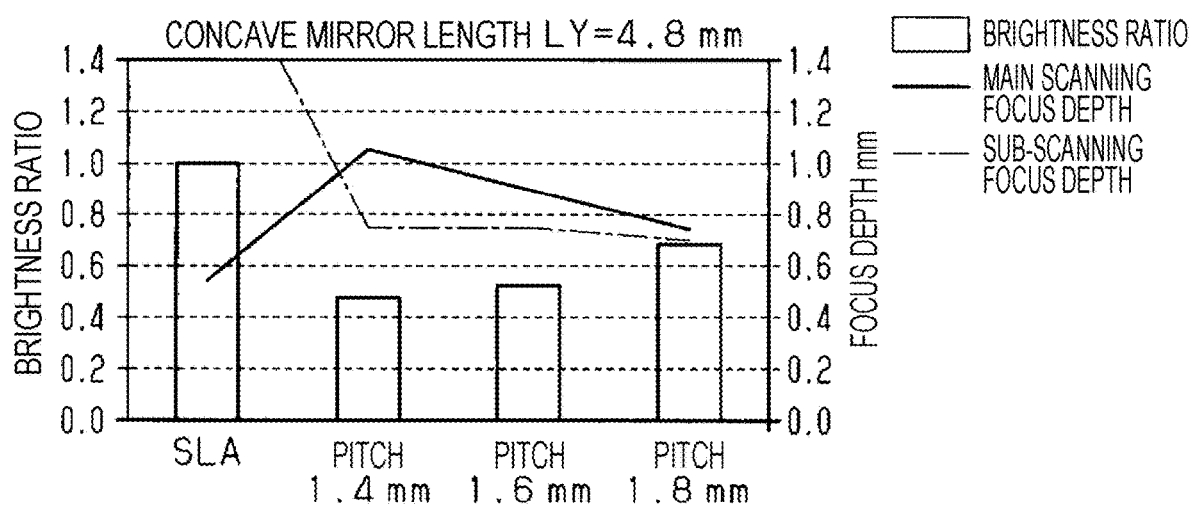
FIG. 15 is a graph illustrating a brightness ratio and a focal depth when a concave mirror length is 4.8 mm.

If the lengths LY1 and LY2 of the concave mirrors 85 and 86 in the sub-scanning direction Y are described as a concave mirror length LY, FIG. 14 illustrates evaluation results in a case where the concave mirror length LY is 3.6 mm. FIG. 15 illustrates evaluation results in a case where the concave mirror length LY is 4.8 mm. A brightness ratio represents a ratio of brightness in a case where brightness of an image obtained in the SLA in the comparative example has been set to 1.0, under a condition in which brightness of the linear light source 52 is constant. A focal depth represents a main scanning focal depth which is the focal depth in the main scanning direction X and a sub-scanning focal depth which is the focal depth in the sub-scanning direction Y.

As illustrated in FIGS. 14 and 15, the brightness ratio is smaller than that in the SLA in the comparative example, at any pitch of 1.4 mm, 1.6 mm, and 1.8 mm regardless of the concave mirror length LY of 3.6 mm and 4.8 mm. The brightness ratio is about 0.33 to 0.68. As the concave mirror length LY becomes longer, and the pitch dimension becomes larger, the higher brightness ratio is obtained. In a case where the concave mirror length LY is 3.6 mm as illustrated in FIG. 14, the brightness ratio in the example is 0.33 when the pitch is 1.4 mm, is 0.38 when the pitch is 1.6 mm, and is 0.5 when the pitch is 1.8 mm. In a case where the concave mirror length LY is 4.8 mm as illustrated in FIG. 15, the brightness ratio in the example is 0.43 when the pitch is 1.4 mm, is 0.5 when the pitch is 1.6 mm, and is 0.68 when the pitch is 1.8 mm.

Regarding the focal depth, in the SLA in the comparative example, the main scanning focal depth is 0.58 mm and shallow, and the sub-scanning focal depth is equal to or greater than 2 mm and deep. On the contrary, in any example, a difference between the main scanning focal depth and the sub-scanning focal depth is small. As illustrated in FIG. 14, in the example in which the concave mirror length LY is 3.6 mm, the main scanning focal depth gradually becomes shallow as the pitch increases, and thus has a value in a range of 0.8 mm to 1.2 mm. The sub-scanning focal depth is about 1.15 mm regardless of the pitch. As illustrated in FIG. 15, in the example in which the concave mirror length LY is 4.8 mm, the main scanning focal depth gradually becomes shallow as the pitch increases, and thus has a value in a range of 0.75 mm to 1.05 mm. The sub-scanning focal depth is about 0.7 mm regardless of the pitch.

In the example as described above, the brightness is about ½ to ⅔ of that in the SLA in the comparative example. As the concave mirror length LY becomes longer, the brightness tends to increase, but the focal depth tends to become shallow. In the example, in a case where the concave mirror length LY is 3.6 mm and 4.8 mm, and the pitch is in a range of 1.4 mm to 1.8 mm, the brightness is worse than that in the SLA, but, the focal depth which is deeper than that in the SLA, in particular, in the main scanning direction X is obtained. In the example, in particular, in a case where the concave mirror length LY is 3.6 mm, the focal depths in the main scanning direction X and the sub-scanning direction Y, which are equal to or greater than 1.0 mm are obtained at the pitch of 1.4 mm and 1.6 mm.

If the concave mirror length LY is greater than 4.8 mm, the focal depth becomes shallower than that in the SLA in the comparative example. Thus, the concave mirror length LY is preferably smaller than 4.8 mm. If the concave mirror length LY is smaller than 2.0 mm, an image becomes dark. Thus, the concave mirror length LY is preferably equal to or greater than 2.0 mm. Thus, the concave mirror length LY preferably has a value in a range of 2.0 mm to 4.8 mm.

Figure 16:
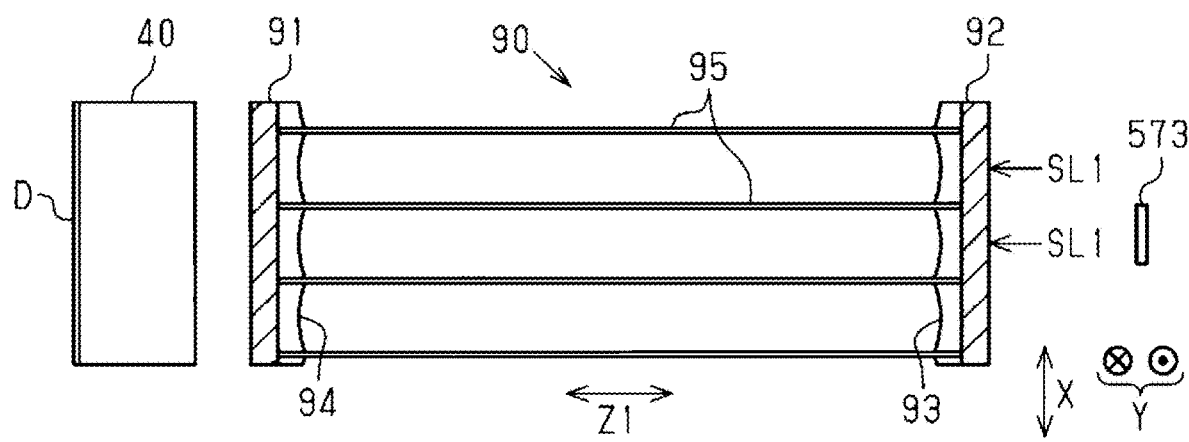
FIG. 16 is a side sectional view illustrating an imaging optical mechanism in a comparative example.

In the imaging optical mechanism 56 in the example, an effect of the anti-reflection treatment is evaluated. An imaging optical mechanism 90 including a light blocking partition plate 95 illustrated in FIG. 16 is used as a comparative example. As illustrated in FIG. 16, the imaging optical mechanism 90 in the comparative example includes a plurality of unit imaging elements SL1 in the main scanning direction X. Each of the unit imaging elements SL1 includes one set of light blocking members 91 and 92 and one set of concave mirrors 93 and 94. The light blocking members 91 and 92 face each other in the optical axis direction Z1, and the concave mirrors 93 and 94 also face each other in the optical axis direction Z1. Light blocking partition plates 95 are arranged at a predetermined pitch on both sides of each of the unit imaging element SL1 in the main scanning direction X, in the main scanning direction X.

The anti-reflection treatment for suppressing regular reflected light by scattering light reflected by the surface is performed on the inner wall surfaces of the first light blocking member 81 and the second light blocking member 82 and the wall surfaces of the aperture members 83 and 84, in the example. In the comparative example, the anti-reflection treatment is performed on the inner wall surfaces of the light blocking members 91 and 92 and the wall surface of the light blocking partition plate 95. A black alumite treated surface is used as the anti-reflection treated surface, and is compared with an ideal light absorbing surface, an ideal white scattering surface, and an ideal mirror surface. The effect of the anti-reflection treatment is evaluated with the quantity (milliwatt/square millimeter) of received light per a unit area of the sensor 573 in the example and the comparative example.

Figure 17:
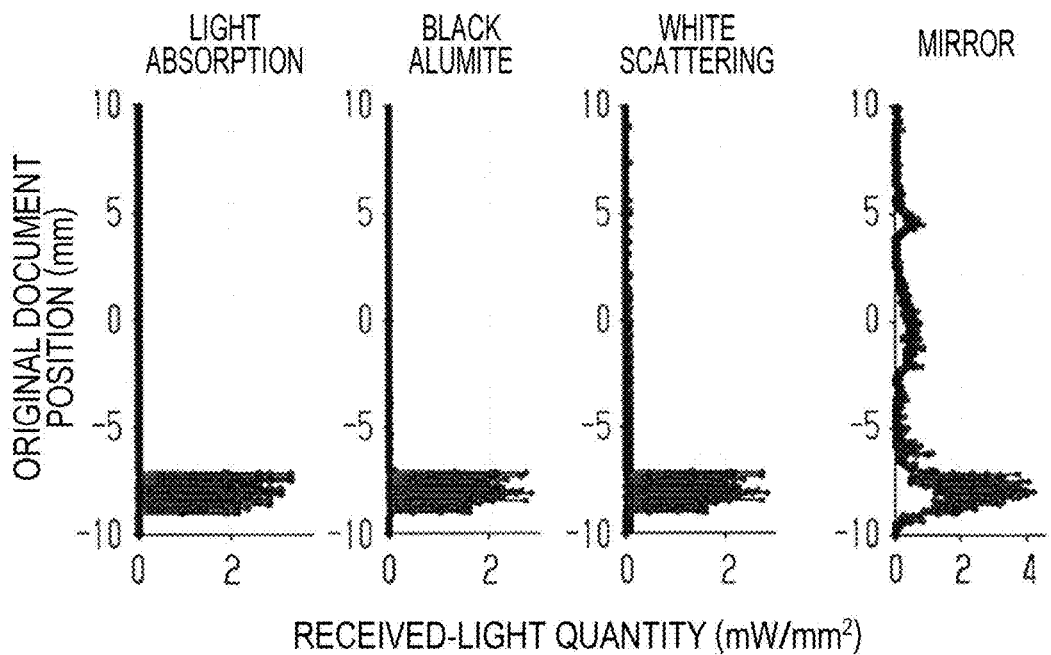
FIG. 17 is a graph obtained by evaluating an anti-reflection treatment of a light blocking partition plate in the comparative example.
Figure 18:
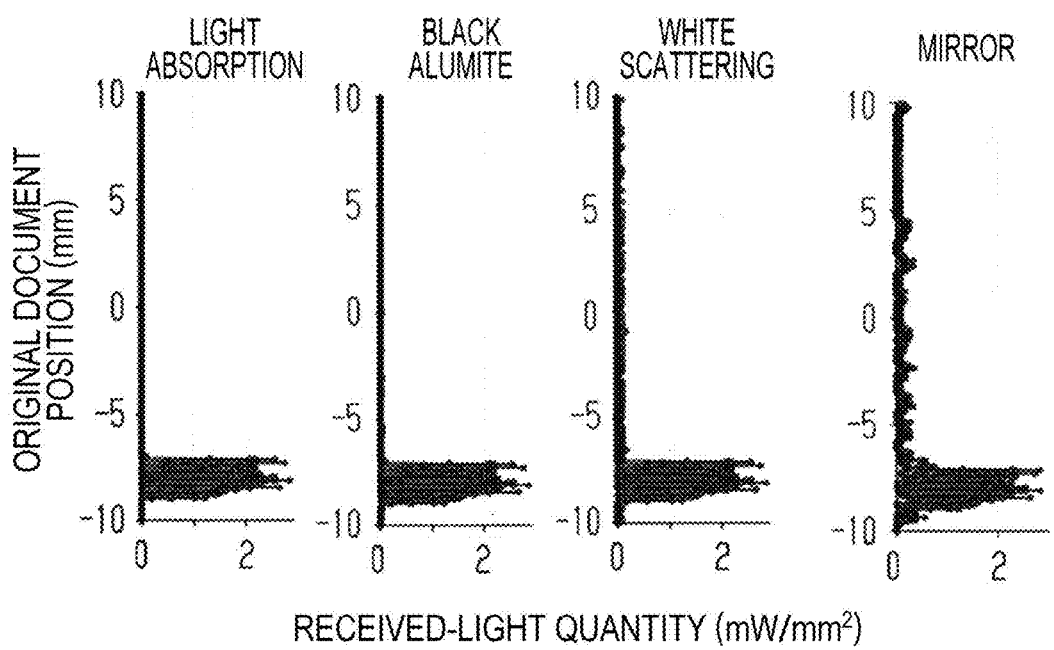
FIG. 18 is a graph obtained by evaluating an anti-reflection treatment of an aperture member in an example.

FIG. 17 illustrates evaluation results of the anti-reflection treatment in the comparative example. FIG. 18 illustrates evaluation results of the anti-reflection treatment in the example. An original document in which a fringe region of 6 line pairs/mm has been printed at the position of 8 mm in the sub-scanning direction Y, and the background is black is disposed. Then, the quantity of light received by the sensor array is evaluated. In the graphs in FIGS. 17 and 18, a horizontal axis indicates the quantity of received light, and a vertical axis indicates an original document position in the sub-scanning direction Y. In both the comparative example illustrated in FIG. 17 and the example illustrated in FIG. 18, regarding the black alumite treated surface, an anti-reflection effect of light, which is substantially equal to that of the light absorbing surface is obtained. Regarding the white scattering surface, it is observed that slight light is received even at positions other than the fringe region. Thus, it is understood that the anti-reflection effect is low. Regarding the mirror surface, in the comparative example illustrated in FIG. 17, it is observed that light is received at the positions other than the fringe region of the original document and in the entirety of the fringe region. Thus, recognition of the fringe has difficulty. Regarding the mirror surface, in the example illustrated in FIG. 18, it is also observed that light is received at the positions other than the fringe region of the original document and in the fringe region. However, the quantity of received light is smaller than that in the comparative example, and the quantity of light received at the position of the black portion for the fringe in the fringe region is approximate to 0 (zero). Thus, the fringe of which recognition has not been possible in the comparative example can be recognized.

Thus, it is understood that the high anti-reflection effect is obtained in the black alumite treated surface. Regarding the mirror surface for an acceleration evaluation, the anti-reflection effect in the example is not deteriorated as much as that in the comparative example. For this reason, it is understood that a stray-light suppression effect obtained by the aperture members 83 and 84 is higher than that obtained by the light blocking partition plate 95. In a case where a sand blasting treated surface is also evaluated as the anti-reflection treatment, in addition to a black treated surface such as the black alumite treated surface, the high anti-reflection effect is obtained. In a case where the sand blasting treatment is performed, synthetic resin may have any color, but the synthetic resin preferably has a color other than the white color. For example, it is more preferable that the light blocking members 81 and 82 and the aperture members 83 and 84 have been formed with black synthetic resin, and then the sand blasting treatment be performed on the surfaces thereof. The above descriptions may be applied to a matting coating treatment.

Figure 19:
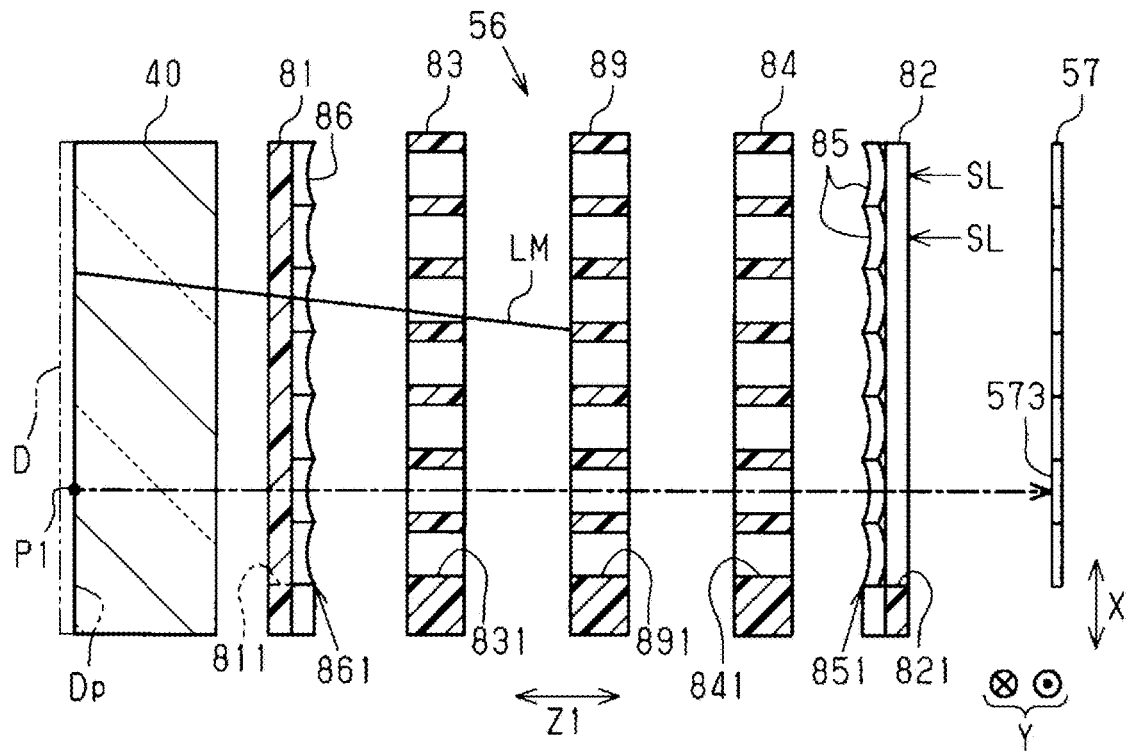
FIG. 19 is a side sectional view illustrating an imaging optical mechanism in a modification example.

As other measures for stray light, as illustrated in FIG. 19, an aperture member 89 is added. In the example in FIG. 19, the third aperture member 89 is added between the first aperture member 83 and the second aperture member 84 in the optical axis direction Z1. The third aperture member 89 includes a plurality of slits 891 opening at a predetermined pitch in the main scanning direction X. As illustrated in FIG. 19, stray light LM is blocked by the aperture member 89 which has been added and is illustrated in FIG. 19. Therefore, it is possible to form an image in the sensor 573 at high contrast. If the number of aperture members increases, an effect for handling stray light is improved, but an image formed in the sensor 573 becomes dark. Thus, from a viewpoint of an effect of blocking stray light and securing brightness, it is preferable that the number of aperture members 83, 84, and 89 be as small as possible, in a range in which stray light can be suppressed to the required extent.

Next, an action of the scanner device 31 in the multifunction device 11 will be described. If a user performs an instruction to perform scanning by causing the host device to operate an operation unit such as a keyboard or a mouse, the multifunction device 11 receives a scanning job through a communication from the host device. If the user performs an instruction to perform scanning by operating the operation unit 15, the multifunction device 11 receives a scanning job. If the user performs an instruction to perform copying of an original document D by operating the operation unit 15, the multifunction device 11 receives a scanning job and a printing job. The control unit 100 controls driving of the scanner device 31 based on the scanning job, and thus causes the scanner device 31 to perform a reading operation of an original document D.

The control unit 100 performs a reading operation in the ADF mode when detecting that an original document D is provided in the set tray 36, and performs the reading operation in the FB mode when detecting that the original document D is placed on the glass plate 40A of the document stand 33. In the ADF mode, the control unit 100 moves the carriage 61 to the reading position indicated by a solid line in FIG. 3, and drives the document transporting unit 35 to transport the original document D. The control unit causes the reading module 50 to read the original document D in the middle of being transported, through the glass plate 40B. In the FB mode, the control unit 100 causes the carriage 61 to perform one reciprocation motion from the standby position in the sub-scanning direction Y. The control unit causes the reading module 50 to read the original document D on the document stand 33 through the glass plate 40A while moving the carriage in the forward direction Y1.

The control unit 100 performs predetermined processing including shading correction and the like, on reading data obtained by reading, and thereby image data is generated. When an instruction to perform scanning has been performed, the image data is output from the multifunction device 11 to the host device. When an instruction to perform copying has been performed, the printing device 21 performs printing of an image based on the image data, and thus a medium P after copying-printing is discharged from the discharge port 21A to the stacker 18.

Here, in the reading module 50, the original document D is read as will be described below. As illustrated in FIG. 8, scattered light reflected at the reading target position P1 of the original document D passes through the slit 811 of the first light blocking member 81, and then is incident into the imaging optical mechanism 56. At this time, light incident by passing through the slit 811 of the first light blocking member 81 is restricted in the sub-scanning direction Y. Among rays of the incident light, light LA passing through the slits 831 and 841 of the plurality of aperture members 83 and 84 is reflected by the first concave mirror 85 in a unit imaging element SL positioned to face the reading target position P1.

As illustrated in FIG. 10, when light is reflected toward the second concave mirror 86 by the first concave mirror 85, the light is reflected so as to form an erected image in the main scanning direction X and to be condensed at the condensing position P3 being an intermediate position between the first concave mirror 85 and the second concave mirror 86. Light LB as illustrated in FIG. 8 is reflected so as to be parallel light, in the sub-scanning direction Y which is orthogonal to the main scanning direction X. In this manner, light from the reading target position P1 is sequentially reflected by the corresponding first concave mirror 85 and second concave mirror 86. Light LC reflected by the second concave mirror 86 is condensed at the imaging position P2 of the corresponding sensor 573 in the sensor array 572 so as to form an image. At this time, as illustrated in FIGS. 8 and 9, the first concave mirror 85 and the second concave mirror 86 have the lengths LY1 and LY2 in the sub-scanning direction Y, which are longer than the lengths LX1 and LX2 in the main scanning direction X. Thus, it is possible to secure the relatively large quantity of light LA and LB allowed to be reflected. As illustrated in FIG. 8, stray light traveling toward another unit imaging element SL among rays of light which have been widely incident from the reading target position P1 is blocked by portions of the two aperture members 83 and 84 other than the slits 831 and 841. That is, stray light which has passed through the slit 811 from positions other than the reading target position P1 of the original document D and then has been incident is blocked by the portions of the two aperture members 83 and 84 other than the slits 831 and 841. Thus, the occurrence of a situation in which the stray light passes through the unit imaging element SL corresponding to the reading target position P1 and then reaches the corresponding sensor 573. As a result, an image is formed in the sensor 573 at high contrast.

As illustrated in FIG. 8, light LB between the first concave mirror 85 and the second concave mirror 86 in the sub-scanning direction Y becomes parallel light, and forms an inverted image in the sensor 573. Since the curvatures C1 and C3 of the concave mirrors 85 and 86 in the sub-scanning direction Y are set to be small so as to form an inverted image in the sub-scanning direction Y, it is possible to increase the quantity of light by increasing the lengths LY1 and LY2 thereof in the sub-scanning direction Y and to reduce the aberration in the sub-scanning direction Y. In the main scanning direction X, an erected image is formed in the sensor 573. Images formed in the adjacent concave mirrors among the concave mirrors 85 and 86 constituting the concave mirror arrays 851 and 861 overlap each other, and thus a consecutive image is obtained.

An image obtained by projecting an original document D on a mirror is formed in the sensor array 572. Therefore, the control unit 100 performs image processing of inverting a reading image in the sub-scanning direction Y, on a pixel signal input from the sensor array 572, and thereby generates image data. In this manner, it is possible to obtain image data which has been obtained by reading the original document D and has a high resolution. The total length LZ of the imaging optical mechanism 56 in the optical axis direction Z1 is about 20 mm, and is a little larger than that in the lens type imaging optical system. However, it is possible to secure a long optical path length with respect to the dimension of the total length LZ, and to deepen the field depth and the focal depth. Therefore, even though the original document D slightly floats from the glass plate 40, an occurrence of blurring of an image formed in the sensor 573 is difficult, and it is possible to read the original document D at the required resolution.

As illustrated in FIG. 6, in a case where the configuration is made by assembling the two components PT1 and PT2, it is possible to improve position accuracy of the members 81 to 84, to reliably suppress stray light, and to read an original document D at high contrast and a high resolution. In the imaging optical mechanism 90 including the light blocking partition plate 95 illustrated in FIG. 16, forming the light blocking partition plate 95 configured with a thin plate has a difficulty in manufacturing. On the contrary, the imaging optical mechanism 56 in the embodiment is relatively simply manufactured because the plurality of aperture members 83 and 84 configured with lattice-like plate members may be disposed.

According to the embodiment which has been described above in detail, it is possible to obtain effects as follows.

(1) The imaging optical mechanism 56 is mounted in the reading module 50 as the optical module, which moves relative to an original document D as an example of the reading target. Light incident from the original document D by reflecting light from the linear light source 52 as an example of the light source by the original document D is imaged in the sensor 573 as an example of the imaging object. The imaging optical mechanism 56 includes the first concave mirror 85 that reflects the light incident from the original document D and the second concave mirror 86 that is disposed at the position shifted from the first concave mirror 85 in the sub-scanning direction Y being the relative movement direction of the reading module 50, and reflects and emits light reflected by the first concave mirror 85. The imaging optical mechanism 56 further includes the plurality of aperture members 83 and 84 in which the slits 831 and 841 are formed along a path in which the light incident from the original document D travels toward the first concave mirror 85, a path in which the light reflected by the first concave mirror 85 travels toward the second concave mirror 86, and a path in which the light reflected by the second concave mirror 86 travels toward the sensor 573. The first concave mirror 85 has the first curvature C1 at which the light which has been widely incident from the original document D in the sub-scanning direction Y is reflected as parallel light LB, and the second curvature C2 at which the light which has been widely incident from the original document D in the main scanning direction X is reflected so as to be imaged at the position between the first concave mirror and the second concave mirror 86. The second concave mirror 86 has the third curvature C3 at which the parallel light LB which has been reflected by the first concave mirror 85 and then incident in the sub-scanning direction Y is reflected so as to be imaged at the position of the sensor 573, and the fourth curvature C4 at which light which has been imaged at the position between the first concave mirror 85 and the second concave mirror and then incident in the main scanning direction X is reflected so as to be imaged at the position of the sensor 573.

Thus, the light incident from the linear light source 52 or the light incident by reflecting the light from the linear light source 52 by the original document D is imaged in the sensor 573 through the path in which the light travels toward the first concave mirror 85, the path in which the light reflected by the first concave mirror 85 travels toward the second concave mirror 86, and the path in which the light reflected by the second concave mirror 86 travels toward the sensor 573. At this time, only light passing through the slits 831 and 841 of the aperture members 83 and 84 in the paths is imaged in the sensor 573. Therefore, stray light is blocked by the plurality of aperture members 83 and 84, and stray light reaching the sensor 573 is suppressed. As a result, contrast of an image formed in the sensor 573 is improved, and the high resolution is obtained. Regarding the light which has been widely incident from the original document D, the light incident to portions other than the first concave mirror 85 in the sub-scanning direction Y is blocked by the first light blocking member 81, and is reflected by the first concave mirror 85 in a form of, for example, parallel light without being imaged between the first concave mirror and the second concave mirror 86. The light is reflected by the first concave mirror 85 in the main scanning direction X so as to be imaged at the position between the first concave mirror and the second concave mirror 86. The parallel light which has been reflected by the first concave mirror 85 and then incident in the sub-scanning direction Y is reflected by the second concave mirror 86, and then is imaged in the sensor 573. The light which has been imaged at the position between the first concave mirror 85 and the second concave mirror and then incident to the second concave mirror 86 in the main scanning direction X is reflected by the second concave mirror 86 so as to be imaged at the position of the sensor 573. Thus, the light from the original document D is formed as an inverted image, in the sensor 573 in the sub-scanning direction Y, and is formed as an erected image, in the sensor 573 in the main scanning direction X. In the sub-scanning direction Y, considering an overlap of an image is not required because the adjacent concave mirror is not provided. Therefore, imaging may occur slightly, and thus it is possible to secure the lengths LY1 and LY2 of the first concave mirror 85 and the second concave mirror 86 in the sub-scanning direction Y. Therefore, it is possible to secure the large quantity of light imaged in the sensor 573, and thus to secure brightness of an image. As a result, it is possible to form an image having high contrast in the sensor 573 and to obtain high resolution. Since light is reflected by the first concave mirror 85 and the second concave mirror 86, the optical path length from the original document D to the sensor 573 increases, and thus it is possible to increase the focal distance. Therefore, it is possible to increase a focal depth. Accordingly, it is possible to form an image of light in the sensor 573 at high contrast and to obtain the high resolution.

(2) In the imaging optical mechanism 56, the lengths of the first concave mirror 85 and the second concave mirror 86 in the sub-scanning direction Y are longer than the lengths in the main scanning direction X. Thus, the large quantity of light can be incident and reflected to and by the first concave mirror 85 and the second concave mirror 86. Thus, it is possible to secure brightness of an image formed in the sensor 573.

(3) The imaging optical mechanism 56 includes the first light blocking member 81 having the slit 811 at the position facing the first concave mirror 85, and the second light blocking member 82 having the slit 821 at the position facing the second concave mirror 86. The first light blocking member 81 is disposed on a path in which the incident light travels toward the aperture member 83 disposed to be the closest to the incident side of light among the plurality of aperture members 83 and 84. The second light blocking member 82 is disposed on a path in which the light reflected by the second concave mirror 86 passes through the aperture member 84 disposed on the closest side to the sensor 573 among the plurality of aperture members 83 and 84 and then travels toward the sensor 573.

Thus, light which has passed through the slit 811 of the first light blocking member 81 and been incident among rays of light which has been reflected by the original document D and spread passes through the slits 831 and 841 of the plurality of aperture members 83 and 84, and then is reflected by the first concave mirror 85. Since incident light is restricted at the slit 811 in the sub-scanning direction Y by the first light blocking member 81, it is possible to secure the large quantity of light reflected by the first concave mirror 85 in the sub-scanning direction Y and to reduce stray light traveling toward portions other than the first concave mirror 85, in particular, stray light which is directly incident to the imaging surface from the original document D. The light reflected by the second concave mirror 86 passes through the slits 831 and 841 of the plurality of aperture members 83 and 84, and passes through the slit 821 of the second light blocking member 82, and then is imaged in the sensor 573. Since the light reflected by the second concave mirror 86 is restricted by the slit 821 of the second light blocking member 82 in the sub-scanning direction Y, it is possible to reduce stray light in the sub-scanning direction Y in cooperation with the first light blocking member 81. Thus, brightness of an image formed in the sensor 573 is secured, high contrast is obtained, and thus the high resolution is obtained.

(4) In the imaging optical mechanism 56, the width S1 of the slit 811 of the first light blocking member 81 in the sub-scanning direction Y is set to be the length as long as light incident from the original document D can be restricted to the irradiation area of the first concave mirror 85 in the length range in the sub-scanning direction Y. Thus, the light incident from the original document D is restricted by the slit 811 of the first light blocking member 81 in the sub-scanning direction Y, and thus it is possible to block light out of the length range of the first concave mirror 85 in the sub-scanning direction Y. Accordingly, it is possible to secure high contrast and to obtain the high resolution, by brightening an image of light formed in the sensor 573.

(5) In the imaging optical mechanism 56, the width S2 of the slit 821 of the second light blocking member 82 in the sub-scanning direction Y is set to be the length as long as light reflected by the second concave mirror 86 can pass through the slit. Thus, all or most of rays of light other than the light reflected by the second concave mirror 86 are blocked by the second light blocking member 82, and the light reflected by the second concave mirror 86 passes through the slit 821 in the sub-scanning direction Y. Accordingly, it is possible to secure brightness and high contrast of an image of light formed in the sensor 573, and to obtain a high resolution.

(6) In the imaging optical mechanism 56, the first concave mirror 85 and the second concave mirror 86 are disposed at positions which do not overlap each other in the sub-scanning direction Y and positions overlapping each other in the main scanning direction X. Thus, all or most of rays of light reflected by the first concave mirror 85 can be incident to the second concave mirror 86, and it is possible to suppress an occurrence of a situation in which light other than the light reflected by the first concave mirror 85 is incident to the second concave mirror 86. Accordingly, it is possible to secure brightness and high contrast of an image formed in the sensor 573, and to obtain the high resolution.

(7) In the imaging optical mechanism 56, an image of the original document D in the sub-scanning direction Y is formed to be an inverted image, and an image of the original document D in the main scanning direction X is formed to be an erected image, at the position of the sensor 573. Thus, in a case where plural sets of first concave mirrors 85, second concave mirrors 86, and sensors 573 are arranged in the main scanning direction X, an erected image is formed in the main scanning direction X. Thus, images can be joined between the sensors 573. Since an inverted image is formed in the sub-scanning direction Y, it is possible to reduce the curvatures of the first concave mirror 85 and the second concave mirror 86 in the sub-scanning direction Y and to reduce aberration.

(8) In the imaging optical mechanism 56, the first light blocking member 81 is integrally formed with the second concave mirror 86 in a state of being adjacent to the second concave mirror 86 in the first direction in the sub-scanning direction Y. The second light blocking member 82 is integrally formed with the first concave mirror 85 in a state of being adjacent to the first concave mirror 85 in the second direction in the sub-scanning direction Y. Thus, it is possible to manufacture the imaging optical mechanism 56 with a relatively small number of components including the component obtained by integrally forming the first light blocking member 81 and the second concave mirror 86 with each other and the component obtained by integrally forming the second light blocking member 82 and the first concave mirror 85 with each other.

(9) In the imaging optical mechanism 56, the second concave mirror 86 causes the reflected light to be imaged at an optical distance LF2 which is equal to an optical distance LF1 between the original document D and the first concave mirror 85. Thus, the component obtained by integrally forming the first light blocking member 81 and the second concave mirror 86 with each other and the component obtained by integrally forming the second light blocking member 82 and the first concave mirror 85 with each other can be commonly used, and thus it is possible to further reduce the number of components constituting the imaging optical mechanism 56.

(10) In the imaging optical mechanism 56, the first concave mirror 85 and the second concave mirror 86 have a common shape. Thus, the first component PT1 obtained by integrally forming the first light blocking member 81 and the second concave mirror 86 with each other and the second component PT2 obtained by integrally forming the second light blocking member 82 and the first concave mirror 85 with each other can be used as common components, and thus it is possible to further reduce the number of components thereof.

(11) In the imaging optical mechanism 56, the first light blocking member 81 and the second light blocking member 82 are integrally formed with the aperture members 83 and 84. Thus, it is possible to further reduce the number of components of the imaging optical mechanism 56. The arrangement position accuracy of the plurality of aperture members 83 and 84 is improved, and it is possible to reduce stray light as in the assumed design.

(12) The reading module 50 as an example of the optical module includes the imaging optical mechanism 56, the linear light source 52 as an example of the light source that irradiates the original document D with light in the main scanning direction X, and the sensor array 572 in which the plurality of sensors 573 as an example of the imaging objects is arranged. The imaging optical mechanism 56 includes the first concave mirror array 851 in which the plurality of first concave mirrors 85 is arranged in the main scanning direction X, and the second concave mirror array 861 in which the plurality of second concave mirrors 86 is arranged in the main scanning direction X. Further, the imaging optical mechanism 56 includes the first light blocking member 81 which has the slit 811 opening to allow light to be incident to the first concave mirror array 851, and the second light blocking member 82 which has the slit 821 opening to allow the reflected by the second concave mirror array 861 to be imaged in the sensor array 572. Thus, it is possible to form a bright image of the original document D in the sensor array 572 at high contrast by the reading module 50 moving relative to the original document D. Accordingly, it is possible to read the original document D at a high resolution by the reading module 50.

(13) In the reading module 50, the slit 811 of the first light blocking member 81 opens in the length range allowing light to be incident to the first concave mirror array 851 in the main scanning direction X. The slit 821 of the second light blocking member 82 opens in the length range allowing light reflected by the second concave mirror array 861 in the main scanning direction X to be imaged in the sensor array 572. Thus, the slits 811 and 821 of the first light blocking member 81 and the second light blocking member 82 open in the length range of the specular surface array in the main scanning direction X. Thus, it is possible to secure a large quantity of light incident to the imaging optical mechanism 56 and a large quantity of light emitted from the imaging optical mechanism 56, and to secure brightness of an image formed in the sensor 573, for example, in comparison to a configuration in which a plurality of slits which respectively corresponds to specular surfaces is formed.

(14) The multifunction device 11 as an example of an image reading apparatus includes the reading module 50, the glass plate 40 as an example of the transparent member that defines the position of the original document D as an example of the reading target, and the transporting unit that relatively moves the original document D and the reading module 50. The reading module 50 reads the original document D at the position on an opposite side of the original document D with the glass plate 40 interposed between the reading module 50 and the original document D, by causing the reflected light of light with which the original document D has been irradiated to be incident to the reading module. Thus, the multifunction device 11 can cause the reading module 50 to read the original document D at the high resolution.

(15) The inner end portion of the slit 811 formed in the first light blocking member 81, in the sub-scanning direction Y, is disposed at a position of blocking light which travels toward portions other than the first concave mirror 85 disposed to face the slit 811. The inner end portion of the slit 821 formed in the second light blocking member 82, in the sub-scanning direction Y, is disposed at a position of blocking light from portions other than the second concave mirror 86 disposed to face the slit 821. Thus, it is possible to reduce stray light reaching the light receiving surface of the sensor 573 and to secure brightness of an image while suppressing blurring of the image formed in the sensor 573. Accordingly, it is possible to obtain imaging of high contrast.

Second Embodiment

Next, a second embodiment will be described with reference to FIGS. 20 and 21. In the second embodiment, a configuration for reducing stray light will be described.

Figure 20:
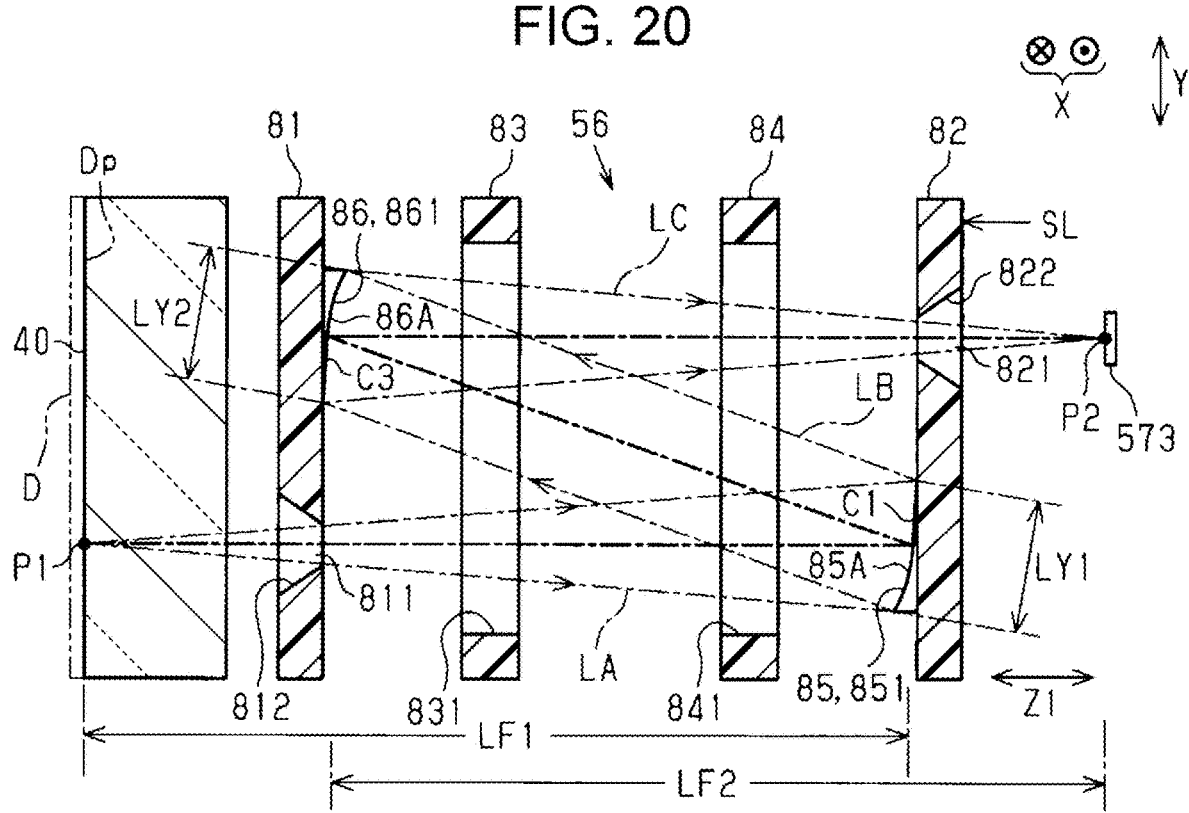
FIG. 20 is a front sectional view illustrating a configuration of an imaging optical mechanism according to a second embodiment.

As illustrated in FIG. 20, the inner end portions of the slits 811 and 821 (formed in the plurality of light blocking members 81 and 82) in the movement direction, that is, in the sub-scanning direction Y are disposed at positions at which the light traveling toward portions other than the concave mirrors 85 and 86 as an example of the specular surfaces, which have been disposed to face each other is blocked. That is, the inner end portion of the slit 811 formed in the first light blocking member 81, in the sub-scanning direction Y, is disposed at the position at which light traveling toward portions other than the first concave mirror 85 disposed to face the slit 811 is blocked. The inner end portion of the slit 821 formed in the second light blocking member 82 in the movement direction, that is, in the sub-scanning direction Y is disposed at the position at which the light traveling from portions other than the second concave mirror 86 as an example of the specular surface, which has been disposed to face the slit 821 is blocked. That is, the inner end portion of the slit 821 formed in the second light blocking member 82, in the sub-scanning direction Y, is disposed at the position at which light traveling from portions other than the second concave mirror 86 disposed to face the slit 821 is blocked.

On the surface of the first light blocking member 81, which opposes the first concave mirror 85, the opening width of the slit 811 in the sub-scanning direction Y is set to a width causing the entire surface of the first concave mirror 85 to cover an original document line. On the surface of the second light blocking member 82, which opposes the second concave mirror 86, the opening width of the slit 821 in the sub-scanning direction Y is set to a width causing the width of the entire surface of the second concave mirror 86 in the sub-scanning direction Y to cover the line sensor. Further, the slits 811 and 821 of the light blocking members 81 and 82 have a shape which does not allow light to pass through the slit 811 of the first light blocking member 81 and then to pass through the second light blocking member.

As illustrated in FIG. 20, side surfaces of the slits 811 and 821 (formed in the plurality of light blocking members 81 and 82), which have been disposed in the movement direction, that is, in the sub-scanning direction Y have inclined shapes widened toward an opposite side of the concave mirrors 85 and 86 as an example of the specular surface, which have been disposed to face each other. That is, tapered surfaces 812 and 822 having an inclined shape which has an opening widened toward the outside of the module are formed in the slits 811 and 821 of the first light blocking member 81 and the second light blocking member 82. In detail, two surfaces facing each other in the sub-scanning direction Y among inner wall surfaces of the slit 811 of the first light blocking member 81 serve as a pair of tapered surfaces 812 having an opening widened toward the original document. Two surfaces facing each other in the sub-scanning direction Y among inner wall surfaces of the slit 821 of the second light blocking member 82 serve as a pair of tapered surfaces 822 having an opening widened toward the sensor 573.

It is not necessary that the tapered surface 812 of the slit 811, which opens toward the original document D in the first light blocking member 81 and the tapered surface 822 opening toward the sensor 573 in the second light blocking member 82 form a taper angle. However, the first light blocking member 81 and the second light blocking member 82 may be used as a common component by forming the taper angle in order to reduce cost. If the second concave mirror 86 is integrally formed with the first light blocking member 81, and the first concave mirror 85 is integrally formed with the second light blocking member 82, it is possible to further reduce cost of manufacturing components.

Here, from a viewpoint of suppressing an occurrence of a situation in which stray light is reflected by the tapered surface 812, and thus is incident from the slit 811, the taper angle between the tapered surfaces 812 and 822 may be as large as possible. If the taper angle is smaller than 20 degrees, some rays of light obtained by reflecting direct light from the original document D by the tapered surface 812 may be incident from the slit 811 and thus act as stray light. If the taper angle is too large, the light blocking members 81 and 82 become transparent, and thus transmitted light acts as stray light. Therefore, the taper angle is preferably 20 degrees or more and 60 degrees or less. In particular, in order to more reliably eliminate the above adverse effect, the taper angle is more preferably 30 degrees or more and 50 degrees or less. In the embodiment, the taper angle is set to 40 degrees as an example. The taper angle referred here means an angle of the tapered surfaces 812 and 822 to a surface parallel to both the optical axis direction Z1 and the main scanning direction X. The anti-reflection treatment is performed on the surfaces of the light blocking members 81 and 82 and the aperture members 83 and 84. Therefore, in the example, the anti-reflection treatment is also performed on the inner wall surfaces of the slits 811 and 821, which include the tapered surfaces 812 and 822. The surfaces of the concave mirrors 85 and 86 are not limited thereto, and preferably have high reflectance on the sufficient specular surface.

Figure 21:
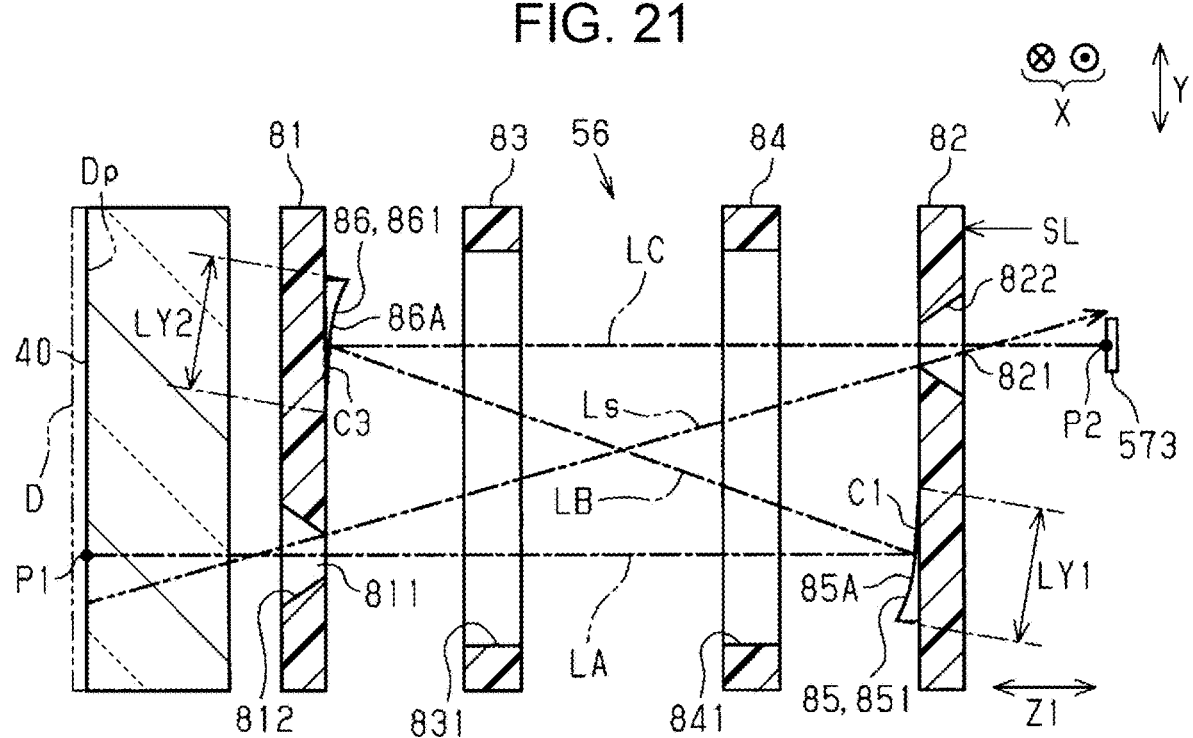
FIG. 21 is a front sectional view illustrating reduction of stray light in the imaging optical mechanism.

In FIG. 21, among rays of light incident from the original document D to the slit 811 of the first light blocking member 81, light reflected by the tapered surface 812 which becomes wider toward an opposite side of the first concave mirror 85 is reflected toward the original document by the taper angle. At this time, most of rays of the reflected light are reflected from the reading position of the original document D toward a position shifted in the sub-scanning direction Y, by the taper angle. The incident light incident from the original document D through the slit 811 of the first light blocking member 81 includes direct stray light Ls which does not pass through the concave mirrors 85 and 86 but pass through the slit 821 of the second light blocking member 82 and then travels toward the sensor 573, as indicated by a two-dot chain line in FIG. 21. In the embodiment, the tapered surfaces 812 and 822 have openings widened toward the original document and the sensor 573, respectively. Therefore, the direct stray light Ls which travels to be the closest to the sensor 573 in the sub-scanning direction Y and is indicated by the two-dot chain line in FIG. 21 reaches a position separated from the imaging position P2 in the sub-scanning direction Y on the light receiving surface of the sensor 573, in comparison to a configuration in which the slits 811 and 821 have reverse tapered surfaces widened reverse to the tapered surfaces 812 and 822 in the embodiment. For example, the direct stray light Ls reaches a position separated from the center position of the light receiving surface of the sensor 573 in the sub-scanning direction Y by about 1 mm. In the embodiment, the sensor 573 used in the CISM 530 is a line sensor, and the position separated from the center position of the light receiving surface of the sensor 573 in the sub-scanning direction Y by about 1 mm is out of the sensor 573. Thus, a large influence is not applied to contrast. Thus, it is possible to suppress deterioration of contrast of a reading image due to the direct stray light Ls. FIG. 21 illustrates only optical axes of light LA, LB, and LC for convenient descriptions.

As described above in detail, according to the second embodiment, it is similarly possible to obtain the effects of (1) to (15) in the first embodiment and to obtain an effect as follows.

(16) The side surfaces of the slits 811 and 821 (formed in the first light blocking member 81 and the second light blocking member 82), which have been disposed in the sub-scanning direction Y have inclined shapes widened toward an opposite side of the concave mirrors 85 and 86 disposed to face each other. In detail, in the slits 811 and 821, the side surfaces disposed in the sub-scanning direction Y serve as tapered surfaces 812 and 822 which have been widened toward an opposite side of the concave mirrors 85 and 86 which are respectively disposed to face the slits 811 and 821. Therefore, it is possible to block stray light incident from the slit 811 of the first light blocking member 81 without blocking reading light from the original document D by the side surface disposed in the sub-scanning direction Y. Alternatively, it is possible to effectively separate stray light region in which it is possible that the stray light incident from the slit 811 reaches the light receiving surface of the sensor 573, from an imaging place on the light receiving surface. Thus, it is possible to obtain imaging at high contrast.

Third Embodiment

Next, a third embodiment will be described with reference to FIGS. 22 and 23.

Figure 22:
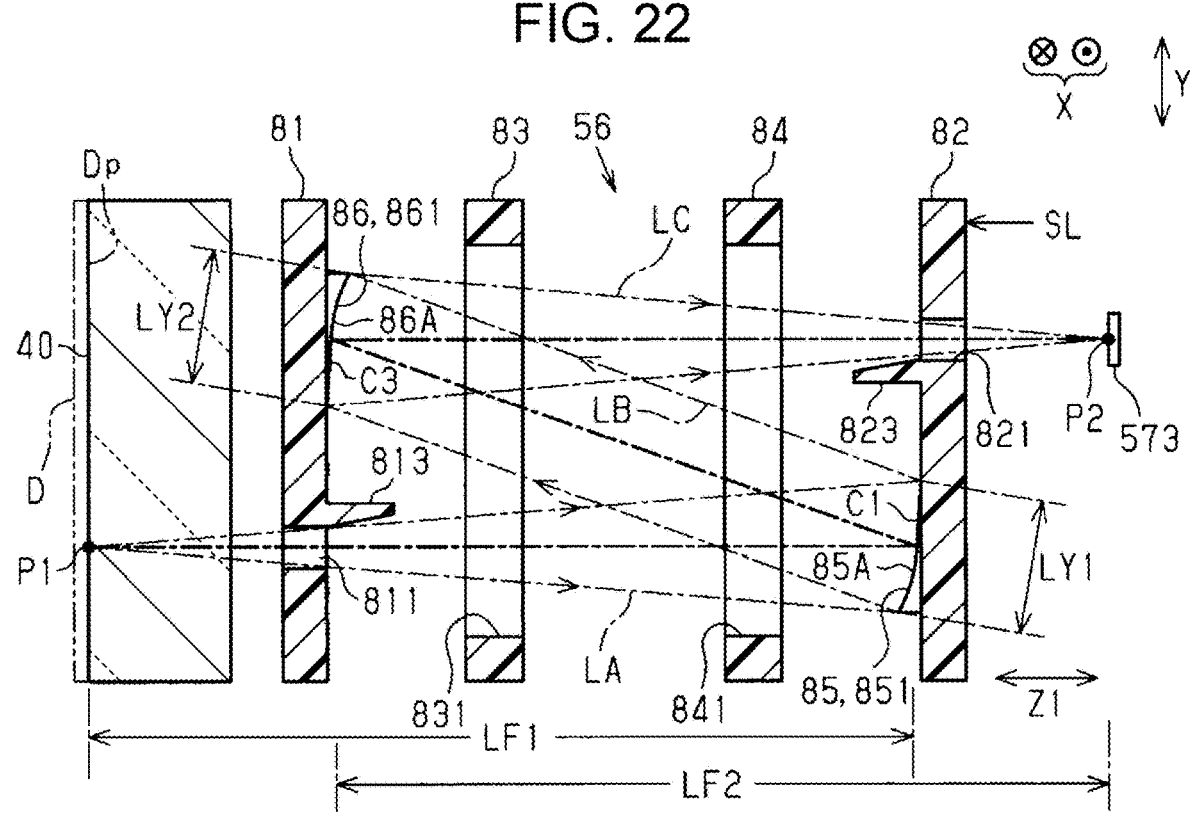
FIG. 22 is a front sectional view illustrating a configuration of an imaging optical mechanism according to a third embodiment.

As illustrated in FIG. 22, extension portions 813 and 823 are formed on surfaces of the first light blocking member 81 and the second light blocking member 82, which face each other, respectively. The extension portions 813 and 823 are provided as an example of a first light blocking portion. The extension portions 813 and 823 extend toward the concave mirrors 85 and 86 facing the slits 811 and 821, from peripheral portions on one sides which are close to each other in the sub-scanning direction Y among both sides of the slits 811 and 821, which interpose the openings of the slits 811 and 821 in the sub-scanning direction Y, respectively. In the embodiment, the extension portions 813 and 823 extend toward the concave mirrors 85 and 86 facing each other, from the peripheral portions of the slits 811 and 821 on one end sides close to each other in the sub-scanning direction Y with respect to the openings of the slits 811 and 821. That is, the extension portion 813 is provided on the inner surface of the first light blocking member 81 on an opposite side of the original document. The extension portion 813 extends toward the first concave mirror 85 from an adjacent portion to the opening of the slit 811, which is on the second concave mirror 86 side in the sub-scanning direction Y. The extension portion 823 is provided on the inner surface of the second light blocking member 82 on an opposite side of the sensor 573. The extension portion 823 extends toward the second concave mirror 86 from an adjacent portion to the opening of the slit 821, which is on the first concave mirror 85 side in the sub-scanning direction Y The extension portions 813 and 823 are formed so as not to block principal light and to have positions, shapes, and sizes of blocking direct stray light Ls (see FIG. 23). The principal light means light LA, LB, and LC which have been reflected by the first concave mirror, reflected by the second concave mirror, have passed through the second slit 821, and then reach the light receiving surface of the sensor 573, among rays of incident light which has been incident from the original document D through the slit 811. FIG. 23 illustrates only optical axes of the light LA, LB, and LC for convenient descriptions.

The extension portion 813 is provided in the slit 811 formed in the first light blocking member 81. The extension portion 813 is provided between a path of the light LA restricted by the slit 811 of the first light blocking member 81 and paths of the light LB incident to the second concave mirror 86 (as an example of the second specular surface) and the reflected light LC.

Side surfaces of the extension portions 813 and 823 in the sub-scanning direction Y as an example of the movement direction have shapes along the inner end portions of the path A of the light LA restricted by the slit 811 of the first light blocking member 81 and the paths of the light LB incident to the second concave mirror 86 and the reflected light LC. In the example illustrated in FIG. 22, the extension portions 813 and 823 have a shape along the optical axis direction Z1.

Positions of the extension portions 813 and 823 in the sub-scanning direction Y are positions for blocking direct stray light Ls (see FIG. 23) as an example of light which passes through the slit 811 of the first light blocking member 81 and travels toward the slit 821 of the second light blocking member 82. The anti-reflection treatment is performed on the surfaces of the light blocking members 81 and 82 and the aperture members 83 and 84. Therefore, in the example, the anti-reflection treatment is also performed on the surfaces of the extension portions 813 and 823. The surfaces of the concave mirrors 85 and 86 preferably have high reflectance on the sufficient specular surface.

Figure 23:
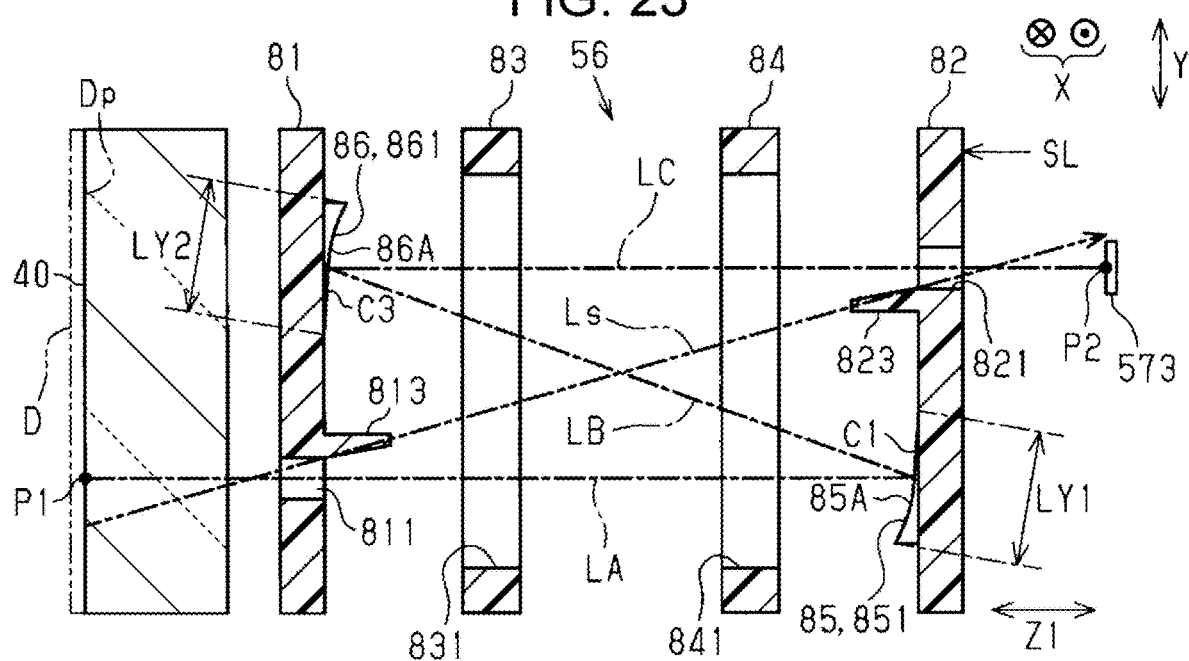
FIG. 23 is a front sectional view illustrating reduction of stray light in the imaging optical mechanism.

In FIG. 23, the direct stray light Ls which is indicated by a two-dot chain line in FIG. 23 and directly reaches the light receiving surface of the sensor 573 without passing through the concave mirrors 85 and 86 among rays of incident light which have been incident from the original document D into the imaging optical mechanism 56 is blocked by the extension portions 813 and 823, and thus is eliminated to a level at which the light does not influence quality such as contrast at all. The extension portions 813 and 823 may formed on both sides interposing the openings of the slits 811 and 821 in the sub-scanning direction Y. In this case, the extension portions 813 and 823 may be formed to have a cylindrical shape which extends toward the concave mirrors 85 and 86 facing each other, in a state of surrounding the openings of the slits 811 and 821. It is not essential that both the extension portions 813 and 823 are provided. Only one extension portion may be provided. Even in a case where only one of the extension portions 813 and 823 is provided, it is possible to block the direct stray light Ls as apparent from FIG. 23.

As described above in detail, according to the second embodiment, it is similarly possible to obtain the effects of (1) to (15) in the first embodiment and to obtain an effect as follows.

(17) The extension portions 813 and 823 as an example of the first light blocking portion are provided at positions of blocking light which passes through the slit 811 of the first light blocking member 81 and then travels toward the slit 821 of the second light blocking member 82, in at least one of the first light blocking member 81 and the second light blocking member 82. Thus, it is possible to secure brightness of an image while blurring of the image formed in the sensor 573, by reducing or eliminating direct stray light Ls. Accordingly, it is possible to obtain imaging of high contrast.

Fourth Embodiment

Next, a fourth embodiment will be described with reference to FIGS. 24 to 26.

Figure 24:
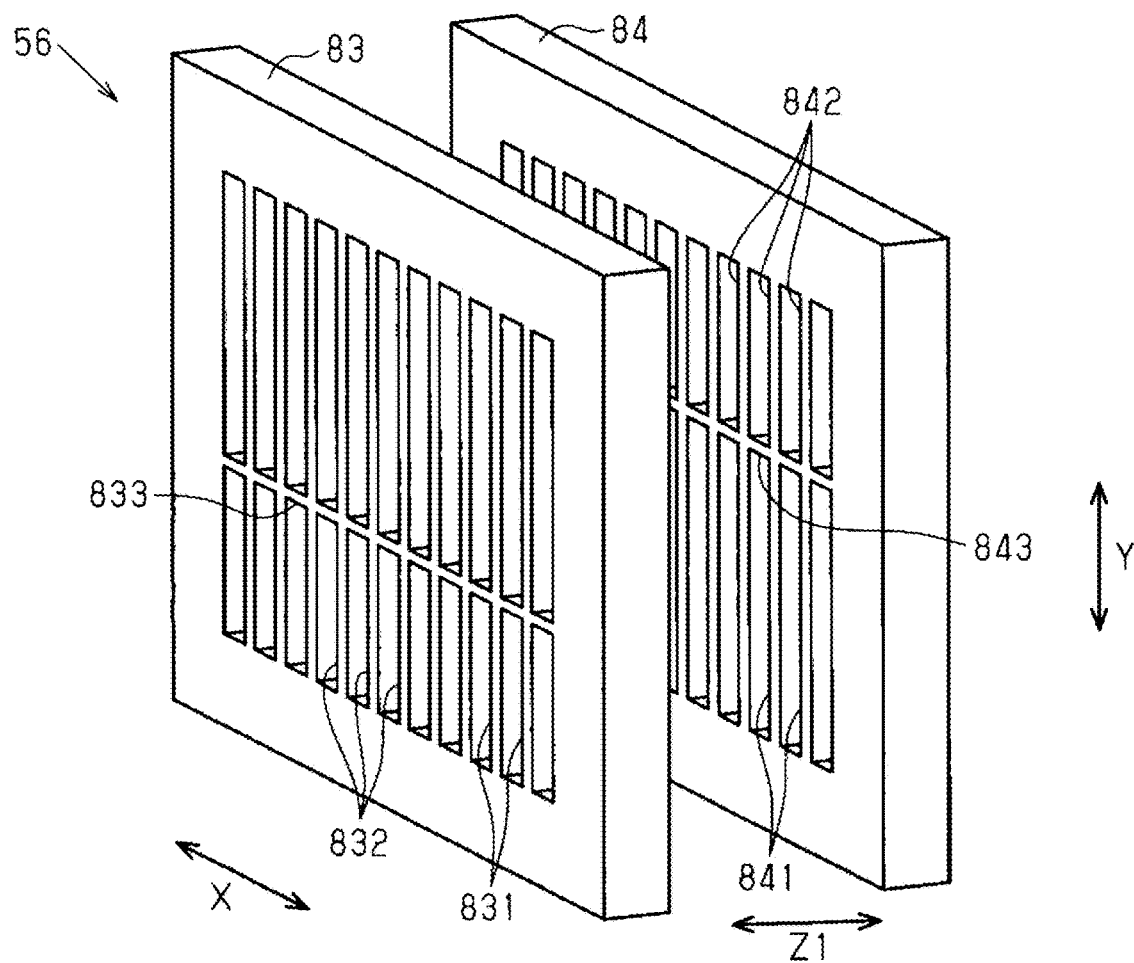
FIG. 24 is a perspective view illustrating a configuration of an aperture member according to a fourth embodiment.

As illustrated in FIG. 24, the first aperture member 83 and the second aperture member 84 include a plurality of partition walls 832 and 842 extending to portions on both sides interposing the slits 831 and 841 in the main scanning direction X, in the sub-scanning direction Y. Light blocking bars 833 and 843 as an example of a second light blocking portion are formed in the first aperture member 83 and the second aperture member 84, respectively. The light blocking bars 833 and 843 cut across the slits 831 and 841 in the main scanning direction X, at positions at which each of the slits 831 and 841 is divided into two parts at a predetermined ratio in the sub-scanning direction Y.

Figure 25:
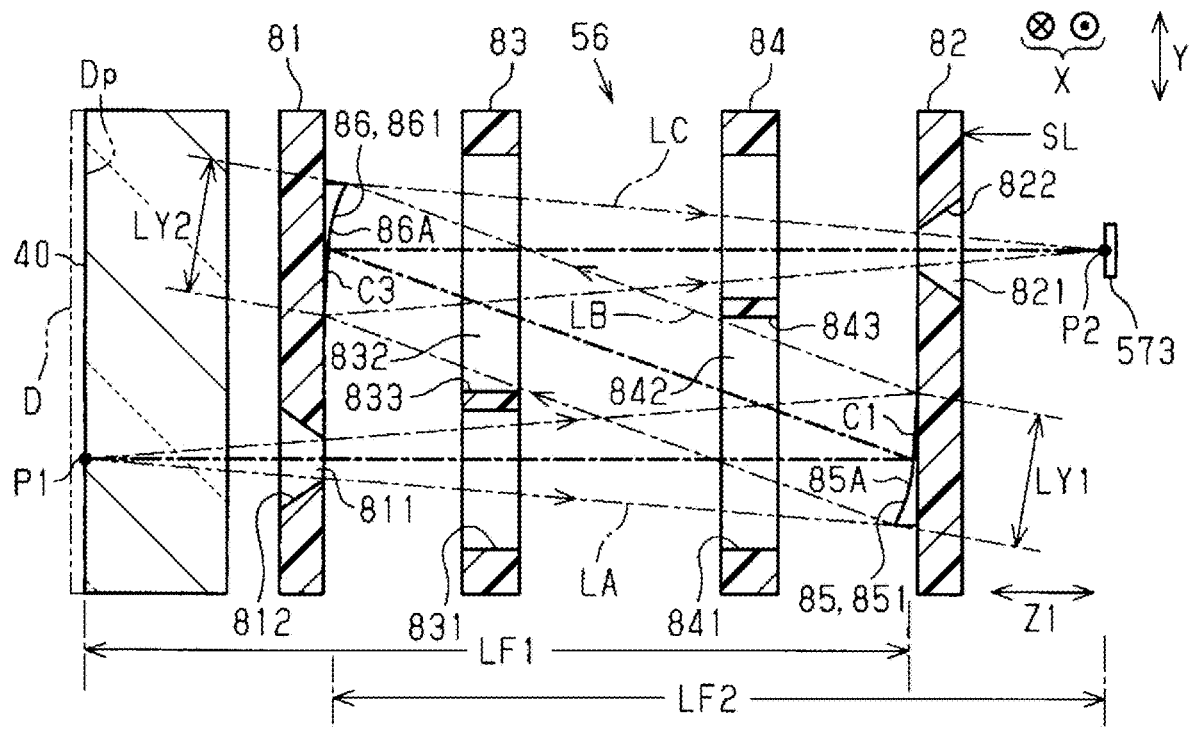
FIG. 25 is a front sectional view illustrating a configuration of an imaging optical mechanism.

As illustrated in FIG. 25, the light blocking bar 833 is provided between the path of light LA incident to the first concave mirror 85 as an example of the first specular surface and the paths of light LB incident to the second concave mirror 86 as an example of the second specular surface and the reflected light LC. The light blocking bar 843 is provided between the paths of the light LA incident to the first concave mirror 85 as an example of the first specular surface and the reflected light LB and the path of the light LC reflected by the second concave mirror 86 as an example of the second specular surface. The side surface of the light blocking bar 833 in the sub-scanning direction Y has a shape along the inner end portions of the path of the light LA incident to the first concave mirror 85 and the paths of the light LB incident to the second concave mirror 86 and the reflected light LC. The side surface of the light blocking bar 843 in the sub-scanning direction Y has a shape along the inner end portions of the paths of the light LA incident to the first concave mirror 85 and the reflected light LB and the path of the light LC incident to the second concave mirror 86. In the example illustrated in FIG. 25, the light blocking bars 833 and 843 have a shape along the optical axis direction Z1.

Here, the shape of the side surfaces of the light blocking bars 833 and 843, which is along the inner end portions of the paths of light on both sides interposing each of the side surfaces in the sub-scanning direction Y may be a shape in which an angle between the inner end portions of the paths of light on both the sides and the side surfaces of the light blocking bars 833 and 843 when viewed in the main scanning direction X as illustrated in FIG. 25 is smaller than 45 degrees. In the fourth embodiment, in FIG. 25 viewed in the main scanning direction X, the side surfaces of the light blocking bars 833 and 843 in the sub-scanning direction Y have a shape along the imaging optical mechanism 56 in the optical axis direction Z1. However, the side surfaces thereof may have a surface shape parallel to the inner end portion of each of the paths of light on both the sides. In short, the light blocking bars 833 and 843 can block direct stray light Ls (see FIG. 26), and the side surfaces thereof in the sub-scanning direction Y may have a shape along the inner end portion of the paths of light on both the sides so as not to block the light LA, LB, and LC. The anti-reflection treatment is performed on the surfaces of the light blocking members 81 and 82 and the aperture members 83 and 84. Therefore, in the example, the anti-reflection treatment is also performed on the surfaces of the light blocking bars 833 and 843. The surfaces of the concave mirrors 85 and 86 preferably have high reflectance on the sufficient specular surface.

Figure 26:
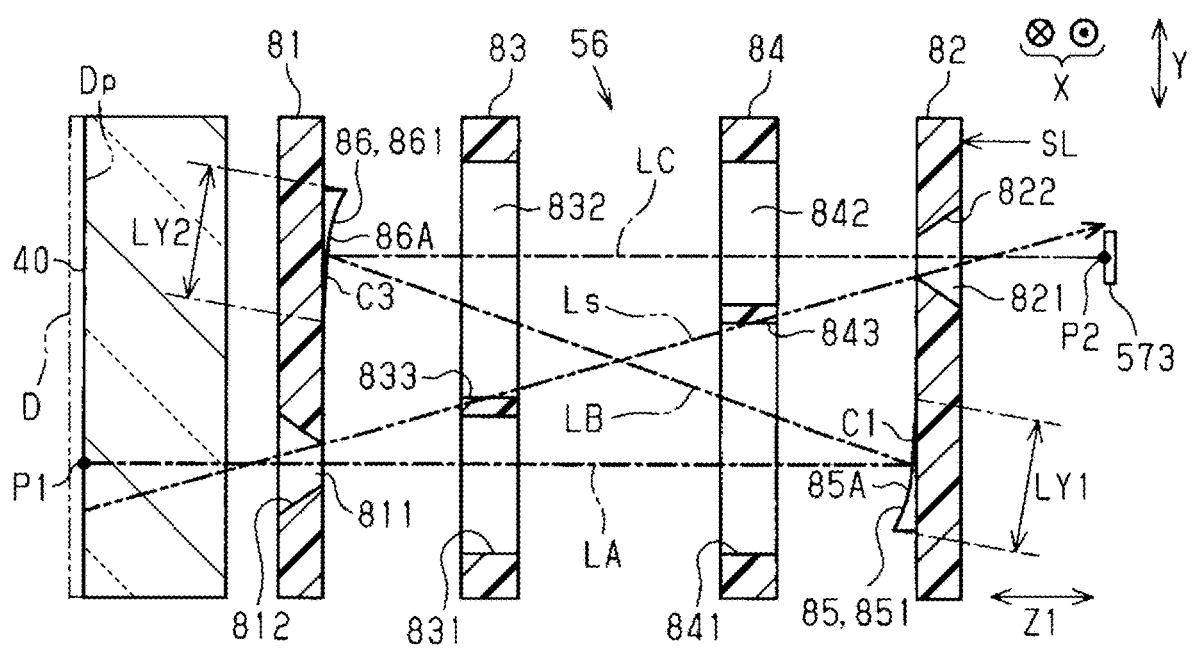
FIG. 26 is a front sectional view illustrating reduction of stray light in the imaging optical mechanism.

In FIG. 26, the direct stray light Ls which is indicated by a two-dot chain line in FIG. 26 and directly reaches the light receiving surface of the sensor 573 through the slit 821 of the second light blocking member 82 without passing through the concave mirrors 85 and 86 among rays of incident light which have been incident from the original document D through the slit 811 of the first light blocking member 81 is blocked by the light blocking bars 833 and 843, and thus is eliminated to a level at which the light does not influence quality such as contrast at all. The shape and the size of the light blocking bars 833 and 843 may be changed to another shape and another size of not blocking the light LA, LB, and LC but blocking the direct stray light Ls. It is not essential that both the light blocking bars 833 and 843 are provided. Only one light blocking bar may be provided.

As described above in detail, according to the fourth embodiment, it is similarly possible to obtain the effects of (1) to (15) in the first embodiment and to obtain effects as follows.

(18) The light blocking bars 833 and 843 as an example of the second light blocking portion are provided at the positions of blocking light which passes through the slit 811 of the first light blocking member 81 and then directly passes through the slit 821 of the second light blocking member 82, in at least one of the first aperture member 83 and the second aperture member 84. It is possible to effectively reduce or eliminate the direct stray light Ls which directly passes from the slit 811 of the first light blocking member 81 through the slit 821 of the second light blocking member 82 just by forming the light blocking bars 833 and 843 in the two aperture members 83 and 84. Thus, it is possible to effectively eliminate the stray light region in the light receiving surfaces of the sensor 573 and to obtain imaging of high contrast.

Accordingly, (19) the light blocking bar 833 provided in the first aperture member 83 is positioned between the path of the light LA restricted by the slit 811 of the first light blocking member 81 and the paths of the light LB incident to the second concave mirror 86 and the reflected light LC. The light blocking bar 843 provided as an example of the second light blocking portion in the second aperture member 84 is positioned between the paths of the light LA incident to the first concave mirror 85 and the reflected light LB and the path of the light LC reflected by the second concave mirror 86. Thus, it is possible to effectively reduce the direct stray light Ls without blocking the light LA, LB, and LC on the path of reflecting the first concave mirror and the second concave mirror.

(20) The side surface of the light blocking bar 833 in the sub-scanning direction Y has a shape along the inner end portion of each of the path of the light LA restricted by the slit 811 of the first light blocking member 81 and the paths of the light LB incident to the second concave mirror 86 and the reflected light LC. The side surface of the light blocking bar 843 in the sub-scanning direction Y has a shape along the inner end portion of each of the paths of the light LA incident to the first concave mirror 85 and the reflected light LB and the path of the light LC reflected by the second concave mirror 86. Thus, it is possible to effectively block the direct stray light Ls, and thus to obtain imaging of high contrast.

Fifth Embodiment

Next, a fifth embodiment will be described with reference to FIGS. 27 to 29.

Some rays of light from a reading line of the original document D may be reflected by the surface (front surface) of the first aperture member 83 on the original document D side. The rays may be emitted from the slit 811 of the first light blocking member 81, and then be reflected by the surface of the original document again. The reflected light may be imaged on the light receiving surface of the sensor 573, from the slit 811 of the first light blocking member 81. In the fifth embodiment, a structure in which reflected light from the front surface of the partition wall 832 of the first aperture member 83 among rays of image light abutting on the front surface of the first aperture member 83 is not brought back to the original document D is provided.

Figure 27:
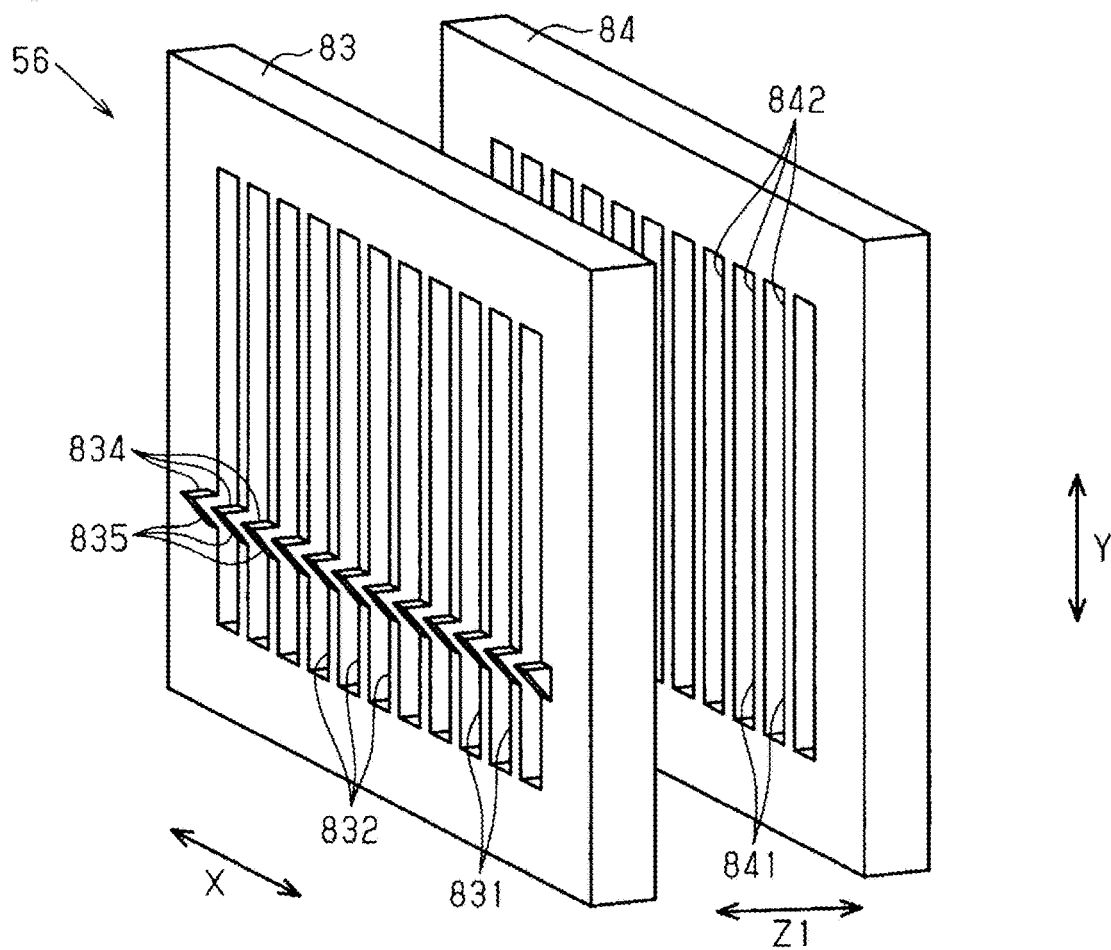
FIG. 27 is a perspective view illustrating a configuration of an aperture member according to a fifth embodiment.
Figure 28:
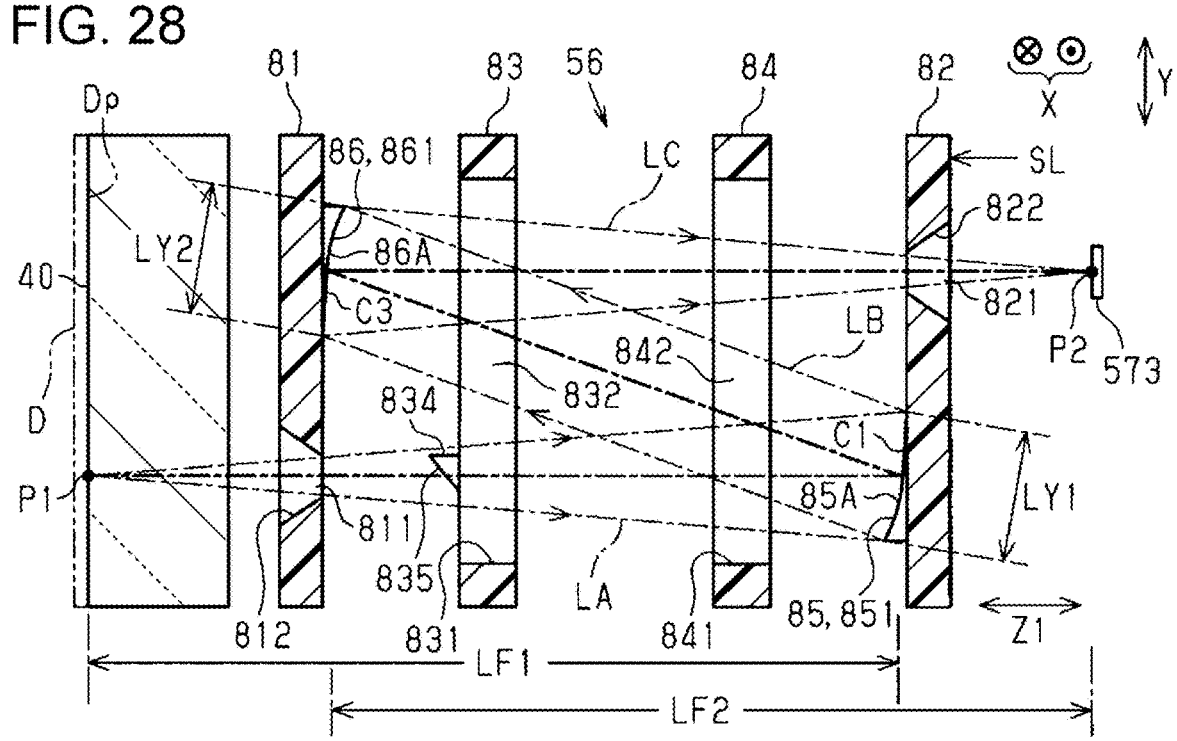
FIG. 28 is a front sectional view illustrating a configuration of an imaging optical mechanism.

As illustrated in FIG. 27, a triangular prismatic protrusion 834 is provided on both sides interposing the slit 831 in the main scanning direction X, on the surface of the document stand, which faces the glass plate 40 in the first aperture member 83. As illustrated in FIG. 28, the protrusion 834 has a triangular prismatic shape in which a shape viewed in the main scanning direction X is triangular. The surface of the protrusion 834 on an opposite side of the second concave mirror 86 is an inclined surface 835. The inclined surface 835 has an angle of about 30 degrees to the surface of the first aperture member 83, which opposes the original document D, from the reading line of the original document D through the slit 811 of the first light blocking member 81. That is, the angle of the inclined surface 835 is about 30 degrees to the surface of the original document. The angle of the inclined surface 835 with the surface of the original document may have another value in a range of 20 to 50 degrees, for example. In the embodiment, the angle of the inclined surface 835 with the surface of the original document is set to an angle at which reflected light of light emitted from the reading line of the original document D does not travel from the slit 811 of the first light blocking member 81 toward the outside of the module, in a case where the light emitted from the original document is reflected by the inclined surface 835. The angle of the inclined surface 835 may be appropriately changed so long as the light reflected from the slit 811 of the first light blocking member 81 by the original document D is not brought back.

If the surface of the protrusion 834 on the second concave mirror 86 side is an inclined surface, the light reflected by the inclined surface may be incident to the second concave mirror 86, and act as the cause of deteriorating contrast. Thus, the above configuration is not preferable. In a region adjacent to a region of the slit 831, to which the light LA is incident, in the main scanning direction X on the surface of the first aperture member 83 on the original document D side as the reading target, the surface on an opposite side of the second concave mirror 86 in the sub-scanning direction Y is set as the inclined surface 835.

A protrusion having an inclined surface similar to the protrusion 834 may be provided in partition walls 842 on both sides, which interpose the slit 841 in the main scanning direction X, even on the surface of the second aperture member 84, which is directed toward the original document D. In this case, the angle of the inclined surface of the protrusion may have any value so long as light reflected from the slit 811 of the first light blocking member 81 by the original document D is not brought back. The anti-reflection treatment is performed on the surfaces of the light blocking members 81 and 82 and the aperture members 83 and 84. Therefore, in the example, the anti-reflection treatment is also performed on the surface of the protrusion 834 including the inclined surface 835. The surfaces of the concave mirrors 85 and 86 preferably have high reflectance on the sufficient specular surface.

Figure 29:
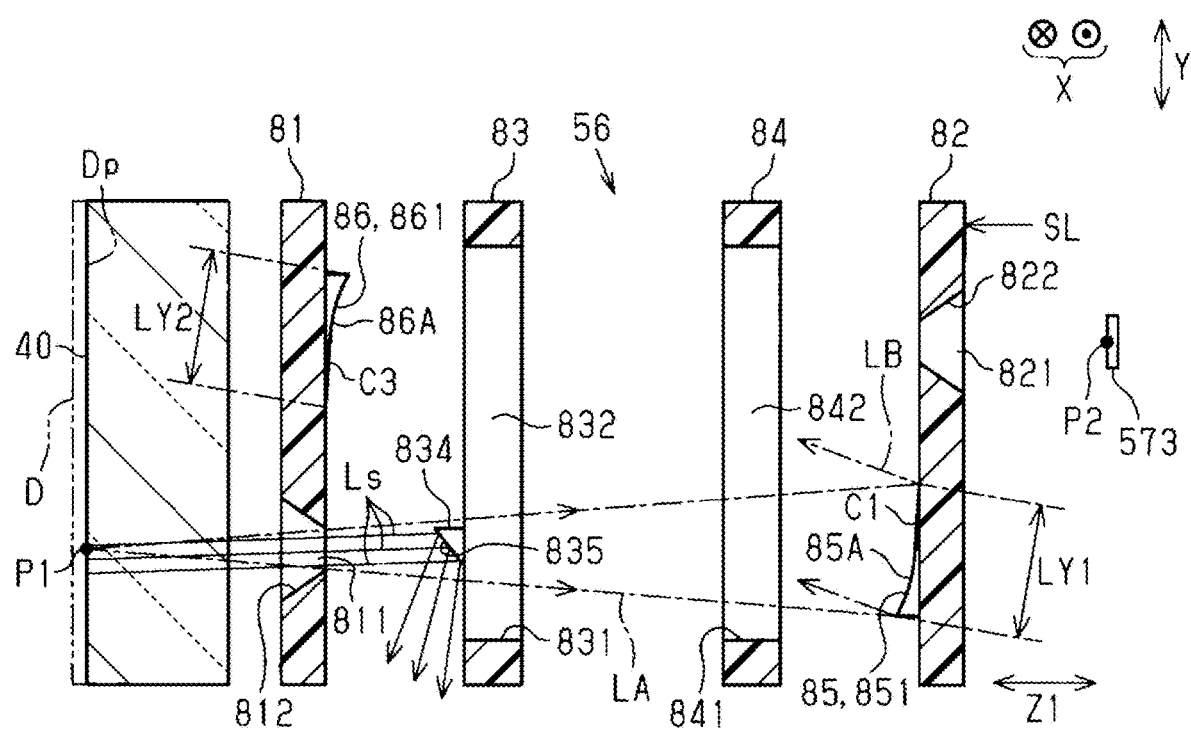
FIG. 29 is a front sectional view illustrating reduction of stray light in the imaging optical mechanism.

As illustrated in FIG. 29, most of rays of stray light Ls which are incident from the slit 811 of the first light blocking member 81 and then travel toward the front surface of the partition wall 832 of the first aperture member 83 are reflected by the inclined surface 835. A traveling direction of the stray light Ls reflected by the inclined surface 835 is a direction of an opposite side of the second concave mirror 86, as illustrated in FIG. 29. Therefore, the stray light Ls which is reflected by the front surface of the first aperture member 83 and then is brought from the slit 811 back to the original document D is reduced. Thus, the quantity of the stray light Ls which has been brought back to the original document D, is reflected by the surface of the original document, is incident to the slit 811 again, and then reaches the sensor 573 is significantly reduced.

As described above in detail, according to the fifth embodiment, it is similarly possible to obtain the effects of (1) to (15) in the first embodiment and to obtain an effect as follows.

(21) The inclined surface 835 is provided on at least a surface of the first aperture member 83 on the reading target side. The inclined surface 835 is provided in the region which is adjacent to the region of the slit 831, to which light is incident, in the main scanning direction X. The inclined surface 835 is inclined in a direction allowing light to be reflected toward on an opposite side of the second concave mirror 86 in the sub-scanning direction Y as an example of the movement direction. Thus, it is possible to reduce stray light obtained in a manner that the stray light Ls which has been incident from the slit 811 of the first light blocking member 81 and then reaches the region adjacent to the slit 831 of the first aperture member 83 is brought from the slit 811 back to the original document D, is reflected by the surface of the original document again, is incident from the slit 811, and then reaches the light receiving surface of the sensor 573.

(22) Since the inclined surface 835 which is not parallel to the surface of the original document is formed on the surface of the partition wall 832 of the slit 831 of at least the first aperture member 83 among the two aperture members 83 and 84, which opposes the original document D, it is possible to avoid an occurrence of a situation in which some rays of image light from the original document D are brought back to the original document D. Therefore, it is possible to form an image of high contrast in the sensor 573 even by using a glossy original document D, for example.

The above embodiments may be changed to forms as follows.

Each of the first concave mirror 85 as an example of the first specular surface and the second concave mirror 86 as an example of the second specular surface may have a curvature varying in one or both of the sub-scanning direction Y as the movement direction and the main scanning direction X as the intersection direction. In short, the curvature allowing an inverted image to be formed in the sub-scanning direction Y as the movement direction and allowing an erected image to be formed in the main scanning direction X as the intersection direction may be provided.

In the first concave mirror 85 as an example of the first specular surface and the second concave mirror 86 as an example of the second specular surface, one or both of the lengths LY1 and LY2 in the sub-scanning direction Y as the movement direction and the lengths LX1 and LX2 in the main scanning direction X as the intersection direction may vary. In short, the length may have any value so long as an inverted image can be formed in the sub-scanning direction Y as the movement direction, an erected image can be formed in the main scanning direction X as the intersection direction, and the second concave mirror 86 can totally reflect light from the first concave mirror 85.

An inclined angle between the first concave mirror 85 as an example of the first specular surface and the second concave mirror 86 as an example of the second specular surface may vary. In short, the inclined angle may have any value so long as an inverted image can be formed in the sub-scanning direction Y as the movement direction, and an erected image can be formed in the main scanning direction X as the intersection direction.

The light reflected by the first concave mirror 85 as an example of the first specular surface is set to be parallel light between the first concave mirror 85 and the second concave mirror 86 in the sub-scanning direction Y as the movement direction. However, the light may be spreading light or narrowing light from the first concave mirror 85 toward the second concave mirror 86 in the sub-scanning direction Y so long as the light is not imaged at the position between the first concave mirror 85 and the second concave mirror 86 as an example of the second specular surface. In this case, in order to allow an image to be formed in the sensor 573, the third curvature C3 of the second concave mirror 86 in the sub-scanning direction Y may be changed, or the position of the sensor 573 may be changed. In order to secure brightness of an image formed in the imaging object, parallel light or spreading light which makes it easy to secure the length LY1 of the first concave mirror 85 in the sub-scanning direction Y to be longer by reducing the first curvature C1 is preferable. In a case where the size of the imaging optical mechanism 56 is reduced in a manner that the length LY1 of the first concave mirror 85 in the sub-scanning direction Y is set to be long, and the length LY2 of the second concave mirror 86 in the sub-scanning direction Y is set to be shorter than the length LY1, the light reflected by the first concave mirror 85 is preferably narrowing light from the first concave mirror 85 toward the second concave mirror 86. With the imaging optical mechanism having any configuration, an inverted image is formed in the imaging object in the sub-scanning direction Y, and an erected image is formed in the imaging object in the main scanning direction X.

The gap between the first light blocking member 81 and the first aperture member 83 may be different from the gap between the second aperture member 84 and the second light blocking member 82. The gaps can be appropriately adjusted to allow reduction of stray light.

Opening inner walls of the first aperture member 83 and the second aperture member 84 may be appropriately tapered in a concave mirror array direction (main scanning direction X). That is, the inner wall surfaces of each of the slits 831 and 841 on both sides in the array direction may be appropriately tapered. Specifically, if the inner wall surface in the first aperture member 83 is set to be tapered toward the original document D, the inner wall surface in the second aperture member 84 is set to be tapered toward the sensor 573, and thus a taper angle of two degrees is provided, it is possible to reduce an occurrence of ghost. The disclosure is not limited to the above configuration and may be appropriately optimized.

The width S1 of the slit 811 of the first light blocking member 81 and the width S2 of the slit 821 of the second light blocking member 82 may be different from each other in the sub-scanning direction Y as the movement direction. The width S1 of the slit 811 in the sub-scanning direction Y is adjusted to have a dimension of restricting the irradiation area of light to the length range of the first concave mirror 85 in the sub-scanning direction Y. In addition, the width S2 of the slit 821 in the sub-scanning direction Y is adjusted to have a dimension of allowing stray light to be reduced with respect to light which is reflected by the second concave mirror 86 and then is imaged in the sensor 573 and allowing the quantity of the light to be secured. As a result, different dimensions may be set as the widths S1 and S2 of the slits 811 and 821, respectively. Since the slits 811 and 821 have a thickness in an optical path direction, light incident to the opening is scattered on an opening inner wall surface, and thus acts as stray light. In order to reduce the stray light, the opening inner wall surfaces of the slits 811 and 821 may be tapered. Specifically, one set of inner wall surfaces of the slit 811 in the longitudinal direction (main scanning direction X) may be tapered (widened toward the original document D) at, for example, 45 degrees. One set of inner wall surfaces of the slit 821 in the longitudinal direction may be tapered (widened toward the sensor 573) at, for example, 45 degrees. Even though tapering is performed in a reverse direction, the effect of reducing stray light is obtained.

A plurality of slits 811 of the first light blocking member 81 may be individually provided to open at positions which respectively correspond to first concave mirrors 85 constituting the first concave mirror array 851, and a plurality of slits 821 of the second light blocking member 82 may be individually provided to open at positions which respectively correspond to second concave mirrors 86 constituting the second concave mirror array 861. The slits 811 may be provided at a ratio of one for each of the plurality of concave mirrors 85, in the first light blocking member 81, and the slits 821 may be provided at a ratio of one for each of the plurality of concave mirrors 86, in the second light blocking member 82.

The imaging optical mechanism 56 is disposed at a posture in which the direction perpendicular to the reading surface Dp of the reading target is set to the optical axis direction Z1. However, the imaging optical mechanism 56 may be disposed at an inclined posture such that a direction forming a predetermined angle with the direction perpendicular to the reading surface Dp is set to the optical axis direction Z1. In this case, a direction and an angle of inclining an optical axis can be appropriately set in a range in which scattered light obtained in a manner that regular reflected light obtained by reflecting light from the linear light source 52 by the reading surface Dp has not been incident to the slit 811 but reflected is incident.

The imaging optical mechanism 56 may have a configuration in which an image of light obtained by causing light transmitted from the light source through the reading target to be incident is formed in the sensor 573 as an example of the imaging object. Examples of this type of reading target include negative films. A configuration in which light obtained by light from the light source being transmitted through the negative film is incident to the imaging optical mechanism, and the imaging optical mechanism forms an image of the incident light in the imaging object such as the sensor 573 may be made.

In the embodiment, dimensions of the components constituting the imaging optical mechanism 56, dimensions of the widths and the lengths of the gap G1 to G3 and the slits 811, 821, 831, and 841, the lengths LY1, LX1, LY1, and LX1 of the concave mirrors 85 and 86, and the curvatures C1 to C4 thereof are just examples in a case of being applied to the multifunction device 11, and may be appropriately changed in accordance with, for example, a device to which the imaging optical mechanism is applied, or the required resolution.

The reading module 50 constituting the reading element 53 is not limited to the CISM, and may be used in, for example, a reduction optical system.

The light guide 522 constituting the linear light source 52 is not limited to the configuration illustrated in FIG. 4, and may have any configuration so long as the light guide can uniformly illuminate the original document D. The light guide may have a configuration, for example, in which a plurality of fiber wires is bundled and assembled. The linear light source 52 is not limited to the configuration using the luminous body 521 and the light guide 522, and may be a linear luminous body, for example. The light source may be configured with an LED array which is generally used.

The luminous body 521 is not limited to an LED, and a fluorescent lamp such as a xenon lamp may be used.

The image reading apparatus is not limited to the multifunction device 11 or a copying machine including the printing device 21 and the scanner device 31. The image reading apparatus may be a scanner device including a document transporting unit that transports an original document or may be a flat-bed type scanner device.

The reading module and the imaging optical mechanism may be applied to an image reading apparatus that reads an image of a reading target other than an original document.

The optical module and the imaging optical mechanism may be applied to an apparatus other than the image reading apparatus. For example, an optical module in which the imaging optical mechanism 56 is mounted may be applied to an apparatus provided to be movable relative to an imaging object. For example, the optical module may be applied to an optical printer. In this case, a writing module as an example of the optical module in which the imaging optical mechanism has been mounted moves relative to a photosensitive body such as a photosensitive drum as an imaging object, and then images light incident from a light source such as an organic EL element, in the photosensitive body as an imaging object. As described above, the optical module to which the imaging optical mechanism is applied is not limited to the reading module and may be a writing module that writes a light source image on an imaging object such as the photosensitive body.

What is claimed is:

1. An imaging optical mechanism that is mounted in an optical module that moves relative to a reading target or an imaging object and that images light that is incident in the imaging object by reflecting or transmitting the light from a light source by or through the reading target or that images light incident in the imaging object from the light source, the imaging optical mechanism comprising:
   a first specular surface that reflects the light incident from the reading target;
   a second specular surface that is disposed at a position shifted from the first specular surface in a relative movement direction of the optical module and reflects and emits light reflected by the first specular surface; and
   a plurality of aperture members in which slits are formed along a path in which the light incident from the reading target travels toward the first specular surface, a path in which the light reflected by the first specular surface travels toward the second specular surface, and a path in which the light reflected by the second specular surface travels toward the imaging object,
   wherein the first specular surface has
   a first curvature at which the light which is widely incident from the reading target in the movement direction is reflected so as not to be imaged at a position between the first specular surface and the second specular surface, and
   a second curvature at which the light which is widely incident from the reading target in an intersection direction intersecting the movement direction is reflected so as to be imaged at a position between the first specular surface and the second specular surface, and
   the second specular surface has
   a third curvature at which the light incident from the first specular surface in the movement direction is reflected so as to be imaged at a position of the imaging object, and
   a fourth curvature at which the light incident from the first specular surface in the intersection direction is reflected so as to be imaged at the position of the imaging object.

2. The imaging optical mechanism according to claim 1, wherein lengths of the first specular surface and the second specular surface in the movement direction are longer than lengths of the first specular surface and the second specular surface in the intersection direction.

3. The imaging optical mechanism according to claim 1, further comprising:
   a first light blocking member which is disposed on a path and has a slit at a position facing the first specular surface, the path in which the incident light travels toward a first aperture member disposed on a most incident side of the light among the plurality of aperture members; and
   a second light blocking member which is disposed on a path and has a slit at a position facing the second specular surface, the path in which the light reflected by the second specular surface is transmitted through a second aperture member disposed on a closest side to the imaging object among the plurality of aperture members and travels toward the imaging object.

4. The imaging optical mechanism according to claim 3, wherein an end portion of an inside of at least one slit in the movement direction among slits formed in each of the first light blocking member and the second light blocking member is disposed at a position at which the light traveling toward portions other than the specular surfaces disposed to face each other is blocked.

5. The imaging optical mechanism according to claim 4, wherein a side surface of at least one slit, which is provided in the movement direction among the slits formed in each of the first light blocking member and the second light blocking member has an inclined shape widened toward an opposite side of the specular surfaces disposed to face each other.

6. The imaging optical mechanism according to claim 4, wherein a first light blocking portion is provided at a position of blocking light which is transmitted through the slit of the first light blocking member and travels toward the slit of the second light blocking member, in at least one of the first light blocking member and the second light blocking member.

7. The imaging optical mechanism according to claim 4, wherein a second light blocking portion is provided at a position of blocking light which is transmitted through the slit of the first light blocking member and travels toward the slit of the second light blocking member, in at least one of the first aperture member and the second aperture member.

8. The imaging optical mechanism according to claim 7, wherein, in a case where the second light blocking portion is provided in the first aperture member, the second light blocking portion is provided at a position between a path of light restricted by the slit of the first light blocking member and a path of light to be incident to the second specular surface and light reflected by the second specular surface, in the slit formed in the first aperture member, and
   in a case where the second light blocking portion is provided in the second aperture member, the second light blocking portion is provided at a position between a path of light to be incident to the first specular surface and light reflected by the first specular surface and a path of light reflected by the second specular surface, in the slit formed in the second aperture member.

9. The imaging optical mechanism according to claim 8, wherein a side surface of the second light blocking portion in the movement direction has a shape along an inner end portion of the path of the light restricted by the slit of the first light blocking member and the paths of the light to be incident to the second specular surface and light reflected by the second specular surface.

10. The imaging optical mechanism according to claim 7, wherein an inclined surface inclined toward an opposite side of the second specular surface from the movement direction is provided in a region adjacent to a region of the slit, to which the light is incident, on a surface of at least the first aperture member of the first aperture member and the second aperture member, on the reading target side.

11. The imaging optical mechanism according to claim 3, wherein a width of the slit of the first light blocking member in the movement direction corresponds to a length as long as light incident from the reading target can be restricted to an irradiation area of the first specular surface in a length range in the movement direction.

12. The imaging optical mechanism according to claim 3, wherein a width of the slit of the second light blocking member in the movement direction corresponds to a length as long as light reflected by the second specular surface can be transmitted.

13. The imaging optical mechanism according to claim 3, wherein the first specular surface and the second specular surface are disposed at positions which do not overlap each other in the movement direction and positions overlapping each other in the intersection direction.

14. The imaging optical mechanism according to claim 3, wherein an image of the reading target in the movement direction is formed to be an inverted image, and an image of the reading target in the intersection direction is formed to be an erected image, at the position of the imaging object.

15. The imaging optical mechanism according to claim 3, wherein the first light blocking member is integrally formed with the second specular surface in a state of being adjacent to the second specular surface in a first direction in the movement direction, and
the second light blocking member is integrally formed with the first specular surface in a state of being adjacent to the first specular surface in a second direction in the movement direction.

16. The imaging optical mechanism according to claim 15, wherein the second specular surface causes the reflected light to be imaged at an optical distance equal to an optical distance between the reading target and the first specular surface.

17. The imaging optical mechanism according to claim 15, wherein the first specular surface and the second specular surface have a common shape.

18. The imaging optical mechanism according to claim 15, wherein the first light blocking member and the second light blocking member are integrally formed with the aperture member.

19. A reading module comprising:
the imaging optical mechanism according to claim 3;
a linear light source as the light source that irradiates the reading target with light in the intersection direction; and
a sensor array in which a plurality of sensors as the imaging object is arranged,
wherein the reading module is provided as an example of the optical module, and
the imaging optical mechanism includes
a first specular surface array in which a plurality of first specular surfaces is arranged in the intersection direction,
a second specular surface array in which a plurality of second specular surfaces is arranged in the intersection direction,
the first light blocking member which has the slit opening to allow light to be incident to the first specular surface array, and
the second light blocking member which has the slit opening to allow light reflected by the second specular surface array to be imaged in the sensor array.

20. The reading module according to claim 19, wherein the slit of the first light blocking member opens in a length range allowing light to be incident to the first specular surface array, in the intersection direction, and
the slit of the second light blocking member opens in a length range allowing the light reflected by the second specular surface array in the intersection direction to be imaged in the sensor array.

21. An image reading apparatus comprising:
the imaging module according to claim 19;
a transparent member that defines a position of an original document as a reading target; and
a transporting unit that relatively moves the original document and the optical module,
wherein the reading module reads the original document at a position on an opposite side of the original document with the transparent member interposed between the reading module and the original document, by causing reflected light of light with which the original document has been irradiated to be incident to the reading module.

* * * * *